United States Patent
Masuda et al.

(10) Patent No.: US 9,417,379 B2
(45) Date of Patent: Aug. 16, 2016

(54) IMAGE DISPLAY DEVICE AND TELEVISION RECEPTION DEVICE

(71) Applicant: Sharp Kabushiki Kaisha, Osaka (JP)

(72) Inventors: Yusuke Masuda, Osaka (JP); Motomitsu Itoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 271 days.

(21) Appl. No.: 14/375,669

(22) PCT Filed: Jan. 25, 2013

(86) PCT No.: PCT/JP2013/051550
§ 371 (c)(1),
(2) Date: Jul. 30, 2014

(87) PCT Pub. No.: WO2013/115086
PCT Pub. Date: Aug. 8, 2013

(65) Prior Publication Data
US 2015/0015798 A1     Jan. 15, 2015

(30) Foreign Application Priority Data
Feb. 3, 2012   (JP) .................................. 2012-022054

(51) Int. Cl.
*F21V 7/04*           (2006.01)
*F21V 8/00*           (2006.01)
(Continued)

(52) U.S. Cl.
CPC .............. *G02B 6/0088* (2013.01); *G02B 6/005* (2013.01); *G02B 6/0056* (2013.01);
(Continued)

(58) Field of Classification Search
CPC .... G02B 6/0086; G02B 6/005; G02B 6/0056; G02F 1/1333; G02F 2001/133317; G02F 2001/133322; G02F 2001/133325; G02F 2201/46; G02F 2201/503; H04N 5/64; H04N 5/645; H04N 5/66

USPC ................................................. 362/632, 628
See application file for complete search history.

(56) References Cited

U.S. PATENT DOCUMENTS 5,671,028 A * 9/1997 Okano ................. G02B 6/0053
                                                    349/57
6,016,175 A * 1/2000 Kim .................. G02F 1/133615
                                                    349/58
7,083,318 B2 * 8/2006 Ha ...................... G02B 6/0031
                                                    349/58

(Continued)

FOREIGN PATENT DOCUMENTS

JP       11-338371 A        12/1999
JP       2002-174811 A      6/2002
(Continued)

*Primary Examiner* — Bryon T Gyllstrom
(74) *Attorney, Agent, or Firm* — Chen Yoshimura LLP

(57) ABSTRACT

A liquid crystal display device (10) is provided with the following: an LED (17); a liquid crystal panel (11); a light guide plate (16) disposed so as to overlap the liquid crystal panel (11); an optical member (15) disposed between the liquid crystal panel (11) and the light guide plate (16); a holding member (HM) having a frame (13) and a chassis (14) for holding in a sandwiched manner the liquid crystal panel (11), the optical member (15) and the light guide plate (16); a first object of positioning determination unit (33) disposed at the edge of the light guide plate (16); a positioning determination unit (31) disposed on the frame (13) and for determining the position of the light guide plate (16) in a direction following the plate surface by causing uneven engagement of the light guide plate with respect to the first object of positioning determination unit (33); and a light-shielding sheet (35) for blocking direct incidence of light from the first object of positioning determination unit (33) on the liquid crystal panel (11) by covering at least a portion of a gap (C1) formed between the positioning determination unit (31) and the first object of positioning determination unit (33) and by being provided between the light guide plate (16) and the liquid crystal panel (11).

15 Claims, 28 Drawing Sheets

(51) Int. Cl.
*G02F 1/1333* (2006.01)
*H04N 5/64* (2006.01)
*H04N 5/66* (2006.01)
*H04N 5/645* (2006.01)
*G02F 1/1335* (2006.01)

(52) U.S. Cl.
CPC .............. *G02F 1/1333* (2013.01); *H04N 5/64* (2013.01); *H04N 5/645* (2013.01); *H04N 5/66* (2013.01); *G02F 1/133615* (2013.01); *G02F 2001/133317* (2013.01); *G02F 2001/133322* (2013.01); *G02F 2001/133325* (2013.01); *G02F 2201/46* (2013.01); *G02F 2201/503* (2013.01)

(56) References Cited

U.S. PATENT DOCUMENTS

| | | | | |
|---|---|---|---|---|
| 8,414,176 B2* | 4/2013 | Shin | ............... | G02B 6/009 362/628 |
| 8,454,221 B2* | 6/2013 | Urano | ............... | G02B 6/0065 362/561 |
| 2002/0125815 A1* | 9/2002 | Wakita | ............... | G02F 1/133308 313/491 |
| 2003/0235052 A1* | 12/2003 | Lee | ............... | G02B 6/009 362/329 |
| 2005/0200770 A1* | 9/2005 | Kuo | ............... | G02B 6/0055 349/58 |
| 2007/0147092 A1* | 6/2007 | Fu | ............... | G02B 6/0088 362/633 |
| 2008/0316772 A1* | 12/2008 | Terada | ............... | B29C 45/0025 362/633 |
| 2011/0216556 A1* | 9/2011 | Cho | ............... | F21V 13/12 362/612 |

FOREIGN PATENT DOCUMENTS

| | | |
|---|---|---|
| JP | 2004-361654 A | 12/2004 |
| JP | 2010-170861 A | 8/2010 |

\* cited by examiner

IMAGE DISPLAY DEVICE AND TELEVISION RECEPTION DEVICE

TECHNICAL FIELD

The present invention relates to a display device and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. In the liquid crystal display device, a liquid crystal panel used therein does not emit light, and therefore, it is necessary to separately provide a backlight device as an illumination device. The backlight devices are largely categorized into a direct-lighting type and an edge-lighting type depending on the mechanism thereof. In order to make the liquid crystal display device even thinner, it is preferable to use an edge-lighting type backlight device, and a known example thereof is disclosed in Patent Document 1 below.

RELATED ART DOCUMENT

Patent Document

Patent Document 1: Japanese Patent Application Laid-Open Publication No. 2002-174811

Problems to be Solved by the Invention

The liquid crystal display device disclosed in Patent Document 1 above has a configuration in which a liquid crystal panel is sandwiched by a panel pressing member on the front side and a panel receiving member on the rear side. In order to satisfy demands for a reduction in manufacturing cost or a further reduction in thickness and the like, elimination of the panel receiving member on the rear side is possible, for example. However, the panel receiving member supports edges of the liquid crystal panel from the rear and has the function of preventing light from the rear from entering edge faces of the liquid crystal panel, and thus, if the panel receiving member is simply removed, there is a risk that light leakage in which light from the rear enters the edges of the liquid crystal panel would occur.

SUMMARY OF THE INVENTION

The present invention was made in light of the above-mentioned situation, and an object thereof is to prevent light leakage.

Means for Solving the Problems

The display device of the present invention a light source; a display panel that performs display using light from the light source; a light guide plate laid on a side of the display panel opposite to a display surface side, the light guide plate being disposed such that an edge face thereof faces the light source; an optical member disposed between the display panel and the light guide plate; a pair of holding parts that sandwiches the display panel, the optical member, and the light guide plate, and houses the light source, respectively from the display surface side and a side opposite thereto; a receptor portion (to-be-positioned portion) provided in an edge of the light guide plate; a positioning portion provided in at least one of the pair of holding parts that engages with the receptor portion to fix in position the light guide plate in a horizontal direction; a light-shielding member that is disposed between the light guide plate and the display panel and that blocks light from directly entering the display panel from the receptor portion by covering at least a portion of a gap between the positioning portion and the receptor portion.

In this manner, light emitted from the light source is guided to the display panel while having prescribed optical effects applied thereto through the optical member after entering the edge face of the light guide plate, and thus, images are displayed in the display panel using this light. The light guide plate is positioned in a direction along the surface thereof by the positioning portion that engages with the to-be-positioned portion provided in the edge thereof. By forming a gap between the positioning portion and the to-be-positioned portion, the effect of guaranteeing ease of assembly is attained. Here, the display panel, the optical members, and the light guide plate are held by being sandwiched from the display surface side and the side opposite thereto by the pair of holding parts of the holding member, and thus, the conventional configuration in which a panel-receiving member is provided between the light guide plate and optical members, and the display panel is not used. In particular, light is susceptible to leaking from the to-be-positioned portions provided in the edges of the light guide plate compared to the edge face of the light guide plate, and thus, there is a concern that the light would leak through the gap formed between the to-be-positioned portion and the positioning portion and directly enter the display panel. By disposing the light-shielding member between the light guide plate and the display panel and covering at least a portion of the gap formed between the positioning portion and the positioned portion, light from the to-be-positioned portion is blocked from directly entering the display panel. As a result, the display quality of images displayed in the liquid crystal panel can be made excellent.

As embodiments of the present invention, the following configurations are preferred.

(1) An edge of the optical member is provided with a receptor portion (second to-be-positioned portion) that engages the positioning portion so as to fix in position the optical member, and the light-shielding member is disposed between the optical member and the display panel and blocks light from directly entering the display panel from the receptor portion of the light guide plate by covering at least a portion of a gap between the positioning portion and the receptor portion of the optical member. According to this configuration, the to-be-positioned portion of the light guide plate and the to-be-positioned portion of the optical member engage with the positioning portion, and thus, the light guide plate and the optical member are both positioned. As a result of the light-shielding member disposed between the optical members and the display panel, at least a portion of the gap formed between the positioning portion and the second to-be-positioned portion is covered, and thus, light from the to-be-positioned portion of the light guide plate is blocked from directly entering the display panel through the gap formed between the positioning portion and the second to-be-positioned portion.

(2) The light-shielding member covers a portion of the gap formed between the positioning portion and the receptor portion of the optical member such that a portion of the gap not covered by the light-shielding member remains between an edge face of the light-shielding member and an edge face of the receptor portion of the optical member, and one of the edge face of the light-shielding member and the edge face of the receptor portion of the optical member is provided with a non-parallel portion (inclined portion) that is not parallel to the other of the edge face of the light-shielding member and the edge face of the receptor portion of the optical member. In this manner, if a portion of the gap not-covered by the light-shielding member is present between the edge face of the light-shielding member and the edge face of the second to-be-positioned member or the edge face of the optical member, then there is a concern if the optical member undergoes thermal expansion, the edge face of the second to-be-positioned portion or the edge face of the optical member interferes with the edge face of the light-shielding member, resulting in deformation, but by providing the inclined portion, the inclined portion is not susceptible to becoming stuck on the other edge face. As a result, it is possible to prevent the light-shielding sheet from undergoing unwanted deformation due to the optical members and the light-shielding properties of the light-shielding sheet can be exhibited, thus reliably mitigating light leakage.

(3) The non-parallel portion is provided in the edge face of the receptor portion of the optical member and not parallel to the edge face of the light-shielding member in a plan view. In this manner, the inclined portion provided in the optical member has an inclined shape in a plan view, and thus, it is possible to provide the inclined portion with ease during manufacturing of the optical member, and thus an increase in cost resulting from providing the optical member can be mitigated.

(4) The non-parallel portion is symmetrical in a plan view. In this manner, when the inclined portion interferes with the edge face of the light-shielding member due to thermal expansion of the optical member, the force applied to the light-shielding member from the inclined portion can be distributed with ease, thereby further preventing unwanted deformation in the light-shielding member, and reliably exhibiting the light-shielding function of the light-shielding member.

(5) The receptor portion of the optical member includes a pair of protrusions that protrude from the edge face of the optical member and that sandwich the positioning portion from both sides thereof, and a portion of the edge of the optical member between the pair of protrusions, and the non-parallel portion is provided in the portion of the edge of the optical member between the pair of protrusions. In this manner, even if the edge face of the optical member is given a recess, then compared to a case in which the second Therefore, it is possible to further narrow the frame portion of the liquid crystal display device that accommodates the thermal expansion of the optical members.

(6) The receptor portion is provided in each of opposing sides of the light guide plate so as to form a pair, the receptor portion is provided in each of opposing sides of the optical member so as to form a pair, the positioning portion is provided in each of opposing sides of the one of the pair of holding parts so as to form a pair, and the light-shielding member is formed between the display panel and each of the opposing sides of the optical member so as to form a pair, and the non-parallel portion is provided on either both edge face of the light-shielding members or both edge faces of the receptor portion of the optical member. In this manner, the light guide plate and the optical member are positioned from both sides from the pair of positioning portions, the to-be-positioned portion, and the second to-be-positioned portion, and thus, the positioning accuracy is improved. The pair of light-shielding members is provided for the respective pairs of positioning portions, to-be-positioned portions, and second to-be-positioned portions, and thus, sufficient light-shielding properties are attained. Furthermore, even if a difference occurs between the positional relation of the second to-be-positioned portion in the edge of the optical member and the positioning portion engaged therewith, and the positional relation between the second to-be-positioned portion on the opposite side edge of the optical member and the positioning portion engaged therewith, for example, and a larger gap appears between the edge face of one of the light-shielding members and the edge face of the second to-be-positioned portion and the edge face of the optical member, a pair of the inclined portions are respectively disposed for each of the pair of light-shielding members and second to-be-positioned portions, and thus, deformation of the light-shielding member resulting from the gap between the edge face of the light-shielding member and the edge face of the second to-be-positioned portion or the edge face of the optical member is suitably prevented.

(7) The light-shielding member is a flexible sheet. In this manner, the light-shielding member can be disposed between the optical member and the display panel with ease. On the other hand, if the light-shielding member is a sheet, while the light-shielding member is more susceptible to deformation such as warping, as a result of the inclined portion, the optical member is less susceptible to being stuck on the light-shielding member, and thus, deformation of the light-shielding member can be suitably mitigated.

(8) Polarizing plates are respectively attached to a surface of the display panel facing the optical member and a surface of the display panel opposite thereto, the polarizing plates covering central portions of the display panel, and the light-shielding member is disposed between an edge of the display panel where the polarizing plates are not present, a thickness of the light-shielding members being less than a thickness of each polarizing plate. In this manner, the light-shielding member can be disposed between the edge of the display panel where the polarizing plate is not provided and the optical member, relying on the thickness of the polarizing plate.

(9) At least a portion of the light-shielding member overlaps the receptor portion of the optical member in a plan view. In this manner, at least a portion of the light-shielding member overlaps the second to-be-positioned portion in a plan view, and thus, compared to a case in which the light-shielding member and the second to-be-positioned portion do not overlap, the light-shielding member is less susceptible to deformation due to the second to-be-positioned portion when the second to-be-positioned portion changes in position relative to the light-shielding member due to the optical member undergoing thermal expansion.

(10) The receptor portion of the light guide plate is formed as a recess in the edge face of the light guide plate. In this manner, if the light guide plate is manufactured by extrusion, for example, it is possible to form the to-be-positioned portion with ease and at a low cost by cutting or the like a portion of the edge face of the light guide plate.

(11) Among the pair of holding parts, a holding part disposed on the display surface side of the display panel is provided with a light guide plate supporting portion that extends along the edge of the light guide plate and that supports, from the display panel side, portions of the edge of the light guide plate where the receptor portion of the light guide plate is not formed, and an attaching portion that is attached to the positioning portion and that is continuous with the light guide plate supporting portion. In this manner, the light guide plate is supported from the display panel side by the light guide plate supporting member that extends along the edge thereof where the to-be-positioned portion is not formed, and thus, the positional relation with the light source is maintained in a stable manner, and thus, display quality of images displayed in the display panel can be made stable and excellent. Furthermore, the positioning portion is attached to the attaching portion continuous with the light guide plate supporting member, and thus, the space where the light guide plate supporting member is disposed in the holding portion is used as the space where the positioning portion in the holding portion is disposed. As a result, the width of the frame of the display device can be kept narrow.

(12) The to-be-positioned portion is formed as a recess in the edge face of the light guide plate. In this manner, the attaching portion continuous with the light guide plate supporting member is also attached to the light-shielding member in addition to the positioning portion, and thus, the space in the holding portion where the light-shielding member is disposed is used as the space in the holding member where the light guide plate supporting member is disposed. As a result, the width of the frame of the display device can be kept narrower.

(13) The display panel is a liquid crystal panel made of liquid crystal sealed between a pair of substrates. As a liquid crystal display device, such a display device can be applied to various applications such as a television or the display of a personal computer, for example, and is particularly suitable for large screens.

Effects of the Invention

According to the present invention, light leakage can be mitigated.

DETAILED DESCRIPTION OF EMBODIMENTS

Embodiment 1

Figure 3:
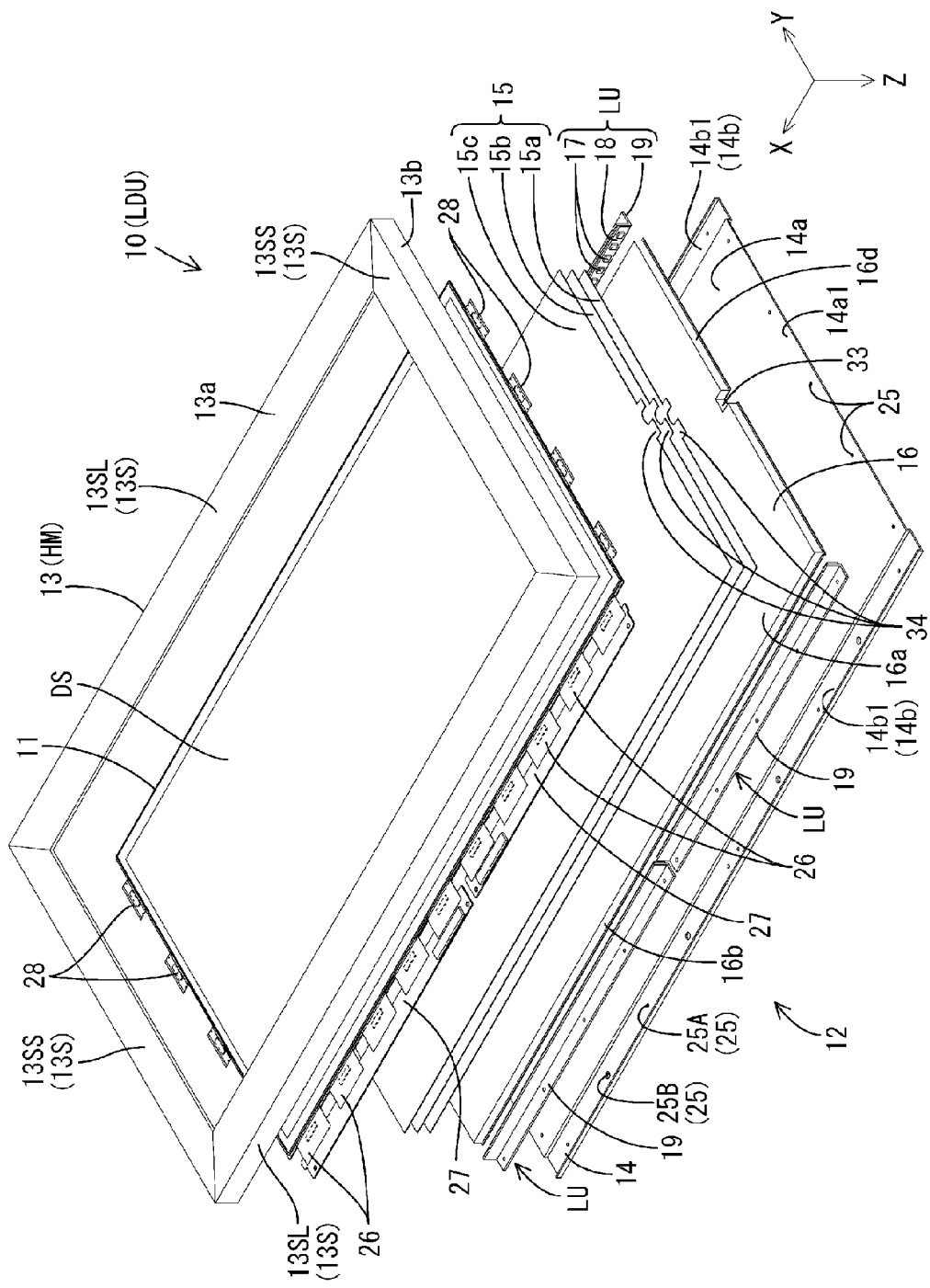
FIG. 3 is an exploded perspective view showing a schematic configuration of a liquid crystal display unit that constitutes a part of the liquid crystal display device.
Figure 4:
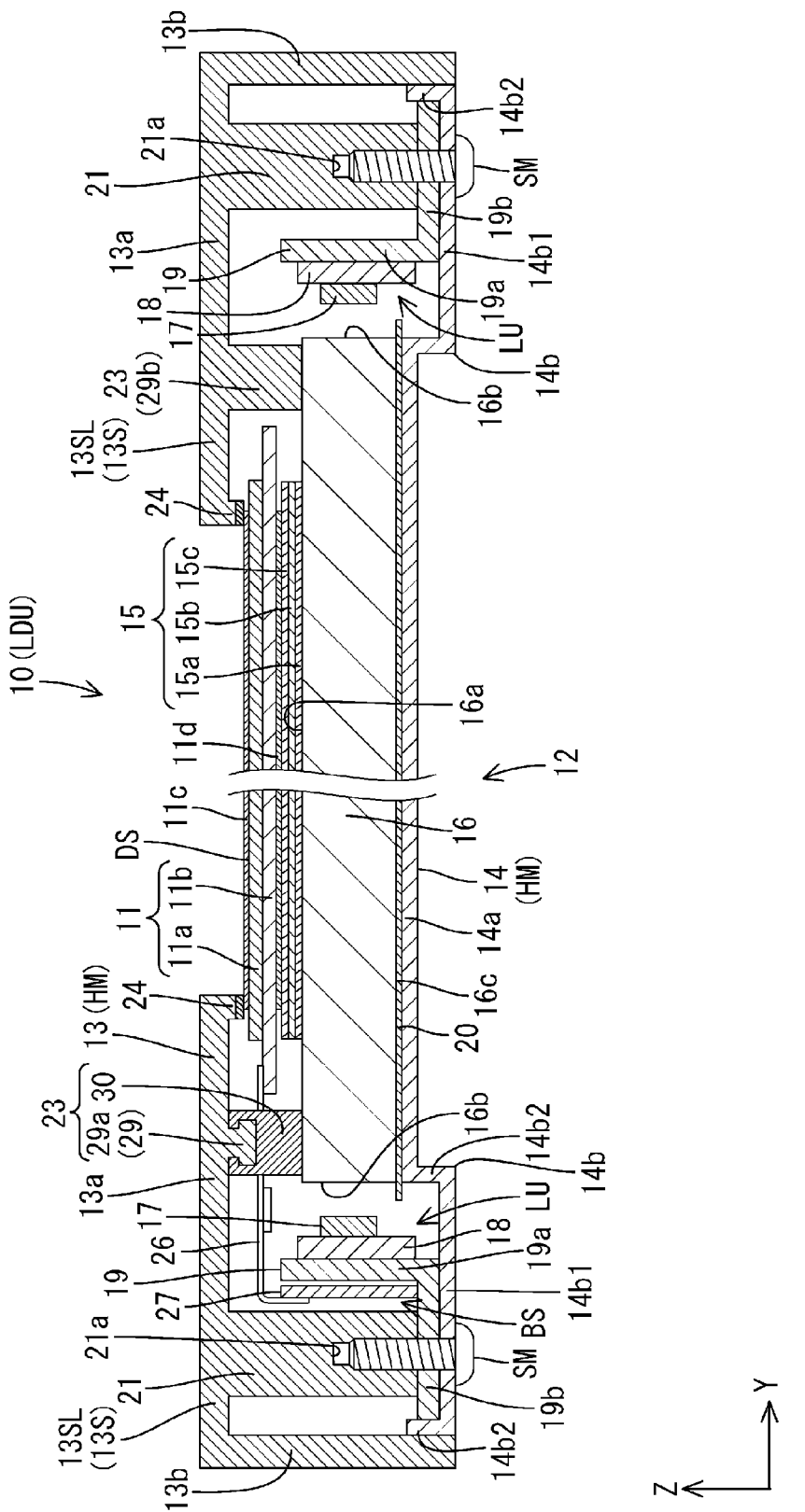
FIG. 4 is a cross-sectional view that shows a cross-sectional configuration of the liquid crystal display device along the shorter side direction.
Figure 5:
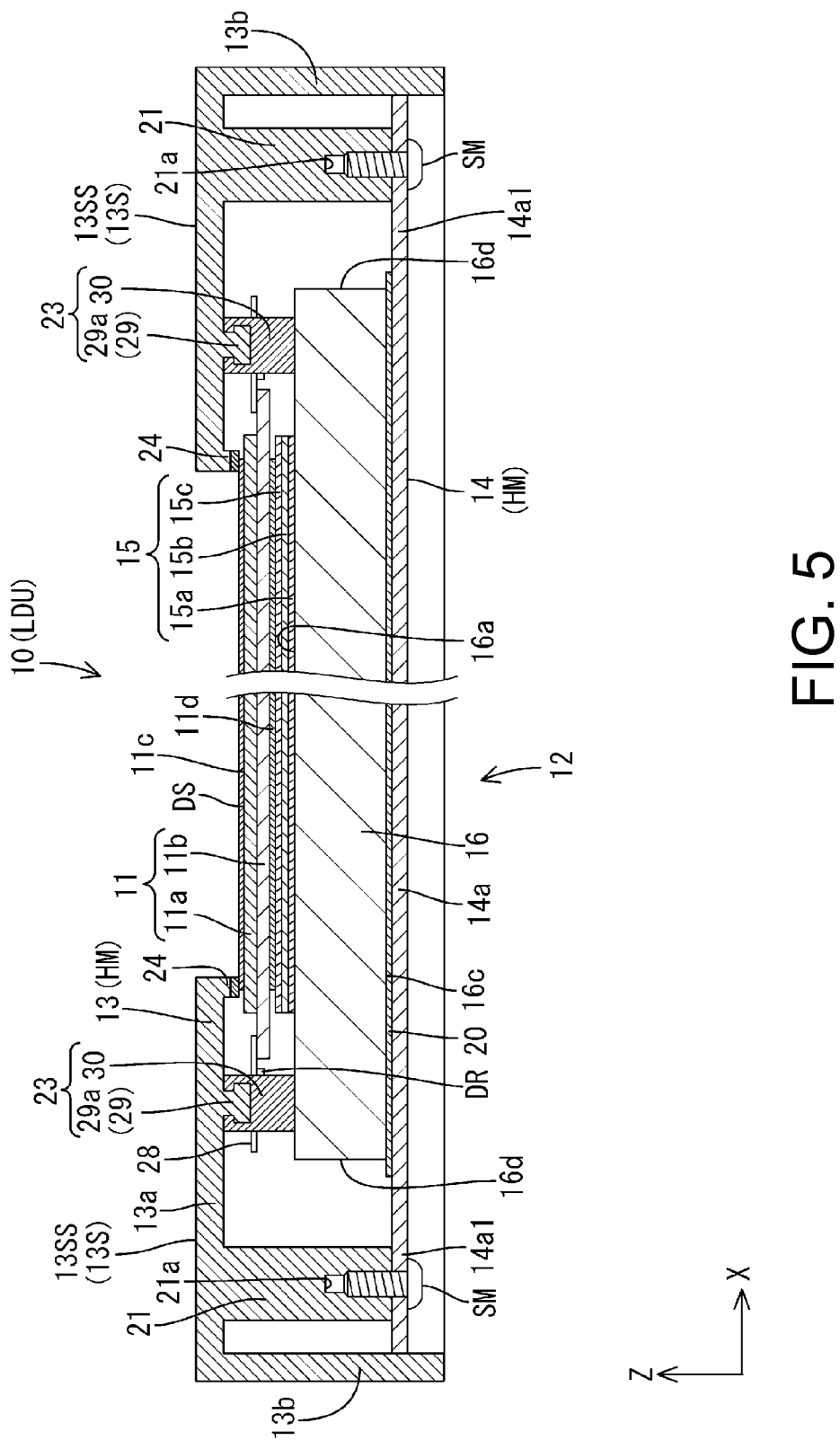
FIG. 5 is a cross-sectional view that shows a cross-sectional configuration of the liquid crystal panel along the longer side direction.

Embodiment 1 of the present invention will be described with reference to FIGS. 1 to 18. In the present embodiment, a liquid crystal display device 10 will be described as an example. The drawings indicate an X axis, a Y axis, and a Z axis in a portion of the drawings, and each of the axes indicates the same direction for the respective drawings. The top side of FIGS. 4 and 5 is the front side, and the bottom side of FIGS. 4 and 5 is the rear side.

Figure 1:
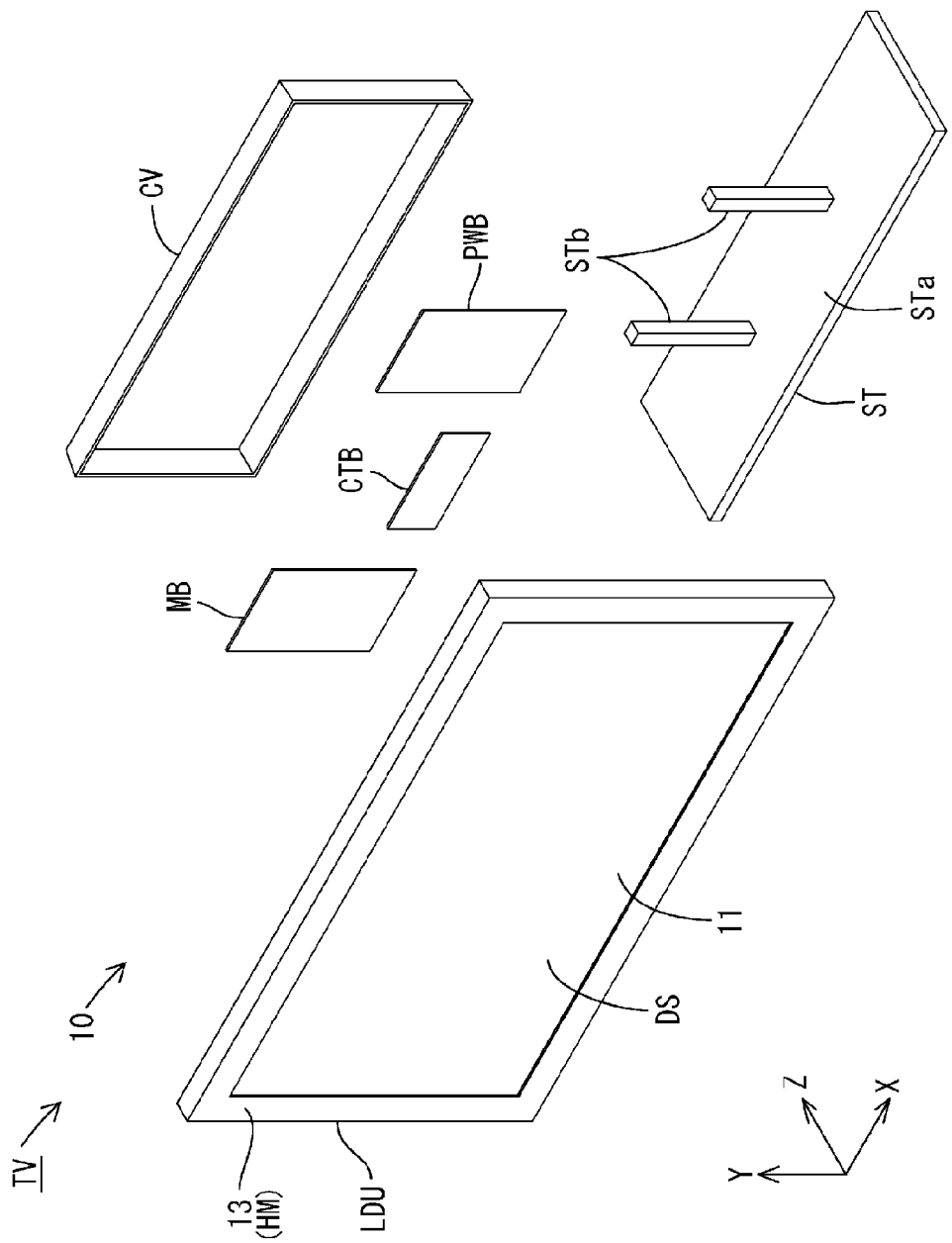
FIG. 1 is an exploded perspective view that shows a schematic configuration of a television receiver and a liquid crystal display device according to Embodiment 1 of the present invention.

As shown in FIG. 1, a television receiver TV according to the present embodiment has a liquid crystal display unit (display unit) LDU, various boards PWB, MB, and CTB attached to the rear side (back side) of the liquid crystal display unit LDU, a cover member CV that is attached to the rear side of the liquid crystal display unit LDU and covers the various boards PWB, MB, and CTB, and a stand ST. The television receiver TV is supported by the stand ST in a state in which the display surface of the liquid crystal unit LDU coincides with the vertical direction (Y axis direction). The liquid crystal display device 10 of the present embodiment is the portion excluding the configuration for receiving television signals (such as a tuner part of the main board MB) from the television receiver TV having the above-mentioned configuration. As shown in FIG. 3, the liquid crystal display unit LDU overall has a horizontally long rectangular shape, includes a liquid crystal panel 11 that is a display panel, and a backlight device 12 (illumination device) that is an external light source, and these are integrally held together by a frame 13 (a holding part disposed on the display surface DS side; one holding part) and a chassis 14 (a holding part disposed on a side opposite to that of the display surface DS side; another holding part). The frame 13 and the chassis 14 constitute a holding member HM. The chassis 14 of the present embodiment constitutes a part of the exterior member and the holding member HM, and also a part of the backlight device 12.

Figure 2:
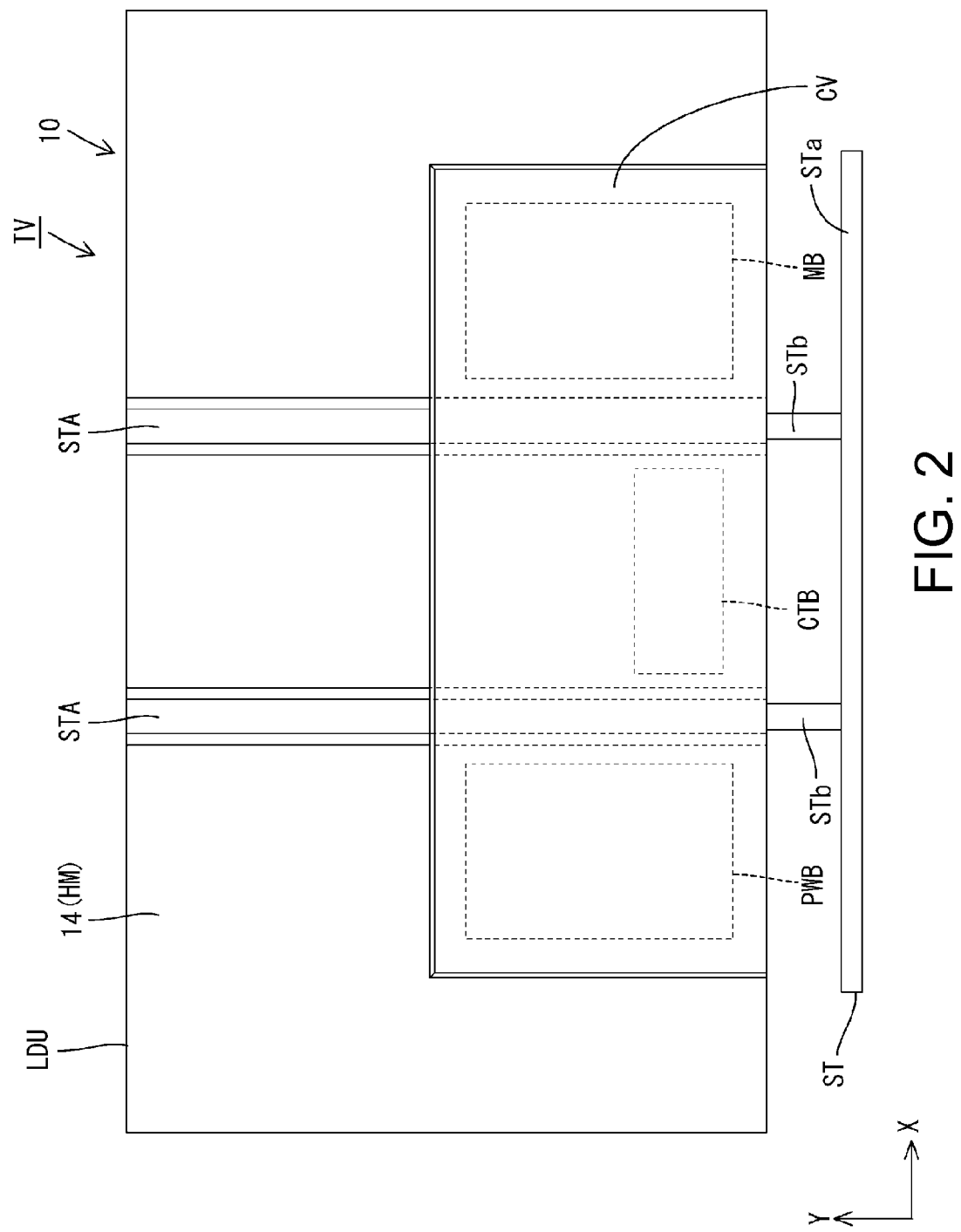
FIG. 2 is a rear view of the television receiver and the liquid crystal display device.

First, the configuration of the rear side of the liquid crystal display device 10 will be explained. As shown in FIG. 2, on the rear of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA is a substantially channel shape that opens toward the chassis 14, and a pair of support columns STb of the stand ST is inserted into respective spaces formed between the stand attachment members STA and the chassis 14, respectively. Wiring members (such as electric wires) connected to an LED substrate 18 of the backlight device 12 can run through a space inside of the stand attachment members STA. The stand ST is constituted of a base STa that is disposed in parallel with the X axis direction and the Z axis direction, and a pair of support columns STb standing on the base STa along the Y axis direction. The cover member CV is made of a synthetic resin, and is attached so as to cover about a half of the lower part of the rear side of the chassis 14 of FIG. 2, while extending across the pair of stand attachment members STA along the X axis direction. Between the cover member CV and the chassis 14, a component housing space is provided to house the components mentioned below such as the various boards PWB, MB, and CTB.

As shown in FIG. 2, the various boards PWB, MB, and CTB include a power supply board PWB, a main board MB, and a control board CTB. The power supply board PWB is a power source for the liquid crystal display device 10, and can supply driving power to other boards MB and CTB, LEDs 17 of the backlight device 12, and the like. Therefore, the power supply board PWB doubles as an LED driver substrate that drives the LEDs 17 (light source driver substrate). The main board MB has at least a tuner part that can receive television signals, and an image processing part that performs image-processing on the received television signals (neither the tuner part nor the image processing part is shown in the figure), and can output the processed image signals to the control board CTB described below. When the liquid crystal display device 10 is connected to an external video playback device that is not shown, an image signal from the video playback device is inputted into the main board MB, and the main board MB can output the image signal to the control board CTB after processing the signal at the image processing part. The control board CTB has the function of converting the image signal inputted from the main board MB to a signal for driving liquid crystal, and supplying the converted signal for liquid crystal driving to the liquid crystal panel 11.

As shown FIG. 3, in the liquid crystal display unit LDU that constitutes a part of the liquid crystal display device 10, main constituting components thereof are housed in a space formed between the frame (front frame) 13 that constitutes the front exterior, and the chassis (rear chassis) 14 that constitutes the rear exterior. The main constituting components housed between the frame 13 and the chassis 14 include at least the liquid crystal panel 11, optical members 15, a light guide plate 16, and an LED unit (light source unit) LU. Of these, the liquid crystal panel 11, optical members 15, and light guide plate 16 are held by being sandwiched between the frame 13 on the front side and the chassis 14 on the rear side while being stacked one on top of the other. The backlight device 12 is constituted of the optical members 15, the light guide plate 16, the LED units LU, and the chassis 14, and is the configuration of the liquid crystal display unit LDU described above excluding the liquid crystal panel 11 and the frame 13. Two pairs of LED units LU, which constitute a part of the backlight device 12, are arranged along the longer side direction (X axis direction) of the light guide plate 16, and each pair is disposed at the respective sides across the light guide plate 16 in the shorter side direction (Y axis direction), that is, a total of four LED units LU are provided between the frame 13 and the chassis 14. The LED unit LU is constituted of the LEDs 17, which are the light source, an LED substrate (light source substrate) 18 on which the LEDs 17 are mounted, and a heat dissipating member (heat spreader, light source attachment member) 19 to which the LED substrate 18 is attached. The respective constituting components will be explained below.

As shown in FIG. 3, the liquid crystal panel 11 is formed in a horizontally long quadrangular shape (rectangular shape) in a plan view, and is configured by bonding a pair of glass substrates 11a and 11b having high light transmittance to each other with a prescribed gap therebetween, and by injecting liquid crystal between the two substrates 11a and 11b. Of the two substrates 11a and 11b, one on the front side (front surface side) is a CF substrate 11a, and the other on the rear side (rear surface side) is an array substrate 11b. In the array substrate 11b, switching elements (TFTs, for example) connected to source wiring lines and gate wiring lines that are intersecting with each other, pixel electrodes connected to the switching elements, an alignment film, and the like are provided. Specifically, a plurality of TFTs and pixel electrodes are aligned on the array substrate 11b, and around each of the TFTs and pixel electrodes, a plurality of gate wiring lines and source wiring lines are provided around each set of a TFT and a pixel electrode, the gate wiring lines and source wiring lines forming a grid pattern. Gate electrodes and source electrodes are respectively connected to the gate wiring lines and source wiring lines, and the pixel electrodes are connected to drain electrodes of the TFTs. Also, in the array substrate 11b, capacitance wiring lines (auxiliary capacitance wiring lines, storage capacitance wiring lines, Cs wiring lines) that are parallel to the gate wiring lines and that overlap the pixel electrodes in a plan view are provided, and the capacitance wiring lines and the gate wiring lines are aligned in the Y axis direction with respect to each other. On the other hand, in the CF substrate 11a, color filters having respective colored portions such as R (red), G (green), and B (blue) arranged in a prescribed pattern, an opposite electrode, an alignment film, and the like are provided. On the outer surfaces of the pair of substrates 11a and 11b (surfaces opposite to those facing the liquid crystal), polarizing plates 11c and 11d, which form a pair, are bonded. These polarizing plates 11c and 11d cover the central areas of the respective substrates 11a and 11b, and do not cover the outer areas (frame portion) surrounding the central areas. The polarizing plates 11c and 11d are specifically approximately 0.2 mm in thickness, for example.

Of the pair of substrates 11a and 11b constituting the liquid crystal panel 11, the array substrate 11b is larger than the CF substrate 11a in a plan view as shown in FIGS. 4 and 5, and the edges of the array substrate 11b protrude further out than the CF substrate 11a. Specifically, the array substrate 11b is made slightly larger than the CF substrate 11a such that the outer edges of the array substrate 11b protrude out from all of the outer edges of the CF substrate 11a. Of the pair of longer side edges of the outer edges of the array substrate 11b, the longer side edge towards the control substrate CTB in the Y axis direction (towards front of FIG. 3; left-side of FIG. 4) has a plurality of source-side terminals drawn from the source lines, and as shown in FIG. 3, source-side flexible substrates 26 (panel connecting members; source drivers) is connected to the source-side terminals. The plurality of source-side flexible substrates 26 are arranged at intervals in a direction along the longer side edge of the array substrate 11b, or in other words, in the X axis direction, and protrude from the longer side edge of the array substrate 11b toward the outside along the Y axis direction. On the other hand, each of the pair of shorter side edges of the outer edges of the array substrate 11b is provided with a plurality of gate-side terminals drawn from the gate wiring lines and the capacitance wiring lines, and each gate-side terminal is connected to a gate-side flexible substrate 28 (panel connecting member; gate driver). A plurality of gate-side flexible substrates 28 are aligned in the Y axis direction, or in other words, along the shorter side terminals of the array substrate 11b in an intermittent manner, and the gate-side flexible substrates 28 extend outward from the shorter side edges of the array substrate 11b in the X axis direction.

Each of the flexible substrates 26 and 28 has a film-shaped base member made of a synthetic resin material having insulating properties and flexibility (such as a polyimide resin) and a plurality of wiring patterns (not shown) formed on the base member, and the wiring patterns are connected to a driver DR for driving liquid crystal mounted near the center of the base member. One end of the source-side flexible substrates 26 is crimp-connected to the source-side terminals of the array substrate 11b, and the other end thereof is crimp-connected to terminals of a printed board 27, which will be explained later, through anisotropic conductive films (ACF), respectively. The printed substrate 27 is connected to the above-mentioned control substrate CTB through a wiring member that is not shown, and signals inputted from the control substrate CTB (scan signals to the gate wiring lines, data signals to the source wiring lines, capacitance signals to the capacitance wiring lines, and the like) can be transmitted to the source-side flexible substrates 26. On the other hand, one end of the gate-side flexible substrates 28 is crimp-connected to the gate-side terminals through an anisotropic conductive film. On the array substrate 11b, relay wiring lines (not shown) connect the source-side terminals and the gate-side terminals, and signals (scan signals to the gate wirings, capacitance signals to the capacitance wiring lines, and the like) are transmitted from the source-side flexible substrates 26 and the source-side terminals to the gate-side terminals and the gate-side flexible substrates 28 through the relay wiring lines. This way, in the liquid crystal panel 11, an image is displayed on the display surface DS based on the signals inputted from the control board CTB.

As shown in FIGS. 4 and 5, the liquid crystal panel 11 is stacked on the front side of the optical members 15 described below (side to which light is emitted), and the rear surface thereof (outer surface of a polarizing plate on the rear side) is in close contact with the optical members 15 with almost no gap. With this configuration, it is possible to prevent dust and the like from entering a space between the liquid crystal panel 11 and the optical members 15. The display surface DS of the liquid crystal panel 11 is constituted of a display region that is in the center of the surface and that can display images, and a non-display region that is in the outer edges of the surface and that is formed in a frame shape surrounding the display region. A display region in a display surface DS is almost the same size as the region where the polarizing plates 11c and 11d are disposed on the liquid crystal panel 11, or slightly smaller than this region. The non-display region is almost the same size as the region of the liquid crystal panel 11 where the polarizing plates 11c and 11d are not disposed, or slightly larger than this region. The terminals and the flexible substrates 26 and 28 are disposed in the non-display region.

As shown in FIG. 3, the optical members 15 have a horizontally-long quadrangular shape in a plan view similar to the liquid crystal panel 11, and the size thereof (short side dimensions and long side dimensions) is slightly smaller than that of the liquid crystal panel 11. The optical members 15 are stacked in layers to the front (towards direction of light emission; towards liquid crystal panel 11) of the light guide plate 16 to be described next, and the optical members 15 are sandwiched between the liquid crystal panel 11 and the light guide plate 16. Each of the optical members 15 is a sheet-shaped member made of a synthetic resin, and the optical members 15 are constituted of three sheets stacked together. The respective optical members 15 are greater in thickness than the polarizing plates 11c and 11d of the liquid crystal panel 11, and specifically are approximately 0.5 mm, for example. Specifically, the optical members 15 are constituted of a diffusion sheet 15a, a lens sheet 15b (prism sheet), and a reflective polarizing sheet 15c, in that order from the rear side (near the light guide plate 16). These sheet-shaped optical members 15 are made by injection molding or extrusion, for example. The three optical sheets 15a, 15b, and 15c are formed at approximately the same size in a plan view.

Of these, the diffusion sheet 15 disposed furthest to the rear (away from the direction of light emission; towards the light guide plate 16) has a plurality of diffusion particles dispersed within an almost transparent (with excellent light transmission) synthetic resin sheet-like base material, and has the function of diffusion light that passes therethrough. The lens sheet 15b disposed in the middle in the direction in which layers are stacked includes an almost transparent synthetic resin sheet-like base material and a prism layer layered onto the surface of the base material, and has the function of condensing the transmitted light. The front-most (towards direction of light emission; towards liquid crystal panel 11) reflective polarizing sheet 15c has a multilayer structure in which layers having different indices of refraction are stacked, for example, and the reflective polarizing sheet 15c lets through p-waves of the light from the light guide plate 16 and reflects s-waves back towards the light guide plate 16. The s-waves returned towards the light guide plate 16 are reflected to the front by a light guide reflective sheet 20 to be described below, and thus, return towards the reflective polarizing sheet 15c and are used, and thus, light usage rate (brightness) is excellent.

The light guide plate 16 is made of a synthetic resin (an acrylic resin such as PMMA or a polycarbonate, for example) with a refractive index sufficiently higher than air and almost completely transparent (excellent light transmission). The light guide plate 16 is made by extrusion of a synthetic resin, for example. As shown in FIG. 3, the light guide plate 16 has a horizontally-long quadrangular shape in a plan view, in a manner similar to the liquid crystal panel 11 and the optical members 15, and has a plate shape that is thicker than the optical members 15. The longer side direction on the plate surface of the light guide plate corresponds to the X axis direction, the shorter side corresponds to the Y axis direction, and the plate thickness direction intersecting the plate surface corresponds to the Z axis direction. As shown in FIGS. 4 and 5, the light guide plate 16 is larger than the liquid crystal panel 11 and the optical members 15 in a plan view (shorter side dimensions and longer side dimensions), and specifically, the light guide plate 16 is slightly larger than the liquid crystal panel 11 such that the outer sides (outer edges) of the light guide plate 16 protrude outward on all sides from the array substrate 11b of the liquid crystal panel 11. The light guide plate 16 is stacked on the rear side of the optical members 15, and is sandwiched between the optical members 15 and the chassis 14. The light guide plate 16 has a pair of LED units LU disposed at respective sides in the shorter side direction, thereby being interposed therebetween in the Y axis direction, and light from the LEDs 17 enters the respective shorter side edges of the light guide plate 16. The light guide plate 16 has the function of guiding therethrough light from the LEDs 17 that entered from the respective edges facing each other in the shorter side direction and emitting the light toward the optical members 15 (front side) while internally propagating this light. The reason that the light guide plate 16 is made larger than the liquid crystal panel 11 and the optical members 15 as described above is in order to ensure sufficient distance for light from the LEDs 17 to travel in the light guide plate 16, and thereby make it difficult for uneven brightness in the outputted light, and because outer edges of the light guide plate 16 are more susceptible to uneven brightness in outputted light compared to the central area thereof, which means that display quality diminishes if light from the outer edges is used in the display of images.

Of the plate surfaces of the light guide plate 16, the surface facing the front side (surface facing the optical members 15) is a light-emitting surface 16a that emits light from the interior toward the optical members 15 and the liquid crystal panel 11. Of the outer edge faces adjacent to the plate surface of the light guide plate 16, both edge faces of the light guide plate 16 in the long side direction along the X axis (both edge faces of the respective edges in the short side direction) are light receiving faces 16b that directly face the respective LEDs 22 (LED substrates 18) with prescribed gaps therebetween and that receive light emitted from the LEDs 22. The light receiving faces 16b are on a plane parallel to that defined by the X axis direction and the Z axis direction (plate surface of the LED substrate 18), and are substantially perpendicular to the light-emitting surface 16a. The direction at which the LEDs 17 and the light receiving faces 16b are aligned with respect to each other corresponds to the Y axis direction, and is parallel to the light exiting surface 16a. The light-receiving faces 16b face the LEDs 17 and thus are also referred to as the "LED-facing faces (light source-facing faces)." By contrast, of the outer edge faces adjacent to the plate surfaces of the light guide plate 16, the two edge faces (two edge faces on both ends in the longer side direction) in the shorter side direction that constitute shorter sides along the Y axis direction are non-LED-facing edge faces 16d (non-light source-facing edge faces) that do not face the LEDs 17.

As shown in FIGS. 4 and 5, the rear side of the light guide plate 16, or in other words, the plate face 16c opposite to the light-emitting surface 16a (surface facing the chassis 14) is provided with a light guide reflective sheet 20 (reflective member) that can reflect light radiated outside from the rear-side plate surface 16c back towards the front. In other words, the light guide reflective sheet 20 is sandwiched between the chassis 14 and the light guide plate 16. The light guide reflective sheet 20 is made of a synthetic resin, and the surface thereof is a highly reflective white. As shown in FIG. 4, in the light guide reflective sheet 20, at least the shorter side dimensions thereof are greater than the shorter side dimensions of the light guide plate 16, and both edges protrude further towards the LEDs 17 than the light-receiving faces 16b of the light guide plate 16. With the protruding portions (both longer side edges) of the light guide reflective sheet 20, light that travels diagonally from the LEDs 17 towards the chassis 14 can be reflected efficiently, thereby directing the light toward the light receiving faces 16b of the light guide plate 16. At least one of either the light-emitting surface 16a or the plate surface 16c opposite thereto of the light guide plate 16 is patterned so as to have reflective parts (not shown) that reflect internal light or scattering parts (not shown) that scatter internal light in a prescribed planar distribution. These parts control the light so that light exiting from the light-emitting surface 16a will have a uniform planar distribution.

Next, configurations of the LEDs 17, the LED substrates 18, and the heat dissipating members 19 that constitute the LED unit LU will be explained in this order. As shown in FIGS. 3 and 4, the LEDs 17 of the LED units LU have a configuration in which an LED chip is sealed with a resin on a substrate part that is affixed to the LED substrate 18. The LED chip mounted on the substrate part has one type of primary light-emitting wavelength, and specifically, only emits blue light. On the other hand, the resin that seals the LED chip has a fluorescent material dispersed therein, the fluorescent material emitting light of a prescribed color by being excited by the blue light emitted from the LED chip. This combination of the LED chips and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. Each of the LEDs 17 is of a so-called top-emitting type in which the side opposite to that mounted onto the LED substrate 18 (side facing the light-receiving surface 16b of the light guide plate 16) is the primary light-emitting surface.

As shown in FIGS. 3 and 4, the LED substrates 18 of the LED units LU are each formed in a narrow plate shape that extends along the longer side direction (X axis direction, longitudinal direction of the light-receiving surface 16b) of the light guide plate 16, and are housed between the frame 13 and the chassis 14 such that each plate surface thereof is parallel to the X axis direction and the Z axis direction, or in other words, in parallel with the light-receiving surfaces 16b of the light guide plate 16 The length dimension of the LED substrate 18 is about half of the longer side dimension of the light guide plate 16. On the inner plate surfaces of the respective LED substrates 18, or in other words, on the plate surfaces facing the light guide plate 16 (surfaces opposing the light guide plate 16), the LEDs 17 having the above-mentioned configuration are mounted, and these surfaces are mounting surfaces 18a. On the mounting surfaces 18a of the LED substrates 18, a plurality of LEDs 17 are arranged in a row (in a line) along the length direction (X axis direction) at prescribed intervals. That is, a plurality of LEDs 17 are arranged at intervals along the longer side direction on the respective longer edges of the backlight device 12. The intervals between respective adjacent LEDs 17 along the X axis direction are substantially equal to each other, or in other words, the LEDs 17 are arranged at substantially the same pitch. The arrangement direction of the LEDs 17 corresponds to the length direction (X axis direction) of the LED substrates 18. Wiring patterns (not shown) made of a metal film (copper foil or the like) are formed on the mounting surface 18a of each of the LED substrates 18, and these wiring patterns extend along the X axis direction and go across the group of LEDs 17 to connect the adjacent LEDs 17 in series. Terminals formed at both respective edges of these wiring patterns connect to the power supply board PWB through a wiring member such as a connector or cable and supply driving power to each of the LEDs 17. Because the pair of LED substrates 18 disposed across the light guide plate 16 is housed between the frame 13 and the chassis 14 such that the respective mounting surfaces 18a for the LEDs 17 face each other, the primary light-emitting surfaces of the respective LEDs 17 that are mounted on the respective LED substrates 18 of each pair face each other, and the optical axis of each LED 17 substantially coincides with the Y axis direction. The base member of the LED substrate 18 is made of a metal such as aluminum, for example, and the above-described wiring pattern (not shown) is formed on the surface via an insulating layer. The base material of the LED substrates 18 can alternatively be formed of an insulating material such as a ceramic.

As shown in FIGS. 3 and 4, the heat dissipating member 19 of the LED unit LU is made of a metal such as aluminum, for example, that has excellent heat conductivity. The heat dissipating member 19 is constituted of an LED attachment section (light source attachment section) 19a to which the LED substrate 18 is attached, and a heat dissipating section 19b that makes surface-to-surface contact with the plate surface of the chassis 14, and these two sections form a bent shape having a substantially L-shaped cross section. The length dimension of the heat-dissipating member 19 is substantially the same as the length dimension of the LED substrate 18. The LED attachment portion 19a of the heat-dissipating member 19 is in a plate shape that runs parallel to the surface of the LED substrate 18 and the light-receiving surface 16b of the light guide plate 16, and the longer side direction corresponds to the X axis direction, the shorter side direction corresponds to the Z axis direction, and the thickness direction corresponds to the Y axis direction, respectively. The inner surfaces of the LED attachment section 19a, namely the surfaces facing the light guide plate 16, have LED substrates 18 attached respectively thereto. While the longer side dimensions of the LED attachment section 19a are substantially similar to the longer side dimensions of the LED substrate 18, the shorter side dimensions of the LED attachment section 19a are greater than the shorter side dimensions of the LED substrate 18. The respective edges of the LED attachment section 19a in the shorter side direction protrude outward beyond the respective edges of the LED substrate 18 along the Z axis direction. The outer surface of the LED attachment portion 19a, that is, the surface opposite to the surface on which the LED substrate 18 is attached faces a screw-receiving section 21 (fixing member attachment portion) of the frame 13, which will be later described. In other words, the LED attachment section 19a is interposed between the screw-receiving section 21b of the frame 13 and the light guide plate 16. The LED attachment section 19a is upright towards the front in the Z axis direction (direction in which the liquid crystal panel 11, the optical members 15, and the light guide plate 16 overlap) from the end towards the interior of the heat-dissipating section 19b to be described later, or in other words, the end towards the LEDs 17 (light guide plate 16).

As shown in FIGS. 3 and 4, the heat dissipating section 19b is formed in a plate shape that is parallel to the surface of the chassis 14, and the longer side direction corresponds to the X axis direction, the shorter side direction corresponds to the Y axis direction, and the thickness direction corresponds to the Z axis direction, respectively. The heat dissipating section 19b protrudes from the rear edge, or in other words, the edge closer to the chassis 14, of the LED attachment section 19a towards the outside, or in other words, in the direction opposite to the light guide plate 16. The longer side dimension of the heat-dissipating portion 19b is substantially the same as that of the LED attachment portion 19a. The rear surface of the heat dissipating section 19b, or in other words, the surface facing the chassis 14, makes surface-to-surface contact with the surface of the chassis 14. On the surface of the chassis 14, the front plate surface of the heat-dissipating section 19b, or in other words, the plate surface opposite to the surface in contact with the chassis 14 faces the screw-receiving section 21 in the frame 13 and is in contact with a protruding end fact of the screw-receiving section 21. In other words, the heat-dissipating section 19b is sandwiched between the screw-receiving section 21 of the frame 13 and the chassis 14. Due to this, heat generated by the LEDs 17 is transmitted towards the chassis 14 and the frame 13 having the screw-receiving section 21 through the LED substrate 18, LED attachment section 19a, and heat dissipating section 19b, thereby effectively dissipating the heat to outside of the liquid crystal display device 10 and making it difficult for the heat to be trapped inside. The heat dissipating section 19b is configured to be attached to the screw-receiving section 21b by a screw SM (fixing member), and has an insertion hole 19b1 for the screw SM to be inserted therethrough.

Next, the configurations of the frame 13 and the chassis 14 that constitute the exterior member and the holding member HM will be explained. The frame 13 and the chassis 14 are both made of a metal such as aluminum, for example, and have higher mechanical strength (rigidity) and heat conductivity as compared with the case in which the frame 13 and the chassis 14 are made of a synthetic resin. In other words, the material constituting the frame 13 and the chassis 14 is a light-shielding material having light-shielding properties. As shown in FIG. 3, the frame 13 and the chassis 14 hold the liquid crystal panel 11, the optical members 15, and the light guide plate 16, which are stacked on top of the other, by sandwiching these stacked components from the front side and the rear side, while housing the pair of LED units LU on the respective edges in the shorter side direction (respective longer side edges).

As shown in FIG. 3, the frame 13 is formed in a horizontally-long frame shape as a whole so as to surround the display region on the display surface DS of the liquid crystal panel 11. The frame 13 is constituted of a panel pressing portion 13a that is parallel to the display surface DS of the liquid crystal panel 11 and presses down the liquid crystal panel 11 from the front, and a side wall 13b that protrudes towards the rear from the outer edge of the panel pressing portion 13a, and the frame 13 has a substantially L-shape in a cross-sectional view. Of these, the panel pressing portion 13a has a horizontally long frame-shape along the outer edge of the liquid crystal panel 11 (non-display region; frame portion), and can press almost the entire outer edge of the liquid crystal panel 11 from the front. The panel pressing portion 13a has a width that allows it to cover from the front not only the outer edges of the liquid crystal panel 11 but also the outer edges of the light guide plate 16 that protrude further out in the radial directions than the outer edges of the liquid crystal panel 11, and the respective LED units LU. The outer surface of the panel pressing portion 13a facing the front (surface opposite to that facing the liquid crystal panel 11) is exposed in the front outer portion of the liquid crystal display device 10 in the same manner as the display surface DS of the liquid crystal panel 11, and, like the display surface DS of the liquid crystal panel 11, is a portion of the front surface of the liquid crystal display device 10. On the other hand, the side walls 13b take the form of a substantially angular enclosure that rises from the outer edges (specifically, the outer edges) of the panel pressing portion 13a toward the rear side. The side walls 13b can enclose the liquid crystal panel 11, the optical members 15, the light guide plate 16, and the LED units LU that are housed therein along almost the entire periphery thereof, and also can enclose the chassis 14 on the rear side along almost the entire periphery thereof. The outer surfaces of the side walls 13b along the circumference direction of the liquid crystal display device 10 are exposed to the outside in the circumference direction of the liquid crystal display device 10, and constitute the top face, the bottom face, and the side faces of the liquid crystal display device 10.

Figure 8:
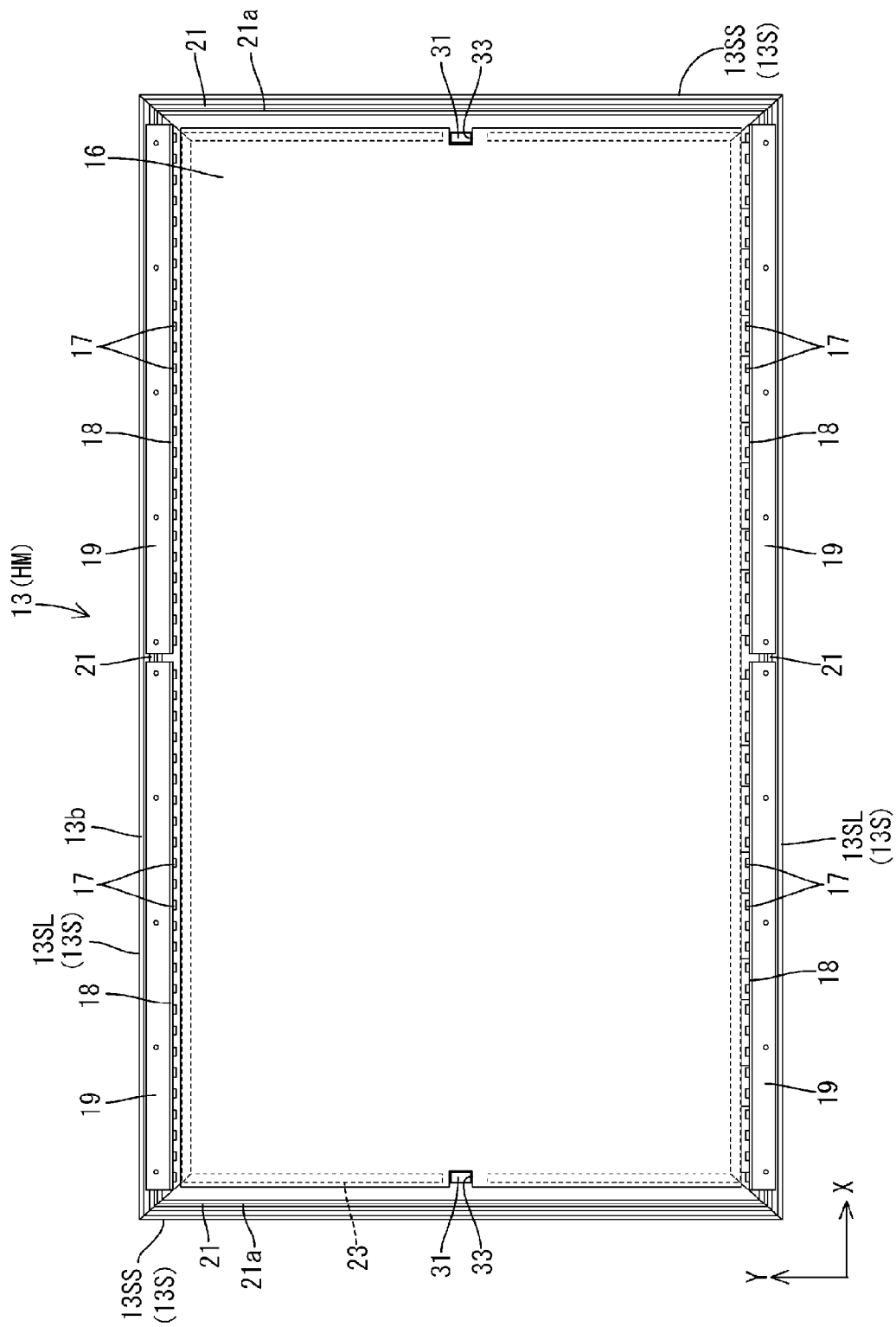
FIG. 8 is a rear view showing a state in which optical members and a light guide plate are installed on a frame.

As shown in FIG. 8, the frame-shaped frame 13 having the basic structure described above is constituted of four divided frames 13S provided for each side of the frame (longer sides and shorter sides). Specifically, the divided frames 13S include a pair of longer side divided frames 13SL constituting respective longer side portions of the frame 13 (panel pressing portions 13a and side walls 13b) and a pair of shorter side divided frames 13SS that constitute the shorter sides. The longer side divided frames 13SL are made of a prismatic material extending in the X axis direction and having an L-shaped cross-section, whereas the shorter side divided frames 13SS are made of a prismatic material extending in the Y axis direction and having an L-shaped cross-section. In this manner, when manufacturing the respective divided frames 13S, it is possible to adopt a manufacturing method such as extrusion of a metal, for example, and thus, it is possible to reduce the manufacturing cost compared to a case in which a whole frame-shaped frame 13 is made by carving it to shape. Each longer side divided frame 13SL and each shorter side divided frame 13SS adjacent to each other are connected to each other at the ends in the respective extension directions, thus forming the frame-shaped frame 13. The respective ends that are connecting portions (seams of the frame 13) between the longer side divided frames 13SL and the shorter side divided frames 13SS have, as shown in FIG. 8, a diagonal shape with respect to the X axis direction and the Y axis direction in a plan view, and specifically, the connecting portions go along a line that ties together the inner edges and outer edges of the respective angular portions of the panel pressing portions 13a. The longer side divided frames 13SL are formed to be wider than the shorter side divided frames 13SS (refer to FIG. 5), which do not cover the LED units LU, due to the fact that the longer side divided frames 13SL cover the respective LED units LU in addition to the liquid crystal panel 11, the optical members 15, and the light guide plate 16 (refer to FIG. 4).

As shown in FIGS. 4 and 5, screw-receiving sections 21 (fixing member-receiving sections) that receive screws SM (fixing members) are formed integrally with a portion of the panel pressing portion 13a further inside than the side wall 13b. The screw-receiving sections 21 protrude towards the rear in the Z axis direction from the inner surface of the panel pressing portion 13a, and have a substantially block shape that is horizontally long and extends along the respective sides (X axis direction or Y axis direction) of the panel pressing portions 13a. The screw-receiving sections 21 are respectively provided on the sides of the panel pressing portions 13a, and each of them is the same length as the respective sides. As shown in FIG. 8, the screw-receiving sections 21 are divided for each of the divided frames 13S constituting the frame 13, and when the divided frames 13S are assembled together, the screw-receiving portions 21 form a connected frame shape along the entire inner surface of the angular side walls 13b. As shown in FIGS. 4 and 5, the screw-receiving sections 21 have formed therein grooves 21a that are open towards the rear and into which it is possible to screw in the screws SM. The grooves 21a are formed along almost the entire length of the screw-receiving sections 21, and the width thereof is slightly smaller than the shaft of the screws SM. In the Z axis direction, the screw-receiving section 21 is interposed between the panel pressing portion 13a of the frame 13 and the chassis 14. A prescribed gap is provided between the screw-receiving section 21 in the longer side direction and the heat-dissipating member 19 and LED attachment section 19a constituting the LED unit LU disposed further to the inside than the screw-receiving section 21, and this gap is a substrate housing gap BS in which it is possible to house a printed board 27 (FIG. 4). The printed board 27 also has a connector to which one end of the FPC is inserted and connected (neither the connector nor FPC is shown in the figures), and the other end of the FPC is led out to the outside on the rear side of the chassis 14 through an FPC insertion hole (not shown) formed in the chassis 14, and is connected to the control board CTB.

A portion of the panel pressing portion 13a further inside than the screw attaching portion 21 is, as shown in FIGS. 4 and 5, provided with a light guide plate supporting portion 23 that is interposed between the panel pressing portion 13a and the outer edge of the light guide plate 16 and that supports the light guide plate 16 from the front. The light guide plate supporting portions 23 respectively protrude towards the rear (light guide plate 16) along the Z axis direction (direction in which the screw-receiving section 21 protrudes) from the inner surfaces of the respective sides of the panel pressing portions 13a. The light guide plate supporting portions 23 are respectively provided on the sides of the panel pressing portions 13a, and each of them is the same length as the respective sides. As shown in FIG. 8, the light guide plate supporting portions 23 are provided for the respective divided frames 13S that constitute the frame 13, and when the respective divided frames 13S are assembled together, the light guide plate supporting portions 23 form a substantially frame shape along the entire panel pressing part 13a (light guide plate 16).

As shown in FIGS. 4 and 5, the light guide plate supporting portions 23 are disposed in a position that overlaps the outer edges of the light guide plate 16 that protrude further out than the liquid crystal panel 11 in a plan view (as seen from the display surface DS), and the protruding tip faces thereof are in contact with the front surface of the light guide plate 16, or in other words, the light-emitting surface 16a, at the outer edge thereof. Thus, the light guide plate supporting portions 23 can support the light guide plate 16 against the chassis 14 to be described later from the front (from the display surface DS side). The light guide plate 16 is pressed from the front by the light guide plate supporting portions 23 having outer edges that general form a substantially frame shape. In other words, the light guide plate supporting portions 23 press almost the entire outer edge of the light guide plate 16 while having a planar shape that extends along the outer edge (respective edges) of the light guide plate 16. The longer side portions of the outer edge of the light guide plate 16 in contact with the light guide plate supporting portions 23 are where the light-receiving surfaces 16b facing the LEDs 17 are present, and thus, by supporting the light guide plate 16 by the light guide plate supporting portions 23, it is possible to maintain a stable positional relation in the Z axis direction between the LEDs 17 and the light-receiving faces 16b. Also, as a result of the light guide plate supporting portion 23 being in contact with the light guide plate 16, the space to the interior thereof (the space adjacent to the edge of the liquid crystal panel 11) and the space to the exterior thereof (the space adjacent to the outer edge of the light guide plate 16) are separate, which has the function of preventing light from moving between these two spaces. In the light guide plate supporting portion 23 has a plurality of flexible substrate insertion grooves (not shown) into which the respective flexible substrates 26 and 28 are inserted, in portions that overlap the flexible substrates 26 and 28 in a plan view.

As shown in FIGS. 4 and 5, in the inner edge of the panel pressing portion 13a, a pressing protrusion 24 protruding toward the rear side, or in other words, toward the liquid crystal panel 11 is formed integrally with the panel pressing portion 13a. A buffer member 24a is attached to the protrusion end face of the pressing protrusion 24, and the pressing protrusion 24 can press the liquid crystal panel 11 via the buffer member 24a from the front side. As shown in FIG. 8, the pressing protrusion 24 and the buffer member 24a are separately formed for each side of the separated frames 13S that constitute the frame 13, extending therein, in a manner similar to the screw attaching portion 21, and when the separated frames 13S are assembled together, the pressing protrusion 24 and the buffer member 24a form a frame shape disposed over the entire frame 13, at the inner edge of the panel pressing portion 13a.

On the other hand, as shown in FIG. 3, the chassis 14 is formed in a substantially shallow plate shape that is horizontally long as a whole so as to almost entirely cover the light guide plate 16, the LED units LU, and the like from the rear side. The rear outer surface of the chassis 14 (surface opposite to the side facing the light guide plate 16 and the LED units LU) is exposed to the outside on the rear side of the liquid crystal display device 10, and constitutes the rear surface of the liquid crystal display device 10. The chassis 14 has a bottom plate 14a formed in a horizontally-long quadrangular shape as in the light guide plate 16, and a pair of LED housing portions (light source housing portions) 14b that protrude from the respective longer side edges of the bottom plate 14a toward the rear side in a step-like shape and that house the LED units LU, respectively.

As shown in FIGS. 3 and 4, the bottom plate 14a has a flat plate shape that can receive a large portion of the light guide plate 16 in the shorter side direction (portion excluding both edges in the shorter side direction), and thus, the bottom plate 14a constitutes a receiving part for the light guide plate 16. As shown in FIG. 5, both edges of the bottom plate 14a in the longer side direction respectively extend further outside than both ends of the light guide plate 16 in the longer side direction, and constitute a pair of screw installing portions 14a1 (fixing member installing portions) to which the screws SM (fixing members) for fixing the frame 13 to the chassis 14 are installed from outside.

As shown in FIGS. 3 and 4, the LED housing portions 14b are disposed at the respective sides of the bottom plate 14a in the shorter side direction, and can house the LED units LU therein by being recessed toward the rear side from the bottom plate 14a. The LED housing portions 14b are constituted of screw installing portions 14b1 (fixing member installing portions) that are parallel to the bottom plate 14a and to which the screws SM are installed from the outside, and a pair of side plates 14b2 that rise up from both respective edges of the screw installing portions 14b1. Of the pair of side plate portions 14b2, the inner side plate portion 14b2 is continuous with the bottom plate 14a. On the screw installing portion 14b1 in the LED housing portion 14b, the heat dissipating section 19b of the heat dissipating member 19 of the LED unit LU is disposed so as to make surface-to-surface contact with the inner surface of the screw installing portion 14b1. Also, the outer side plate 14b2 in the LED housing portion 14b has the function of fixing the chassis 14 to the frame 13 in the Y axis direction by being inserted in the gap between the longer side screw attaching portion 21 and the side wall 13b.

Figure 6:
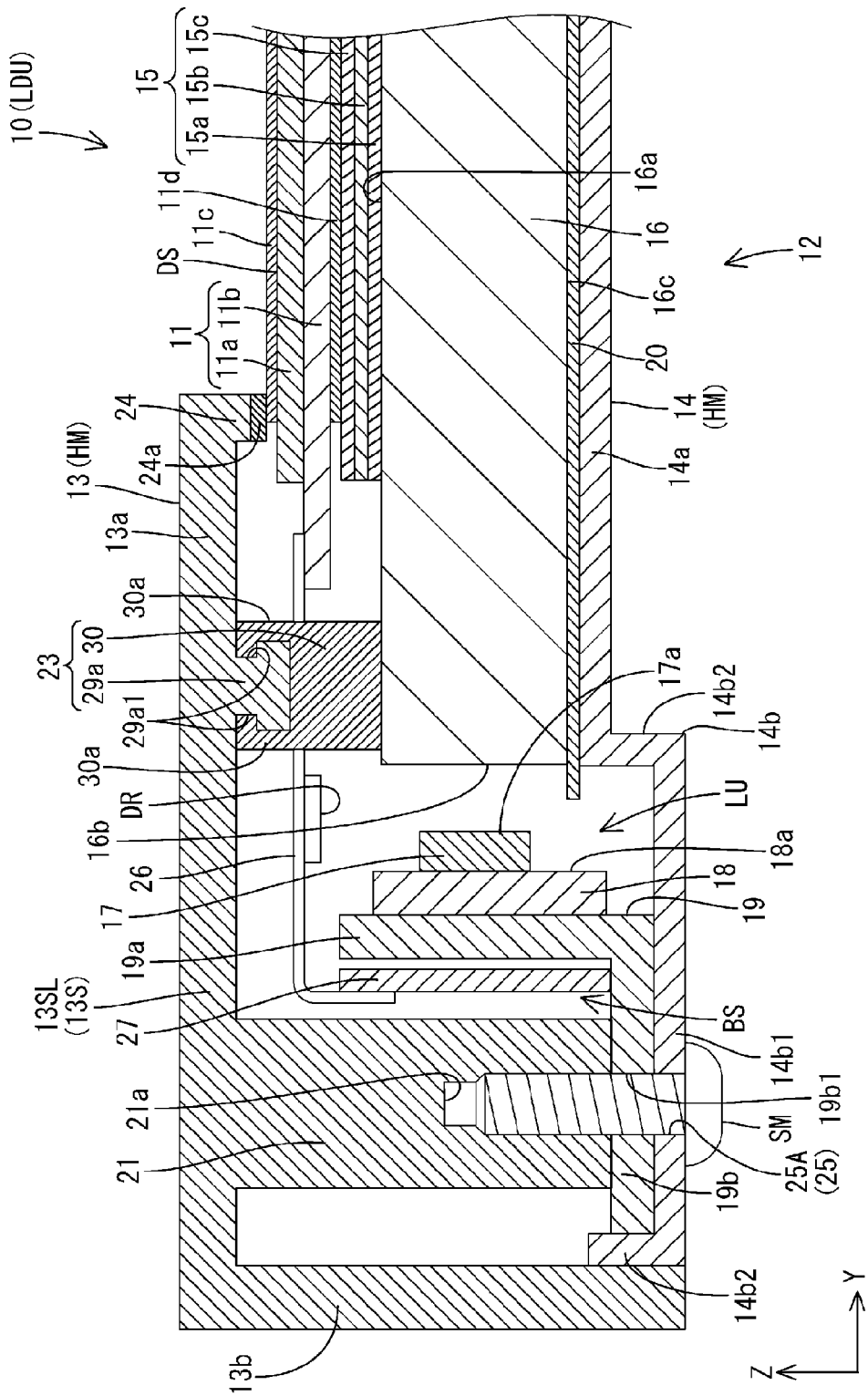
FIG. 6 is an enlarged cross-sectional view showing a cross-sectional configuration of the liquid crystal display device along the shorter side direction, at a joint screw hole.
Figure 7:
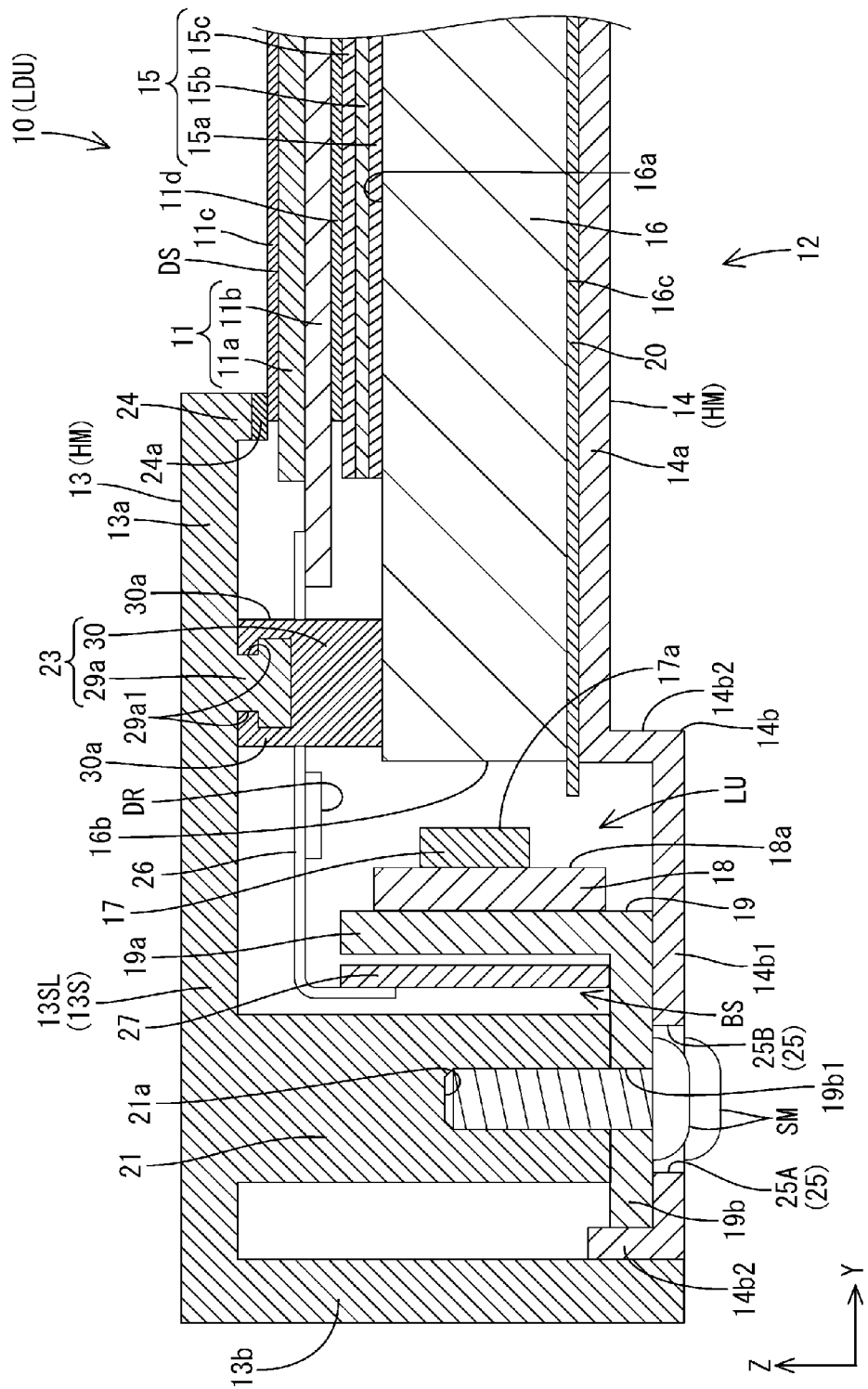
FIG. 7 is an enlarged cross-sectional view showing a cross-sectional configuration of the liquid crystal display device along the shorter side direction, at a screw hole for a heat-dissipating member.

In this manner, as shown in FIG. 3, on the longer side portions of the outer edge portions of the chassis 14 of the present embodiment, the pair of screw installing portions 14b1 that constitute the LED housing portion 14b are respectively formed, and on the shorter side portions, the pair of screw installing portions 14a1 that constitute the bottom plate portion 14a are respectively formed. A plurality of screw holes 25 through which the screws SM are inserted are formed respectively in the pair of screw installing portions 14a1 in the bottom plate 14a and the pair of screw installing portions 14b1 in the LED housing portion 14b. The respective screw installing portions 14a1 and 14b1 are disposed so as to overlap the screw attaching portion 21 of the frame 13, and the respective screw insertion holes 25 formed in the screw installing portions 14a1 and 14b1 are continuous with the grooves 21a of the screw attaching portions 21. Therefore, the screws SM are inserted through the screw insertion holes 25 along the Z axis direction (direction in which the liquid crystal panel 11, the optical members 15, and the light guide plate 16 overlap) from the rear of the chassis 14 (side thereof opposite to the display surface DS side), and the screws SM are screwed into the grooves 21a of the screw attaching portion 21 while sandwiching the screw installing portions 14a1 and 14b1. When the screws SM are screwed in, spiral grooves of the screws are formed in the grooves 21a by the screw threads in the shafts of the screws SM. The screw insertion holes 25 formed in the pair of screw installing portions 14b1 in the LED housing portion 14b have a joint screw insertion hole 25A that is of a size through which only the shaft of the screw SM fits, as shown in FIG. 6, and a heat-dissipating member insertion hole 25B through which both the shaft and the head of the screw SM can fit. The screw SM that passes through the joint screw insertion hole 25A is attached to the screw attaching portion 21 while joining together the heat-dissipating portion 19b and the screw installing portions 14b1, whereas the screw SM that passes through the heat-dissipating member insertion hole 25B attaches only the heat-dissipating portion 19b to the screw attaching portion 21.

The light guide plate supporting parts 23 provided in the frame 13 will be explained here again. As shown in FIGS. 4 and 5, the light guide plate supporting parts 23 are constituted of an integrally formed portion 29 that is integrally formed with the metal frame 13, and a subframe 30 (separate portion) made of synthetic resin and attached to the integrally formed portion 29 as a portion separate from the frame 13. The integrally formed portion 29 protrudes towards the rear in the Z axis direction from the panel pressing portion 13a of the frame 13 and has a substantially frame shape in a plan view. The subframe 30 has a substantially gate shape in a plan view by extending along three sides of the substantially frame-shaped integrally formed portion 29 to the exclusion of a prescribed side, and the subframe 30 is attached from the rear to the three sides that constitute the integrally formed portion 29. Therefore, the substantially frame-shaped integrally formed portion 29 has a portion attached to the subframe 30 and a portion not attached to the subframe 30. Specifically, a pair of shorter sides and one longer side that overlap the flexible substrates 26 and 28 in a plan view are lower portions 29a to which the subframe 30 is attached and that constitute the light guide plate supporting portion 23, whereas the longer side that does not overlap the respective flexible substrates 26 and 28 (longer side shown on the left of FIG. 4) has no subframe 30 attached thereto, and is a higher portion 29b that is alone and constitutes the light guide plate supporting portion 23. Of the lower portions 29a constituting the integrally formed portion 29, both side faces of the protruding base edge from the panel pressing portion 13a have formed therein stopping grooves 29a1 for attaching the subframe 30 (refer to FIG. 6). The subframe 30 has a substantially square rod shape wider than the lower portions 29a in the integrally formed portion 29, and both edges thereof in the width direction that intersects with the extension direction thereof have formed therein a pair of stopping pieces 30a having stopping tabs on the tips thereof, that extend towards the front (towards the lower portions 29a). The stopping pieces 30a are fixed to the stopping grooves 29a1 mentioned above, and thus, the subframe 30 is held to the integrally formed portion 29 (frame 13).

Figure 10:
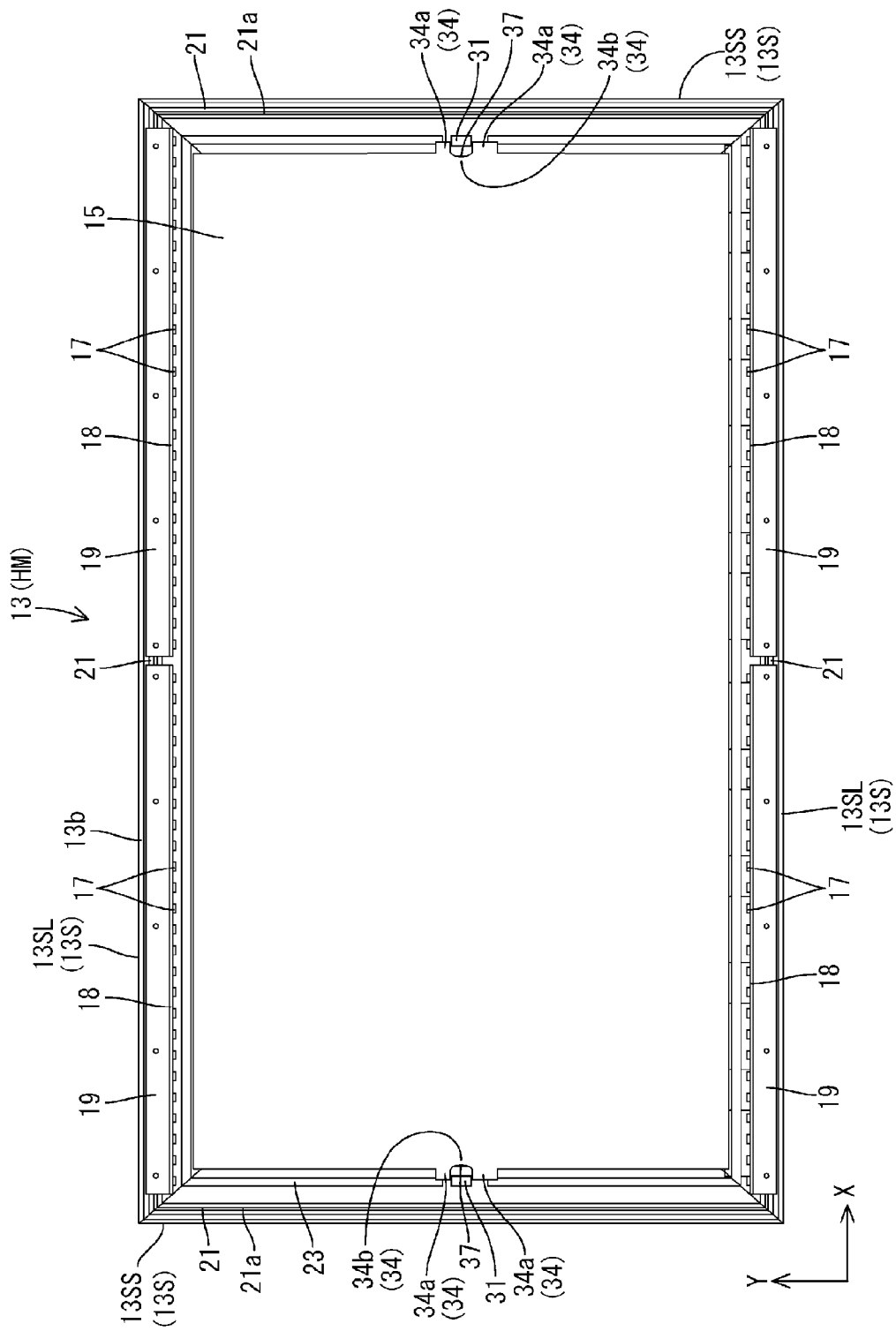
FIG. 10 is a rear view showing a state in which optical members are installed on a frame.
Figure 12:
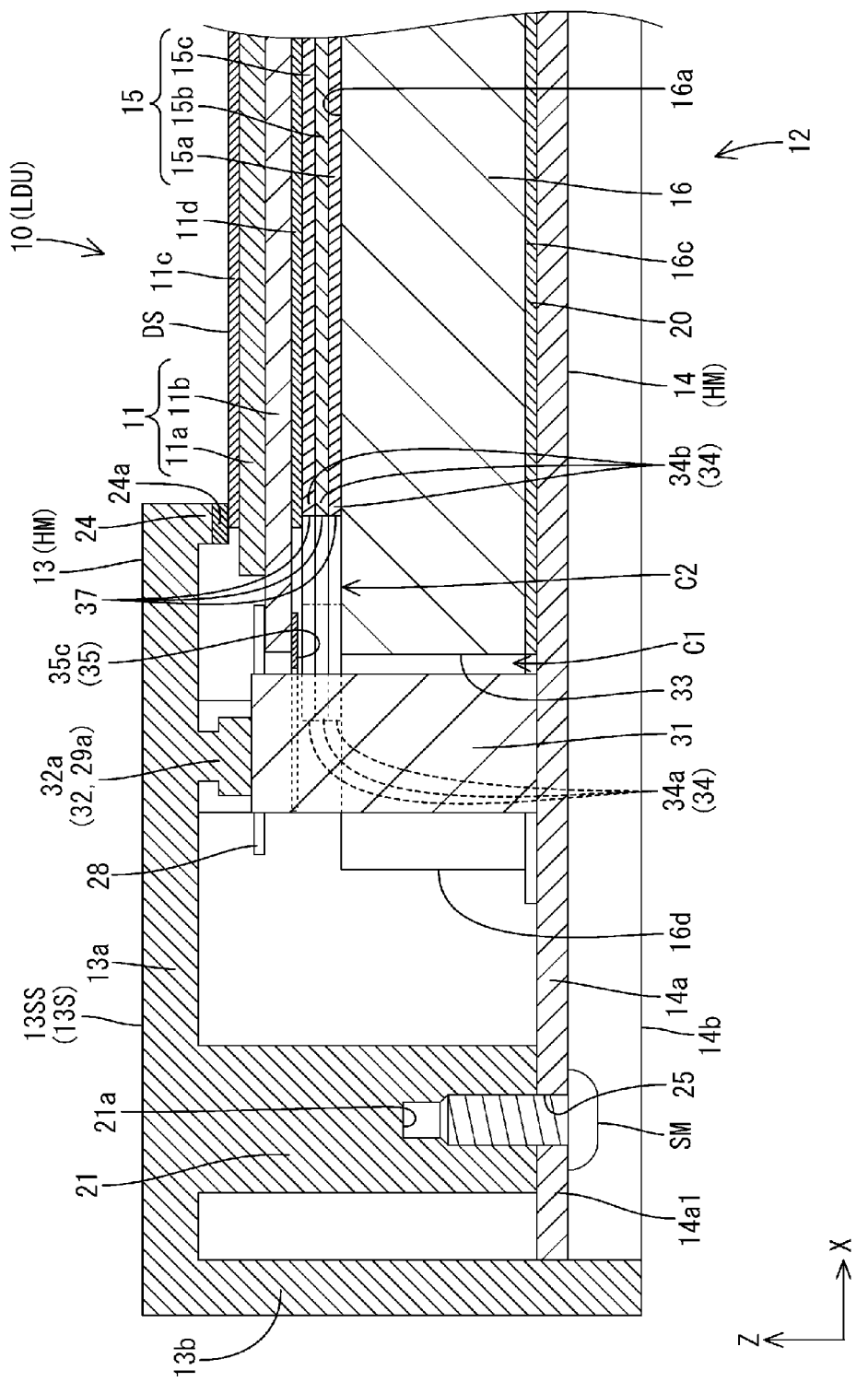
FIG. 12 is a cross-sectional view of FIG. 11 along the line xii-xii.
Figure 14:
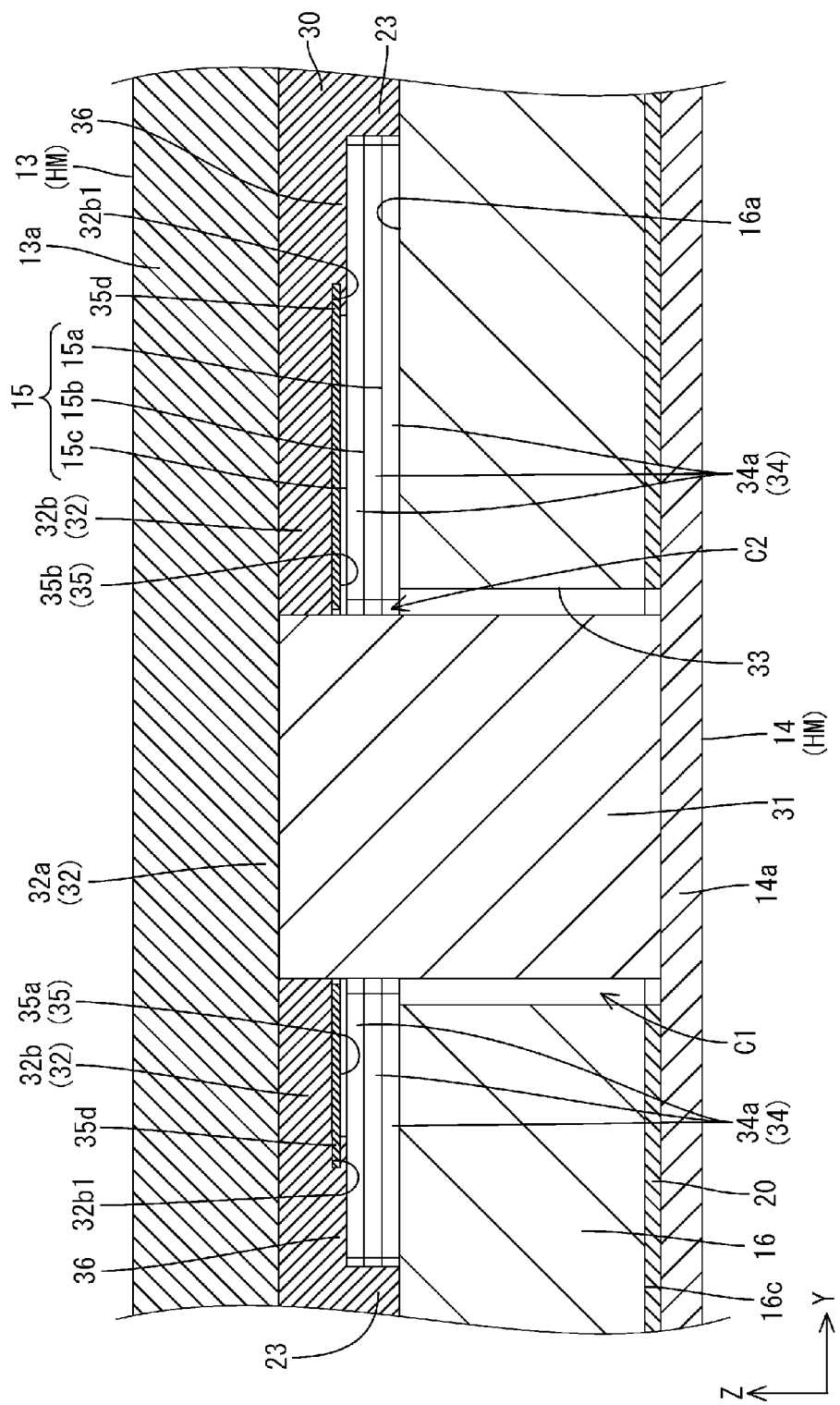
FIG. 14 is a cross-sectional view of FIG. 11 along the line xiv-xiv.

The central portions in the extension direction of the pair of shorter sides in the light guide plate supporting portions 23 are, as shown in FIGS. 8 and 10, formed lower, and thus, are the attaching portions 32 to which positioning members 31 for fixing in place the optical members 15 and the light guide plate 16 are attached. In other words, the attaching portions 32 are continuous with the light guide plate supporting portions 23. Specifically, as shown in FIGS. 12 and 14, the attaching portion 32 is constituted of the central portions along the extension direction of the pair of shorter sides of the lower portion 29a of the integrally formed portion 29 and the pair of shorter sides of the subframe 30, and in particular, the positioning members 31 can be directly attached to the lower portions 29a by removing the subframe 30, and this position is a positioning member attachment portion 32a. Below, the positioning structure for the optical members 15 and the light guide plate 16 that includes the positioning member 31 will be described in detail.

The positioning structure for the optical members 15 and the light guide plate 16 includes a first to-be-positioned portion 33 (to-be-positioned portion) on an edge of the light guide plate 16, a second to-be-positioned portion 34 on an edge of the respective optical members 15, and a positioning member 31 that positions the optical members 15 and the light guide plate 16 in a direction along the respective plate surfaces (X axis direction and Y axis direction) by having the frame 13 attached thereto and fitting the first to-be-positioned portion 33 and the second to-be-positioned portion 34 therein. This positioning structure is arranged so as to form a pair along the pair of shorter sides of the edges of the optical members 15 and the light guide plate 16. The second to-be-positioned portion 34 is provided for all three optical members 15a to 15c, having a similar shape and size thereto.

Figure 9:
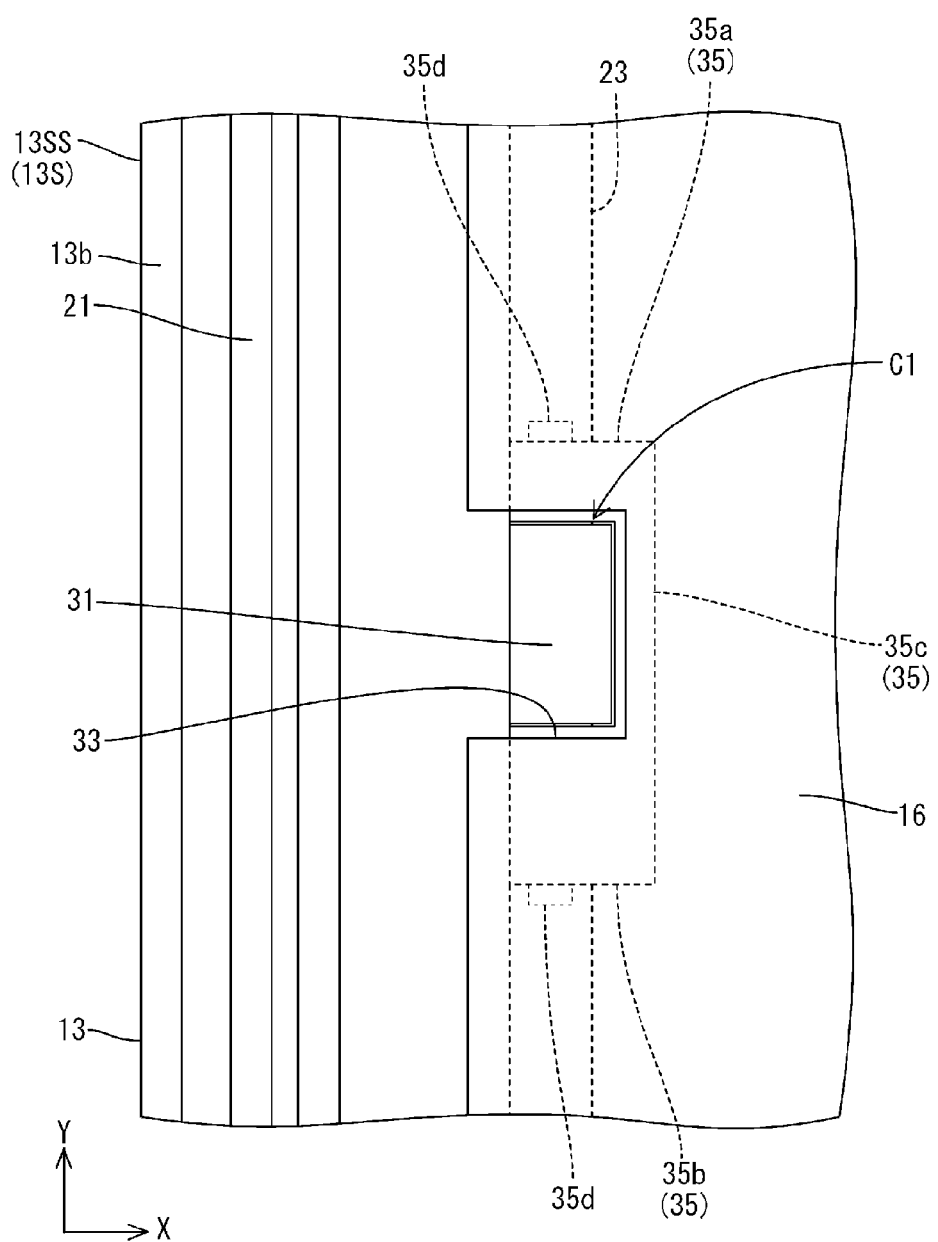
FIG. 9 is an enlarged rear view in the vicinity of a position fixing structure of FIG. 8.
Figure 11:
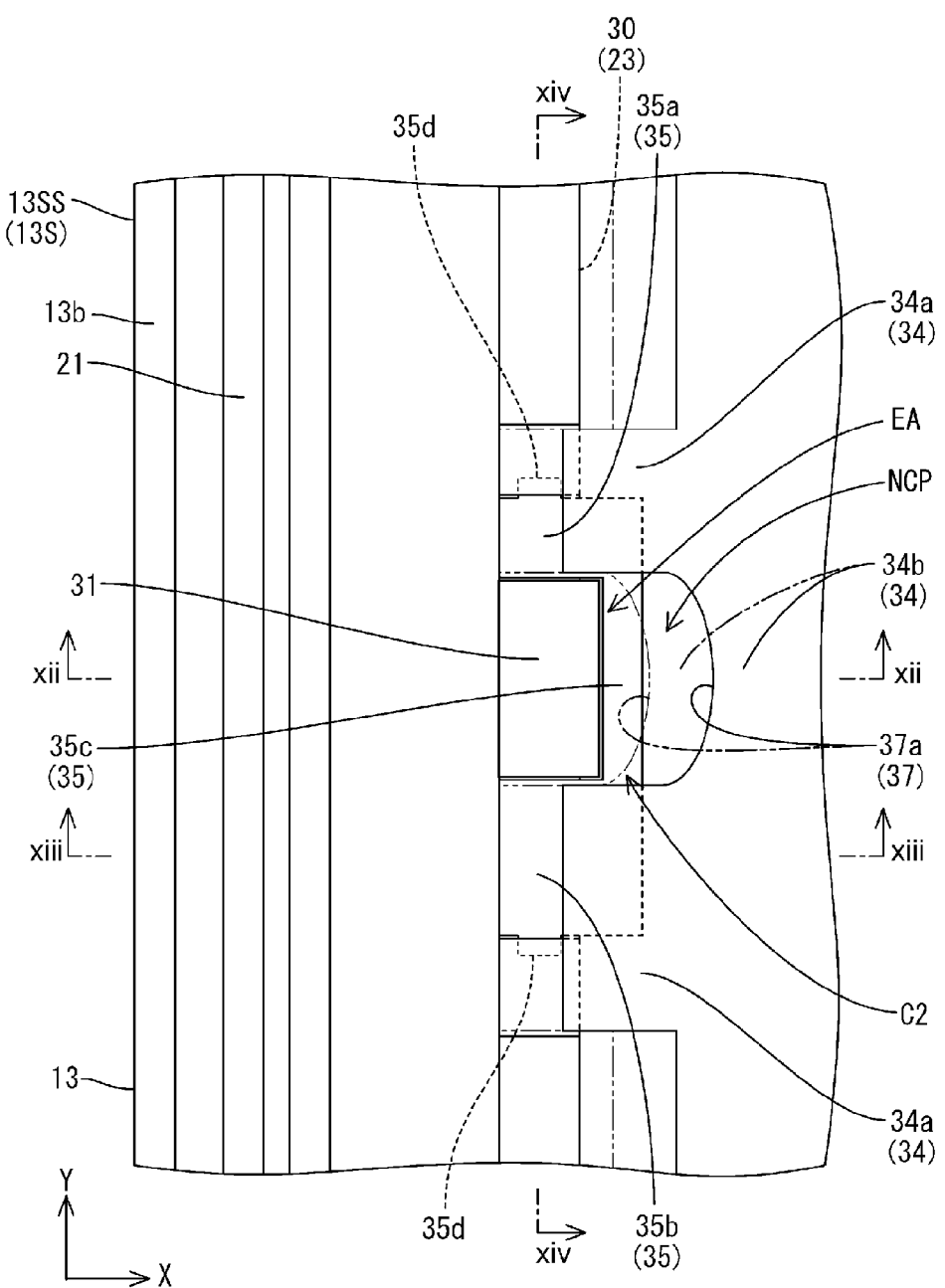
FIG. 11 is an enlarged rear view in the vicinity of a position fixing structure of FIG. 10.

The positioning member 31 is made of a metal similar to the frame 13, and as shown in FIGS. 9 and 11, has a substantially block shape that is a vertically long rectangle in a plan view. As shown in FIGS. 12 and 14, the positioning member 31 is fixed by a welding, screws, or the like, for example, to the positioning member attachment portion 32a of the attaching portion 32 that includes the lower portion 29a of the integrally formed portion 29 in the frame 13. In other words, the positioning portion 31 is directly fixed to the frame 13 and thus, is held in position at a high degree of precision. The positioning member 31 faces the first to-be-positioned portion 33 and the second to-be-positioned portion 34 into which inner side faces of the outer surface along the longer side direction (Y axis direction) and a pair of side faces along the shorter side direction (X axis direction) fit, and the positioning member 31 is in contact with the first positioning portion 33 and the second to-be-positioned portion 34, and thus, can fix these in place in the X axis direction and the Y axis direction. The positioning member 31 has a larger width (dimension in the shorter side direction) than the light guide plate supporting portion 23, and the inner side faces along the longer side direction are disposed further inside than the inner side faces of the light guide plate supporting portion 23.

As shown in FIGS. 8 and 9, there is a pair of first to-be-positioned portions 33 disposed for each of the centers in the length direction (Y axis direction) of the pair of shorter side edges, and these first to-be-positioned portions 33 penetrate the light guide plate 16 in the thickness direction thereof (Z axis direction), and are open towards the side (X axis direction). In other words, the first to-be-positioned portion 33 is formed as a recess by removing portions of the light guide plate 16 that are the non-LED-facing edge faces 16d. The first to-be-positioned portion 33 has a vertically long rectangular shape in a plan view, and the longer side dimensions and the shorter side dimensions are respectively slightly larger than the longer side dimensions and shorter side dimensions of the positioning portions 31, thus allowing the positioning portions 31 to fit in the first to-be-positioned portions 33 with ease. The dimensional relationship between the first to-be-positioned portion 33 and the positioning portion 31 is designed to allow for thermal expansion of the light guide plate 16. The first to-be-positioned portion 33 has a side face along the longer side direction thereof (Y axis direction) and a pair of side faces along the shorter side direction thereof (X axis direction), these side faces facing and being in contact with the positioning portion 31 that is fit therein. Thus, the light guide plate 16 is held in position in directions along the plate surface thereof (X axis direction and Y axis direction). As for specific methods of forming the first to-be-positioned portion 33, the shorter side edges of the plate shaped light guide plate 16, which is formed of resin by injection molding, are cut, for example.

As shown in FIGS. 10 and 11, a pair of second to-be-positioned portions 34 is provided respectively in the central portions in the extension direction (Y axis direction) of the pair of shorter side edges of the optical members 15. The second to-be-positioned portions 34 include: a pair of protrusions 34a that protrude towards the side in the longer side direction (X axis direction) from the edge face of the optical members 15 along the shorter side direction; and a bridging portion 34b that is interposed between the pair of protrusions 34a of the shorter side edge of the optical members 15 and that bridges the pair of protrusions 34a. The pair of protrusions 34a both have a vertically long rectangular shape in a plan view, but when comparing the respective longer side dimensions, the lower protrusion 34a in FIG. 11 is larger than the upper protrusion 34a in the same drawing. In other words, the second to-be-positioned portions 34 are asymmetrical in the up-and-down direction in FIG. 11, and as a result, when assembling, it is possible to determine the orientation of the optical members 15, and thus, it is possible to prevent misalignment. The region surrounded by the pair of protrusions 34a and the bridging portion 34b have a vertically long rectangular shape in a plan view, and this constitutes a fitting region EA into which the positioning portion 31 is fit. In this manner, the second to-be-positioned portion 34 is formed as a recess. In the second to-be-positioned portion 34, the longer side dimension and the shorter side dimension of the fitting region EA thereof are respectively slightly larger than the longer side dimension and shorter side dimension of the positioning portion 31, thus allowing the positioning portion 31 to fit in the first to-be-positioned portion 33 with ease. The dimensional relationship between the second to-be-positioned portion 34 and the positioning portion 31 is designed to allow for thermal expansion of the optical members 15. The respective edge faces of the pair of protrusions 34a and the bridging portion 34b facing the fitting region EA face and contact the positioning portion 31 that has been fitted therein, and thus, the optical members 15 are positioned in directions along the plate surface (X axis direction and Y axis direction). Of these, the edge face of the bridging portion 34b is disposed further to the inside (in a direction opposite to the positioning portion 31) than the edge face of the optical members 15 along the shorter side direction.

As shown in FIG. 9, the first to-be-positioned portion 33 for the light guide plate 16 is formed so as to be larger than the positioning portion 31 of the frame 13, and thus, when the first to-be-positioned portion 33 and the positioning portion 31 are fitted together, a gap C1 is formed between the edge faces thereof. On the other hand, the first to-be-positioned portion 33 is formed by removing a portion of the edge of the light guide plate 16, and thus, compared to the outer edge face of the light guide plate 16 (non-LED-facing edge face 16d), light from the LEDs 17 that propagates inside the light guide plate 16 more easily enters the edge face of the first to-be-positioned portion 33, which increases the susceptibility of the edge face of the first to-be-positioned portion 33 to light leakage. If the light that has leaked from the edge face of the first to-be-positioned portion 33 enters the gap C1 formed with the positioning portion 31, there is a concern that this light would enter directly into the edge (particularly the edge face) of the liquid crystal panel 11.

In the present embodiment, as shown in FIGS. 9, 12, and 14, a light-shielding sheet 35 (light-shielding member) is interposed between the light guide plate 16 and the liquid crystal panel 11 in the Z axis direction, and covers at least a portion of the gap C1 formed between the positioning portion 31 and the first to-be-positioned portion 33 in the X axis direction and the Y axis direction. The surface of the light-shielding sheet 35 is colored black, for example, and thus, is a synthetic resin with excellent light absorbency, and has a sheet shape (film shape) thinner than the optical members 15 and the polarizing plates 11c and 11d. The light shielding sheet 35 can have a configuration in which a light-shielding material is coated or printed onto the surface of a synthetic resin transparent sheet, for example, or a sheet material made of a light-shielding material can be used. The thickness of the light-shielding sheet 35 specifically is approximately 0.1 mm, for example.

As shown in FIG. 9, the light-shielding sheet 35 is disposed so as to surround the respective surfaces of the positioning portion 31 facing the to-be-positioned portions 33 and 34 in a plan view, and the plan view shape of the light-shielding sheet 35 is a substantially gate shape. The light-shielding sheet 35 covers from the front the entire gap C1 formed between the positioning portion 31 and the first to-be-positioned portion 33, and has a size that allows it to cover a prescribed range outside the gap C1. Thus, the light-shielding sheet 35 can reliably block light that has leaked through the gap C1 from the first to-be-positioned portion 33 of the light guide plate 16, and thus, it is possible to reliably prevent light leakage towards the edge of the liquid crystal panel 11. The light-shielding sheet 35 includes a first portion 35a and a second portion 35b that are parallel to the pair of side faces of the positioning portion 31 in the shorter side direction (X axis direction) in a plan view, and a third portion 35c that is parallel to the inner side face along the longer side direction (Y axis direction) and that connects inner edges of the first portion 35a and the second portion 35b. In the light-shielding sheet 35, the second portion 35b has a larger Y axis direction dimension than the first portion 35a, and overall, the light-shielding sheet 35 is asymmetrical in the up-and-down direction in FIG. 9. As a result, when attaching the light-shielding sheet 35, it is possible to determine the alignment of the light-shielding sheet 35 with ease, and it is possible to prevent it is possible to prevent misalignment.

Figure 13:
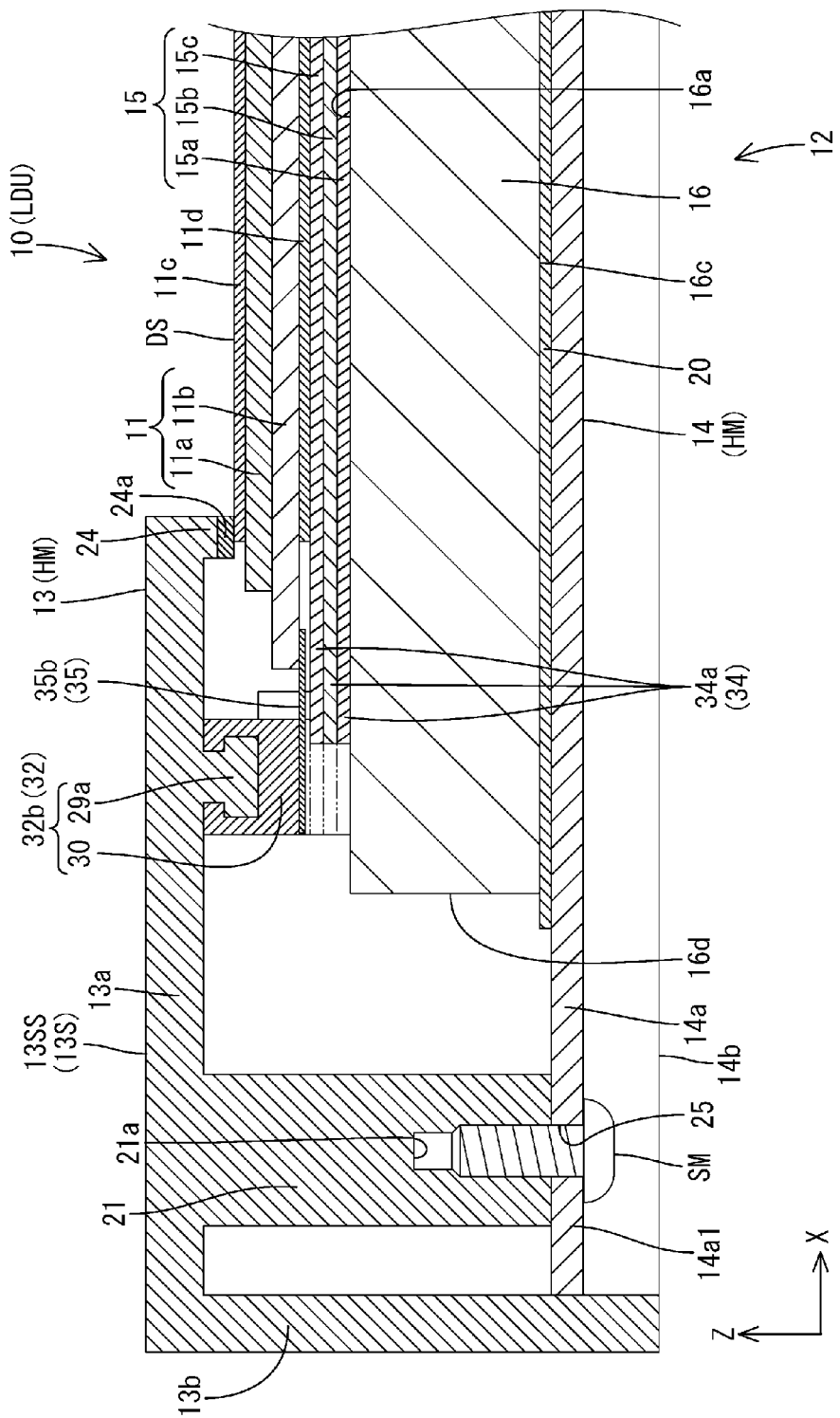
FIG. 13 is a cross-sectional view of FIG. 11 along the line xiii-xiii.

As shown in FIGS. 11, 12, and 14, the light-shielding sheet 35 is interposed between the optical members 15 and the liquid crystal panel 11 in the Z axis direction, and covers at least a portion of a gap C2 formed between the positioning portion 31 and the second to-be-positioned portion 34 in the X axis direction and the Y axis direction. As a result, light that has leaked from the first to-be-positioned portion 33 in the light guide plate 16 can be suitably blocked from leaking into the edge of the liquid crystal panel 11 through the gap C2. The gap C2 between the positioning portion 31 and the second to-be-positioned portion 34 has a sufficient size such that the edge face of the bridging portion 34b of the second to-be-positioned portion 34 does not interfere, especially in the X axis direction (longer side direction of the optical members 15), with the positioning portion 31 when the optical members 15 thermally expand. FIGS. 11 to 13 show by two-dot-chain lines the outer shape of the optical members 15 when they have thermally expanded to the maximum degree. The gap C2 is greater in the X axis direction than the gap C1. Thus, the light-shielding sheet 35 is disposed so as to cover from the front a portion of the gap C2 formed between the positioning portion 31 and the second to-be-positioned portion 34, and the remaining area between the edge face of the bridging portion 34b side of the third portion 35c (opposite to the positioning portion 31) and the edge face of the bridging portion 34b of the second to-be-positioned portion 34 is a non-covered portion NCP that is not covered by the light-shielding sheet 35. The inner edge portion of the first portion 35a and the second portion 35b of the light-shielding sheet 35 is disposed to the front of the respective protrusions 34a of the second to-be-positioned portions 34 of the optical members 15 so as to overlap these in a plan view (FIGS. 11 and 13). The entire length of the inner edge portion (including the third portion 35c) of the light-shielding sheet 35 is disposed so as to cover from the rear the edge of the shorter side of the array substrate 11b of the liquid crystal panel 11. As a result, light can be prevented from directly entering the edge of the liquid crystal panel 11, and in particular, the edge face thereof.

As shown in FIGS. 13 and 14, the light-shielding sheet 35 is attached to the attaching portion 32 of the frame 13 along with the positioning portion 31. Specifically, the subframe 30 remains at both portions of the attaching portion 32 sandwiching the positioning portion attaching portion 32a (positioning portion 31) in the Y axis direction, the subframe 30 being positioned higher than the lower portion 29*a* (positioning portion attaching portion 32*a*), and this portion is a light-shielding sheet attaching portion 32*b* to which the light-shielding sheet 35 is attached. The side face of the light-shielding sheet attaching portion 32*b* has formed therein a pair of holding grooves 32*b*1, and holding pieces 35*d* that protrude outward from the edge faces of the first portion 35*a* and the second portion 35*b* of the light-shielding sheet 35 are inserted into the holding grooves 32*b*1, thus allowing the light-shielding sheet 35 to be held in place. The light-shielding sheet 35 attached to the light-shielding sheet attaching portion 32*b* is held in position between the optical members 15 and the liquid crystal panel 11 in the Z axis direction, and more specifically, the light-shielding sheet 35 overlaps the polarizing plate 11*d* of the liquid crystal panel 11 in the Z axis direction (FIG. 13). Such an arrangement is possible due to the fact that the light-shielding sheet 35 is thinner than the polarizing plate 11*d*. The inner edge face of the light-shielding sheet 35 and the edge face of the polarizing plate 11*d* face each other with a prescribed gap therebetween (FIG. 13). Also, the subframe 30 is provided with a protruding portion supporting portion 36 that supports the protrusion 34*a* that constitutes the second to-be-positioned portion 34 of the optical members 15 (FIG. 14). While the protruding portion supporting portion 36 is positioned higher than the light-shielding sheet attaching portion 32*b* in the Z axis direction, it is positioned lower than the light guide plate supporting portion 23.

As described above, the non-covered portion NCP remains between the inner edge face of the third portion 35*c* included in the light-shielding sheet 35 and the edge face of the bridging portion 34*b* of the second positioning portion 34. If either or both of the light-shielding sheet 35 and the optical members 15 were to undergo deformation such as warping, and the third portion 35*c* and the bridging portion 34*b* were to overlap in the Z axis direction, then if the optical members 15 undergo thermal expansion, the edge face of the bridging portion 35*b* might interfere with the edge face of the third portion 35*c*. At this time, if the edge face of the bridging portion 35*b* is caught on the edge face of the third portion 35*c*, the light-shielding sheet 35, which is relatively thin and is not stiff, is turned up, which results in the risk that the light-shielding sheet 35 cannot cover the gaps C1 and C2. In the present embodiment, as shown in FIG. 11, the edge face of the bridging portion 34*b*, which is a portion sandwiched between the pair of protrusions 34*a* of the second to-be-positioned portion 34, is provided with an inclined portion 37 having an inclined shape with respect to the edge face of the third portion 35*c* of the light-shielding sheet 35, which is the other side. The inclined portion 37 has an arced surface 37*a* that has a shallow arc shape that is recessed inward towards the optical members 15 in a plan view, and a tangent line on an appropriate point on the curved surface is inclined with respect to the edge face of almost the entire third portion 35*c*. The inclined portion 37 is symmetrical in the up-and-down direction as shown in FIG. 11. In the entire area besides the central portion, the inclined portion 37 intersects at two points with a line parallel to the edge face of the third portion 35*c*, or in other words, the line along the Y axis direction. Thus, if the optical members 15 thermally expands and the edge face of the second to-be-positioned portion 34 at the bridging portion 34*b* interferes with the edge face of the third portion 35*c* of the light-shielding sheet 35, then both edge faces come into contact at two points, but do not come into contact along a line, and thus, are not susceptible to becoming stuck on the light-shielding sheet 35. As a result, the light-shielding sheet 35 is less susceptible to unwanted deformation such as turning up, and therefore, it is possible to maintain a state in which the light-shielding sheet 35 covers the gaps C1 and C2 to maintain the light-shielding function thereof.

Figure 15:
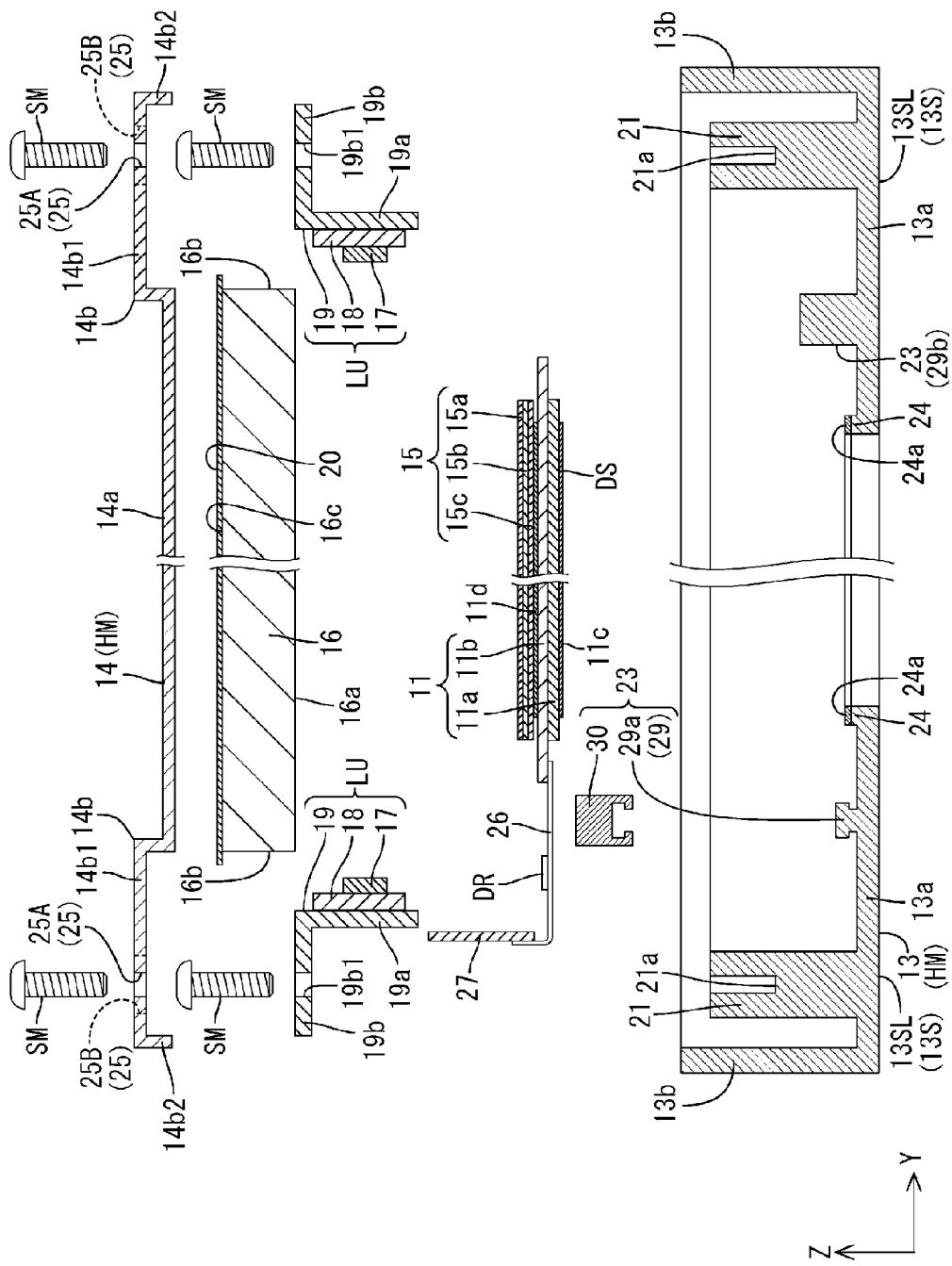
FIG. 15 is a cross-sectional view showing a cross-sectional configuration of the liquid crystal display device along the shorter side direction, the figure illustrating assembly steps for respective constituting components of a liquid crystal display unit in the liquid crystal display device.
Figure 16:
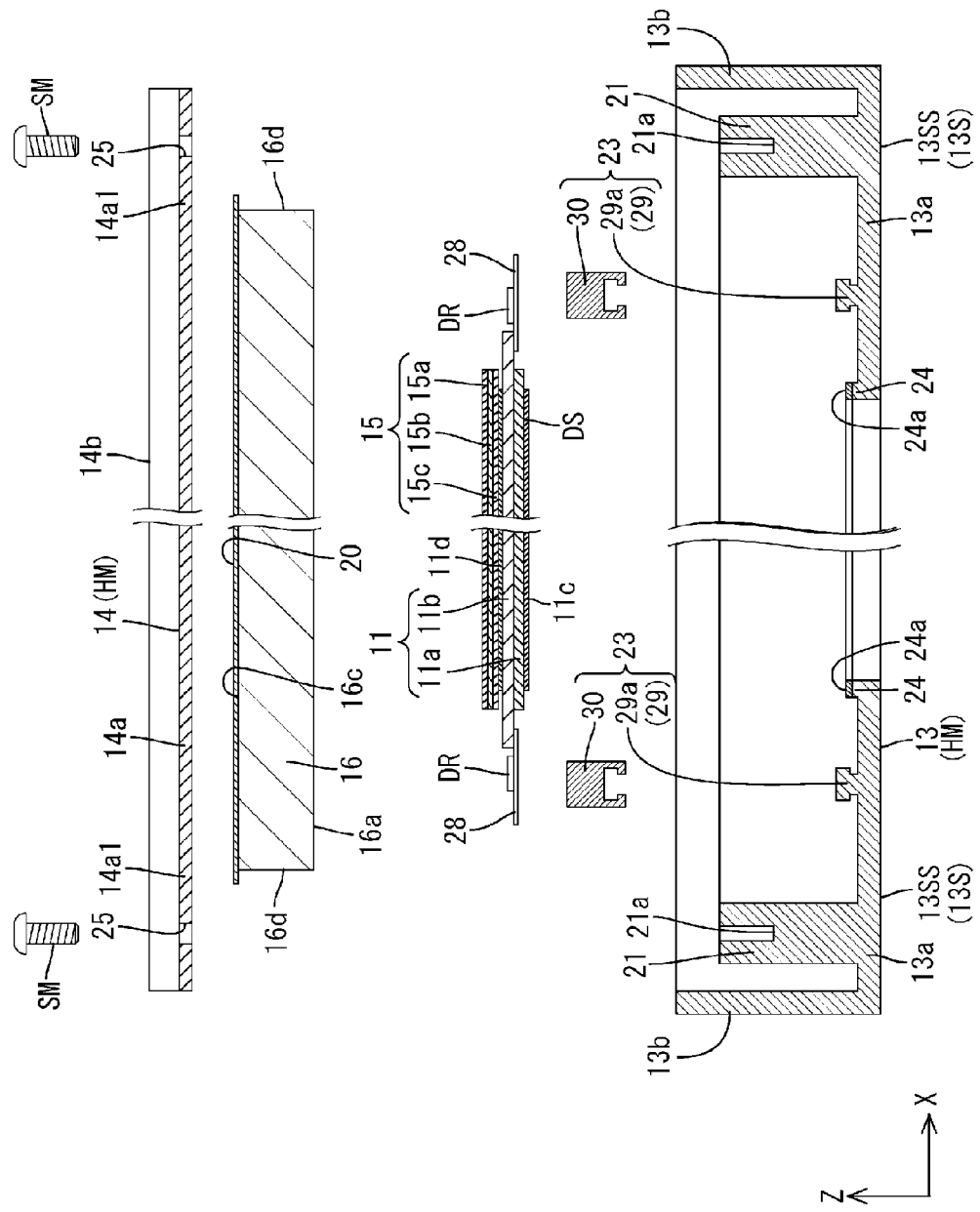
FIG. 16 is a cross-sectional view showing a cross-sectional configuration of the liquid crystal display device along the longer side direction, the figure illustrating assembly steps for respective constituting components of a liquid crystal display unit in the liquid crystal display device.

The present embodiment has the above-mentioned structure, and the operation thereof will be explained next. The liquid crystal display device 10 is manufactured by assembling respective constituting components that are manufactured separately (frame 13, chassis 14, liquid crystal panel 11, optical members 15, light guide plate 16, LED units LU, and the like) together. In the assembly process, the respective constituting components are assembled after being flipped over with respect to the Z axis direction from the position shown in FIGS. 4 and 5. First, as shown in FIGS. 15 and 16, the frame 13 among the constituting components is set on a not-shown work table such that the rear side thereof faces up in the vertical direction. The frame 13 is formed in a frame-shape overall by assembling together the four divided frames 13S in advance.

As shown in FIGS. 15 and 16, the liquid crystal panel 11 has the source-side flexible substrate 26 and the printed board 27 connected to one longer side edge thereof and the gate-side flexible substrate 28 connected to both shorter side edges thereof in advance before being brought to the assembly process. The liquid crystal panel 11 is assembled to the frame 13 set as described above such that the CF substrate 11*a* is on the lower side in the vertical direction and the array substrate 11*b* is on the upper side in the vertical direction. At this time, as shown in FIG. 15, the printed board 27 is attached to the screw attaching portion 21 such that a plate surface of the printed board 27 is disposed along a surface of the screw attaching portion 21 facing the liquid crystal panel 11, the screw attaching portion 21 being on the longer side of the frame 13. Thus, the source-side flexible substrate 26 has a bend therein to form a substantially L shape. The front surface of the liquid crystal panel 11 is received by the buffer members 24*a* attached to the pressing protrusions 24 of the frame 13 to absorb shock. Then, the subframe 30, the positioning portion 31, and the light-shielding sheet 35 are assembled to the frame 13. The positioning portion 31 and the light-shielding sheet 35 can be assembled to the frame 13 before assembly to the liquid crystal panel 11.

Figure 17:
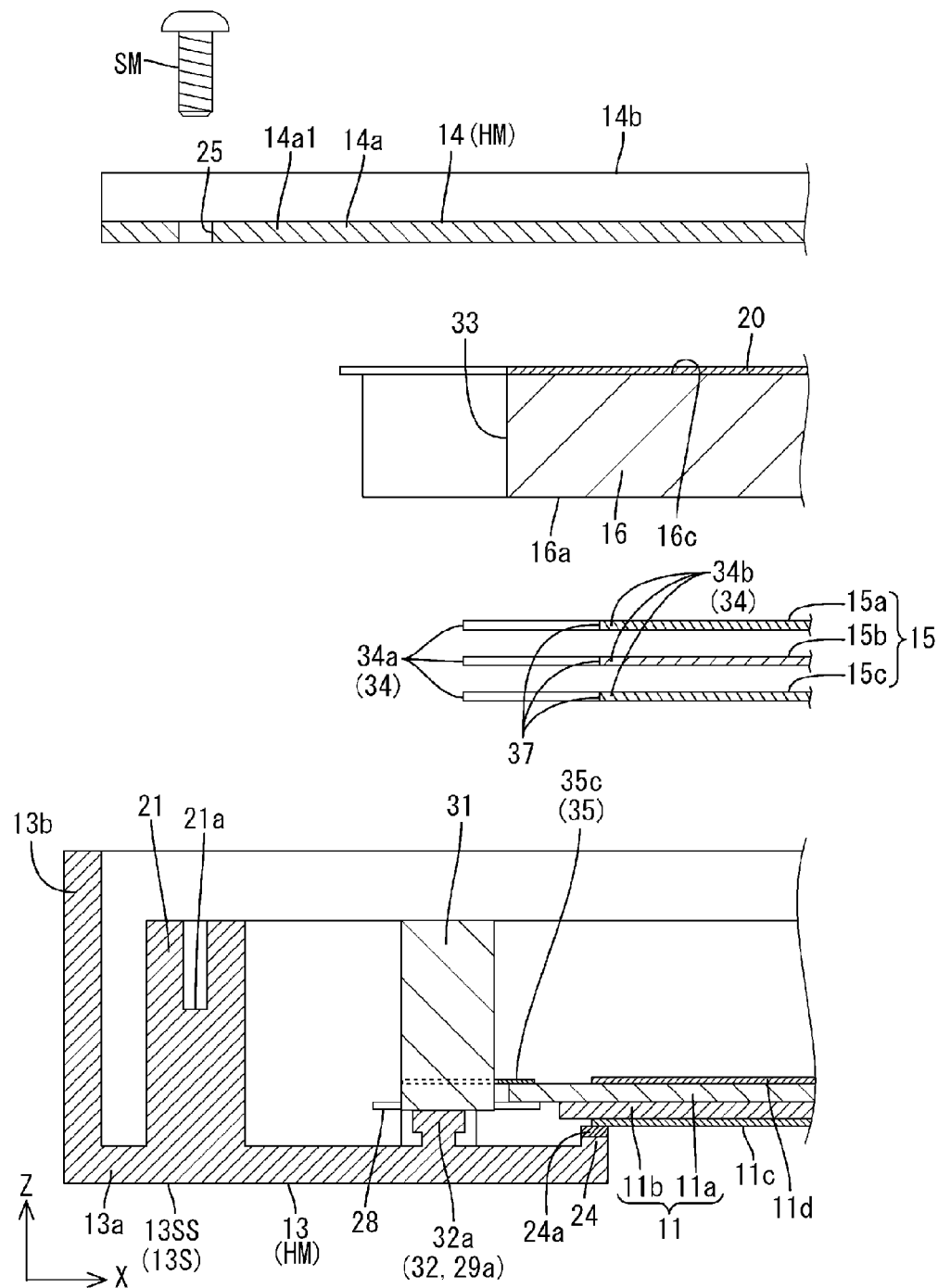
FIG. 17 is a cross-sectional view of FIG. 11 along the line xii-xii showing a state prior to the optical members, the light guide plate, a light guide reflective sheet, and a chassis being fixed to a frame fixed to a subframe, a positioning member, a light-shielding sheet, and a liquid crystal panel.
Figure 18:
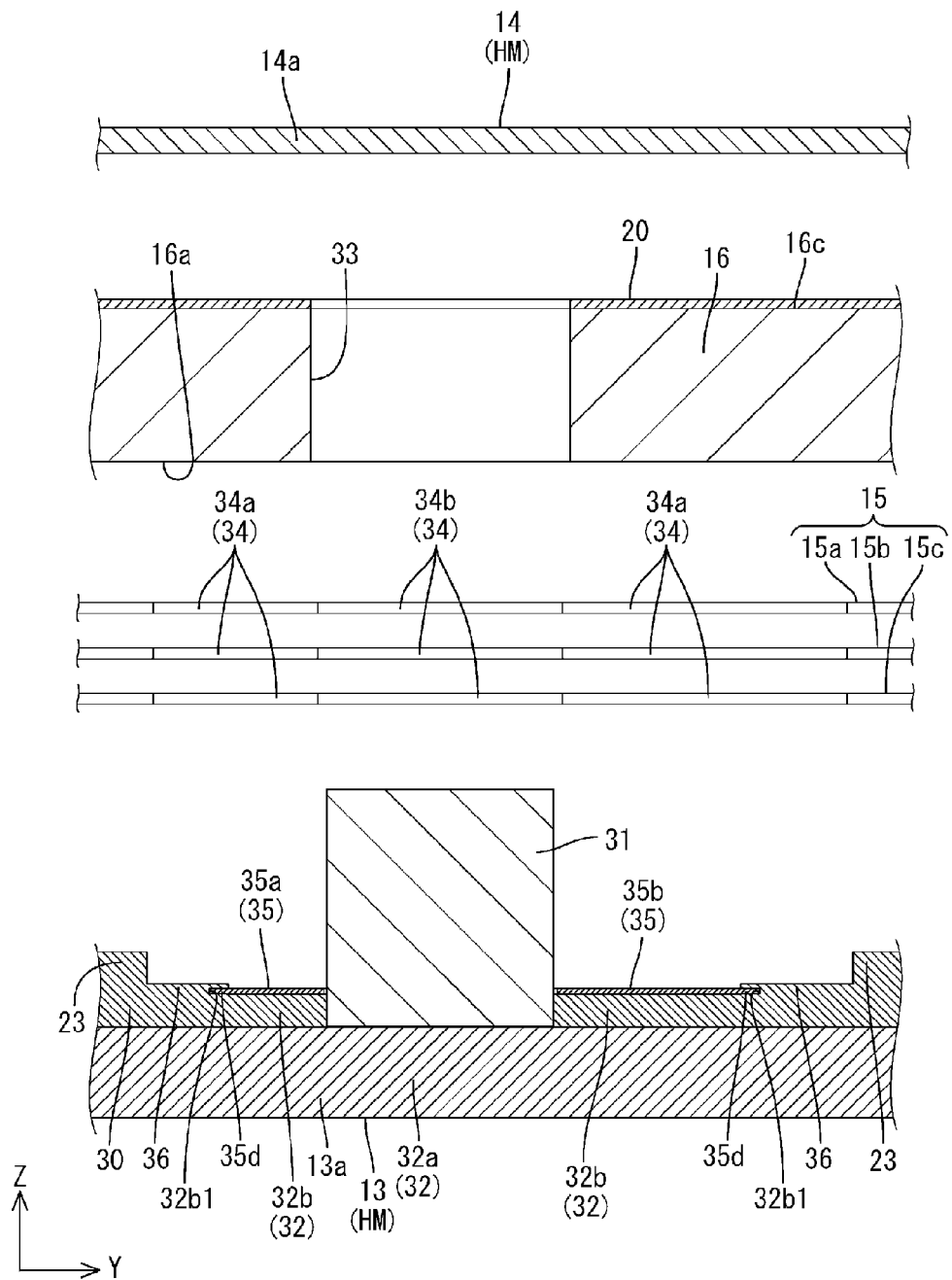
FIG. 18 is a cross-sectional view of FIG. 11 along the line xiv-xiv showing a state prior to the optical members, the light guide plate, a light guide reflective sheet, and a chassis being fixed to a frame fixed to a subframe, a positioning member, a light-shielding sheet, and a liquid crystal panel.

Next, the respective optical members 15 are directly stacked on the rear side (polarizing plate 11*d*) of the liquid crystal panel 11 in an appropriate order. At this time, as shown in FIGS. 17 and 18, the respective optical members 15 have the second to-be-positioned portions 34, which are provided as pairs on both ends in the shorter side direction and are recessed, fitting with the pair of protruding positioning portions 31 on the frame 13, and thus, the respective optical members 15 are positioned with respect to the frame 13 and the liquid crystal panel 11 in the X axis direction and the Y axis direction. More specifically, the optical members 15 are assembled to the frame 13 such that one shorter side edge slides in from the side along the X axis direction, and the second to-be-positioned portion 34 towards the front in the sliding direction fits into the corresponding positioning portion 31. At this time, the second to-be-positioned portion 34 to the rear in the sliding direction fits with a corresponding positioning portion, and thus, the optical members 15 are fixed in place. As shown in FIG. 11, with the optical member 15 assembled to the frame 13, a prescribed gap C2 is formed between opposing peripheral surfaces of the positioning portion 31 and the second to-be-positioned portion 34, but, at least a portion of the gap C2 is covered by the light-shielding sheet 35 disposed to the front of the optical members 15. If the optical members 15 are assembled to the frame 13 by being slid in, there is a possibility of variation in size of the gap C2 between a pair including the positioning portion 31 and the second to-be-positioned portion 34, but even in such a case, a portion of the gap C2 overlapping at least a gap formed between the edge of the liquid crystal panel 11 and the positioning portion 31 (portion towards the positioning portion 31) is completely covered by the light-shielding sheet 35 (refer to FIGS. 12 and 13).

On the other hand, as shown in FIG. 15, the LED units LU having the LEDs 17, the LED substrates 18, and the heat dissipating members 19 assembled together are attached to the frame 13. The LED units LU are respectively attached to the screw attaching portions 21 of the frame 13 such that the LEDs 17 are oriented toward the center (inner side) of the frame 13, and such that the heat dissipating section 19b of the heat dissipating member 19 face the longer side screw attaching portions 21 of the frame 13. When the respective LED units LU are attached to the respective screw attaching portions 21, the respective insertion holes 19b1 of the heat-dissipating section 19b are connected to the grooves 21a of the screw attaching portions 21. Also, if the LED unit LU among the pair of LED units LU overlapping the source-side flexible substrate 26 has the heat-dissipating member 19 attached to the screw-attaching portion 21, then a substrate housing space BS is formed between the LED attachment section 19a thereof and the screw attaching portions 21, and the printed board 27 is stored therein. After attaching the LED units LU to the screw attaching portions 21 in the above-mentioned manner, screws SM are inserted from the rear into corresponding insertion holes 19b1 of the heat dissipating sections 19b, thereby fastening the heat dissipating sections 19b to the grooves 21a of the screw attaching portions 21. The heat-dissipating sections 19b of the heat-dissipating members 19 are sandwiched between the head of the screws SM and the screw attaching portions 21, and thus, the LED units LU are attached to the screw attaching portions 21 prior to the chassis 14 being assembled thereto as will be described next (refer to FIG. 7). The LED units LU may be attached to the frame 13 before the optical members 15 are attached or the liquid crystal panel 11 is attached.

Once the LED units LU are screwed into the screw attaching portions 21, as shown in FIGS. 15 and 16, the light guide plate 16 is directly layered onto the rear surface of the rearmost optical member 15. At this time, as shown in FIGS. 17 and 18, the light guide plate 16 has the first to-be-positioned portions 33, which are provided as pairs on both ends in the shorter side direction and are recessed, fitting with the pair of protruding positioning portions 31 on the frame 13, and thus, the light guide plate 16 is positioned with respect to the frame 13 and the liquid crystal panel 11 in the X axis direction and the Y axis direction. As shown in FIG. 9, once the light guide plate 16 is attached, a prescribed gap C1 is formed between the peripheral surfaces of the positioning portion 31 and the first to-be-positioned portion 33 facing each other, but the entire gap C1 is covered by the light-shielding sheet 35 disposed to the front of the light guide plate 16. Also, the outer portion of the light guide plate 16 protruding further out than the liquid crystal panel 11 is supported by the light guide plate supporting portion 23 of the frame 13 from the front, or in other words, from the bottom in the vertical direction during assembly. The light guide plate supporting portion 23 has a substantially frame shape along the outer form of the light guide plate 16 as a whole, and the outer portion of the light guide plate 16 is supported in its entirety by the light guide plate supporting portion 23. Once the light guide plate 16 is attached, a light guide reflective sheet 20 is placed on the light guide plate 16.

After attaching the liquid crystal panel 11, the optical members 15, the light guide plate 16, and the LED units LU to the frame 13 as described above, a process to attach the chassis 14 is conducted. As shown in FIGS. 15 to 18, the chassis 14 is attached to the frame 13 with the front side thereof facing down in the vertical direction. At this time, outer side walls 14b2 of both LED housing portions 14b of the chassis 14 are inserted into the gaps between both longer side walls 13b in the frame 13 and the screw attaching portions 21, and thus, the chassis 14 is fixed in place in the Y axis direction with respect to the frame 13. In the assembly process, heads of the screws SM that were installed in the heat dissipating members 19 and the screw attaching portions 21 in advance are inserted into the respective heat-dissipating member insertion holes 25B in the respective LED housing portions 14b of the chassis 14 (see FIG. 7). With the bottom plate 14a of the chassis 14 being in contact with the light guide plate 16 (light guide reflective sheet 20), respective LED installing portions 14a1 of the bottom plate 14a being in contact with the respective screw attaching portions 21, and the LED installing portions 14b1 of the respective LED housing portions 14b being in contact with the heat-dissipating sections 19b of the respective heat-dissipating members 19, the screws SM are inserted from the rear through the respective screw insertion holes 25 of the LED installing portions 14a1 of the bottom plate 14a and through the joint screw insertion holes 25A of the LED installing portions 14b1 of the LED housing portion 14b, and these screws SM are screwed into the grooves 21a of the screw attaching portions 21. With the screws SM, the LED units LU and the chassis 14 are affixed to the screw attaching portions 21 (refer to FIG. 6). The screws SM attached in this manner are disposed on the rear surface of the chassis 14, which constitutes the rear outer portion of the liquid crystal display device 10, and thus, is difficult for a user using the liquid crystal display device 10 to directly see from the front, or in other words, the user side. Therefore, the outer shape of the liquid crystal display device 10 is well-designed and uncluttered.

The assembly of the liquid crystal display unit LDU is completed in the manner described above. Next, after the stand attachment member STA and various boards PWB, MB, and CTB are attached to the rear side of the liquid crystal display unit LDU, the stand ST and the cover member CV are attached to the rear side, thereby completing the liquid crystal display device 10 and the television receiver TV. The liquid crystal display device 10 manufactured in this manner has the outer portion constituted of the frame 13 that presses down on the liquid crystal panel 11 from the display surface DS side, and the chassis 14 included in the backlight device 12, and the liquid crystal panel 11 and the optical members 15 are directly layered together. Therefore, it is possible reduce manufacturing costs, profile, and weight by reducing the number of parts and the number of assembly steps compared to a conventional configuration having synthetic resin cabinets provided separately from the frame 13 and the chassis 14 or a panel-receiving member interposed between the liquid crystal panel 11 and the optical members 15 such that they are not in contact with each other.

As shown in FIG. 4, when the liquid crystal display device 10 manufactured as described above is turned on, power supply is received from the power source substrate PWB, and various signals are sent to the liquid crystal panel 11 through the printed boards 27 and the flexible substrates 26 and 28 (respective drivers DR) so as to control the driving of the liquid crystal panel 11, and the respective LEDs 17 of the backlight device 12 are driven. By passing through the optical members 15 after being guided by the light guide plate 16, light from the respective LEDs 17 is converted to even planar light, which then illuminates the liquid crystal panel 11, and a prescribed image is displayed on the liquid crystal panel 11. To explain the operation of the backlight device 12 in detail, when the respective LEDs 17 are lit, light emitted from the respective LEDs 17 enters the light receiving faces 16b of the light guide plate 16 as shown in FIG. 6. In the process of travelling through the light guide plate 16 while being subject to the total reflection at the interfaces between the light guide plate 16 and external air spaces, being reflected by the light guide reflective sheet 20, and the like, the light that entered the light receiving faces 16b is reflected or diffused by reflective portions and diffusion portions that are not shown, and thereby outputted from the light exiting surface 16a and being radiated to the optical members 15.

In the liquid crystal display device 10 of the present embodiment, the liquid crystal panel 11 is directly stacked on the light guide plate 16 and the optical members 15, and a panel receiving member is not interposed therebetween unlike the conventional configuration, and thus, there is a risk that light would leak to the edge of the liquid crystal panel 11. In particular, in order to fix in place the optical members 15 and the light guide plate 16, the positioning portions 31 are provided on the frame 13, and the first to-be-positioned portions 33 are provided on the light guide plate 16, and the risk is that light propagating through the light guide plate 16 leaks from the edge face of the first to-be-positioned portion 33 into the gap C1 formed with the positioning portion 31, and directly enters the edge of the liquid crystal panel 11. In the present embodiment, as shown in FIGS. 9, 12, and 13, the light-shielding sheet 35 is interposed between the liquid crystal panel 11 and the light guide plate 16 and covers the entire gap C1 formed between the positioning portion 31 and the first to-be-positioned portion 33, and thus, light that has leaked to the gap C1 from the edge face of the first to-be-positioned portion 33 can be suitably blocked from entering the edge of the liquid crystal panel 11 directly. Furthermore, the light-shielding sheet 35, in addition to being interposed between the liquid crystal panel 11 and the optical members 15 cover a portion of the gap C2 formed between the positioning portion 31 and the second to-be-positioned portion 34, and thus, light that has leaked to the gap C1 from the edge face of the first to-be-positioned portion 33 can be suitably blocked from directly entering the edge of the liquid crystal panel 11 through the gap C2. In this manner, light leakage to the edge, and in particular, the edge face, of the liquid crystal panel 11 can be prevented, thereby allowing for high display quality for images displayed in the liquid crystal panel 11.

When the respective LEDs 17 are lit in order to use the liquid crystal display device 10, heat is generated from the respective LEDs 17. If the temperature in the liquid crystal display device 10 rises due to heat generated by the LEDs 17, the components in the liquid crystal display device 10 experience thermal expansion. Among the components of the liquid crystal display device 10, the optical members 15 are more susceptible to expanding in the longer side direction (X axis direction) due to thermal expansion, and there is a risk that the second to-be-positioned portion 34 included in the positioning structure interferes with the light-shielding sheet 35. Specifically, as shown in FIG. 12, the second to-be-positioned portion 34 and the light-shielding sheet 35 are normally disposed so as not to overlap in the Z axis direction, but if the second to-be-positioned portion 34 and/or the light-shielding sheet 35 undergoes deformation such as warping, they sometimes overlap in the Z axis direction. At this time, if the optical members 15 expand in the X axis direction due to thermal expansion, the edge face of the bridging portion 34b of the second to-be-positioned portion 34 can interfere with the edge face of the bridging portion 34b of the light-shielding sheet 35. Even in this case, as shown in FIG. 11, the edge face of the bridging portion 34b of the second to-be-positioned portion 34 is provided with the inclined portion 37 having an inclined shape with respect to the edge face of the third portion 35c of the light-shielding sheet 35, and thus, even if the optical member 15 undergoes thermal expansion and the edge face of the bridging portion 34b of the second to-be-positioned portion 34 interferes with the edge face of the third portion 35c of the light-shielding sheet 35, while the two edge faces come into contact at two points, they do not come into contact in a line, and thus, there is less susceptibility for the edge face of the bridging portion 34b to become stuck on the edge face of the light-shielding sheet 35. As a result, the light-shielding sheet 35 is less susceptible to unwanted deformation such as turning up, and thus, it is possible to maintain a state in which the light-shielding sheet 35 covers the respective gaps C1 and C2. Thus, the light-shielding function of the light-shielding sheet 35 can be more reliably exhibited. Also, the inclined portions 37 are separately provided for all three optical members 15, and thus, even if the degree of thermal expansion differs for each optical member 15 and the edge face of the bridging portion 34b of each optical member 15 were to individually interfere with the edge face of the light-shielding sheet 35, the inclined portion 37 mitigates the edge faces becoming stuck on each other.

As described above, the liquid crystal display device 10 (display device) of the present embodiment includes: LEDs 17 (light sources); a liquid crystal panel 11 (display panel) that performs display using light from the LEDs 17; a light guide plate 16 disposed so as to overlap the side of the liquid crystal panel 11 opposite to the display surface DS, an edge face (light-receiving face 16b) of the light guide plate 16 facing the LEDs 17; optical members 15 disposed between the liquid crystal panel 11 and the light guide plate 16; a holding member HM that has a frame 13 and a chassis 14 that are a pair of holding portions that hold the optical members 15 and the light guide plate 16 from the display surface DS side and the side opposite thereto; a first to-be-positioned portion 33 (to-be-positioned portion) provided on an edge of the light guide plate 16; a positioning portion 31 provided on at least one of the frame 13 and the chassis 14 that are the pair of holding portions, and that fits into the first to-be-positioned portion 33 to fix the light guide plate 16 in place along directions along the plate surface thereof; and a light-shielding sheet 35 (light-shielding member) that is disposed between the light guide plate 16 and the liquid crystal panel 11 and that covers at least a portion of a gap C1 formed between the positioning portion 31 and the first to-be-positioned portion 33 so as to prevent light from the first to-be-positioned portion 33 from directly entering the liquid crystal panel 11.

In this manner, light emitted from the LEDs 17 has applied thereto prescribed optical effects by entering the edge face of the light guide plate 16 and passing through the optical members 15 while being guided towards the liquid crystal panel 11, and thus, images are displayed in the liquid crystal panel 11 using this light. The light guide plate 16 is fixed in place in directions along the plate surface thereof by the positioning portion 31 that fits into the first to-be-positioned portion 33 formed in the edge of the light guide plate 16. The gap C1 is formed between the positioning portion 31 and the first to-be-positioned portion 33, and thus, effects can be attained such as guaranteeing ease of assembly. The liquid crystal panel 11, the optical members 15, and the light guide plate 16 are held from the display surface DS side and the side opposite thereto so as to overlap each other by the frame 13 and the chassis 14, which are the pair of holding portions in the holding member HM, and the configuration does not include a panel receiving portion interposed between the light guide plate 16, and the optical members 15 and liquid crystal panel 11 as in conventional configurations. In particular, light is more susceptible to leaking from the first to-be-positioned portion 33 provided in the edge of the light guide plate 16 compared to the edge faces of the light guide plate 16 (non-LED-facing edge faces 16*d*), and thus, there is a risk that the light leaks from the gap C1 formed between the first to-be-positioned portion 33 and the positioning portion 31 and directly enters the liquid crystal panel 11. However, as described above, the light-shielding sheet 35 is interposed between the light guide plate 16 and the liquid crystal panel 11 and is formed between the positioning portion 31 and the first to-be-positioned portion 33, and covers at least a portion of the gap C1 formed between the positioning portion 31 and the first to-be-positioned portion 33, and thus, light from the first to-be-positioned portion 33 is prevented from directly entering the liquid crystal panel 11. As a result, the display quality of images displayed in the liquid crystal panel 11 can be made excellent. According to the present embodiment, light leakage can be mitigated.

The positioning portion 31 fits into the edge of the optical members 15, and thus, the optical members 15 are provided with the second to-be-positioned portion 34 that positions the optical members 15, and the light-shielding sheet 35 is provided between the optical members 15 and the liquid crystal panel 11 while covering at least a portion of the gap C2 formed between the positioning portion 31 and the second to-be-positioned portion 34, and thus, light from the first to-be-positioned portion 33 can be prevented from directly entering the liquid crystal panel 11. In this manner, the positioning portions 31 that fit into the first to-be-positioned portion 33 of the light guide plate 16 and the second to-be-positioned portion 34 of the optical members 15 allow the light guide plate 16 and the optical members 15 to be fixed in place. The light-shielding sheet 35 disposed between the optical members 15 and the liquid crystal panel 11 covers at least a portion of the gap C2 formed between the positioning portion 31 and the second to-be-positioned portion 34, and thus, light from the first to-be-positioned portion 33 of the light guide plate 16 can be prevented from directly entering the liquid crystal panel 11 through the gap C2 formed between the positioning portion 31 and the second to-be-positioned portion 34.

Also, the light-shielding sheet 35 covers a portion of the gap C2 formed between the positioning portion 31 and the second to-be-positioned portion 34 while the non-covered portion NCP of the gap C2 remains between the edge face of the light-shielding sheet 35 and the edge face of the second to-be-positioned portion 34, and one of the edge face of the light-shielding sheet 35 and the edge face of the second to-be-positioned portion 34 is provided with the inclined portion 37 that is inclined with respect to the edge face of the other. In this manner, if the non-covered portion NCP of the gap C2 not covered by the light-shielding sheet 35 is present between the edge face of the light-shielding sheet 35 and the edge face of the second to-be-positioned portion 34, then when the optical members 15 undergo thermal expansion, there is a risk that the edge face of the second to-be-positioned portion 34 interferes with the edge face of the light-shielding sheet 35, causing deformation in the light-shielding sheet 35, but by providing the inclined portion 37 as described above, the inclined portion 37 is less susceptible to becoming stuck on the edge face of the other. As a result, it is possible to prevent the light-shielding sheet 35 from undergoing unwanted deformation due to the optical members 15 and the light-shielding properties of the light-shielding sheet 35 can be exhibited, thus reliably mitigating light leakage.

Also, the inclined portion 37 is provided on the edge face of the second to-be-positioned portion 34 and has an inclined shape with respect to the edge face of the light-shielding sheet 35 in a plan view. In this manner, the inclined portion 37 provided on the optical members 15 has an inclined shape in a plan view, and thus, it is possible to provide the optical members 15 with the inclined portion 37 with ease during manufacturing, and it is possible to mitigate cost increase resulting from providing the inclined portion 37.

Also, the inclined portion 37 is symmetrical in a plan view. In this manner, when the inclined portion 37 interferes with the edge face of the light-shielding sheet 35 due to thermal expansion of the optical members 15, the force from the inclined portion 37 on the light-shielding sheet 35 can be dissipated with ease, and thus, unwanted deformation of the light-shielding sheet 35 can be made more difficult, and the light-shielding properties of the light-shielding sheet 35 can be exhibited more reliably.

The second to-be-positioned portion 34 includes the pair of protrusions 34*a* that protrude from the edge faces of the optical members 15 and that surround the positioning portion 31 from both sides, and a bridging portion 34*b* that is the portion of the edge of the optical members 15 between the pair of protrusions 34*a*, and the inclined portion 37 is provided in the bridging portion 34*b* in the portion of the edge of the optical members 15 between the pair of protrusions 34*a*. In this manner, it is possible to have the edge face of the optical members 15 further inside than if the edge face of the optical members 15 were to be given a recess that is the second positioning portion. Therefore, it is possible to further narrow the frame portion of the liquid crystal display device 10 that accommodates the thermal expansion of the optical members 15.

The first to-be-positioned portion 33 and the second to-be-positioned portion 34 are provided as pairs respectively in the edges of the light guide plate 16 and the optical members 15 and edges opposite thereto, whereas pairs respectively of the positioning portions 31 and the light-shielding sheets 35 are provided so as to sandwich the edges and the opposite edges of the light guide plate 16 and the optical members 15, and the inclined portions 37 form a pair and are provided on either the edge faces of the light-shielding sheets 35 that form a pair or the edge faces of the second to-be-positioned portions 34. In this manner, the light guide plate 16 and the optical members 15 are fixed in place from both sides by the respective pairs of the positioning portions 31, the first to-be-positioned portions 33, and the second to-be-positioned portions 34, and thus, the positioning accuracy is high. The light-shielding sheets 35 form a pair form the respective pairs of the positioning portions 31, the first to-be-positioned portions 33, and the second to-be-positioned portions 34, and thus, have sufficient light-shielding properties. Also, even if a difference emerges between the positional relation of the second to-be-positioned portion 34 disposed on the edge of the optical members 15 and the positioning portion 31 that fits therewith and the positional relation of the second to-be-positioned portion 34 disposed on the opposite edge of the optical members 15 and the positioning portion 31 that fits therewith, and a larger gap C2 remains between either of the edge faces of the light-shielding sheets 35 and the edge faces of the second to-be-positioned portions 34, for example, the inclined portions 37 form pairs for the respective pairs of the light-shielding sheets 35 and the second to-be-positioned portions 34, and thus, a situation in which the light-shielding sheet 35 undergoes deformation due to the gap C2 between the edge face of the light-shielding sheet 35 and either the edge face of the second to-be-positioned portion 34 or the edge face of the optical members 15 is suitably prevented.

Also, the light-shielding sheet 35 is a flexible sheet. As a result, the light-shielding sheet 35 can be interposed between the optical members 15 and the liquid crystal panel 11 with ease. On the other hand, if the light-shielding sheet 35 is a sheet, it becomes susceptible to deformations such as warping, but as a result of the above-mentioned inclined portion 37, the optical members 15 are less susceptible to becoming stuck on the light-shielding sheet 35, and thus, it is possible to suitably mitigate deformation in the light-shielding sheet 35.

Also, the liquid crystal panel 11 has the polarizing plates 11c and 11d attached to the central portions of the plate face thereof facing the optical members 15 and the plate face opposite thereto, the light-shielding sheets 35 are disposed between the optical members 15 and the edges of the liquid crystal panel 11 where the polarizing plates 11c and 11d are not present, and the thickness of the light-shielding sheets 35 is less than the thickness of the polarizing plates 11c and 11d. In this manner, the light-shielding sheets 35 can be disposed between the edges of the liquid crystal panel 11 where the polarizing plates 11c and 11d are not provided and the optical members 15, relying on the thickness of the polarizing plates 11c and 11d.

At least a portion of the light-shielding sheet 35 overlaps the second to-be-positioned portion 34 in a plan view. In this manner, at least a portion of the light-shielding sheet 35 overlaps the second to-be-positioned portion 34, and therefore, compared to a case in which the light-shielding sheet 35 and the second to-be-positioned portion 34 do not overlap, the light-shielding sheet 35 is less susceptible to deformation due to the second to-be-positioned portion 34 when the second to-be-positioned portion 34 undergoes relative displacement in relation to the light-shielding sheet 35 when the light-shielding sheet 35 undergoes thermal expansion.

Also, the first to-be-positioned portion 33 is formed by forming a recess in the non-LED-facing edge face 16d, which is an edge face of the light guide plate 16. In this manner, when manufacturing the light guide plate 16 by extrusion, for example, then by cutting a portion of the non-LED-facing edge face 16d, which is an edge face of the light guide plate 16, it is possible to form the first to-be-positioned portion 33 with ease and at a low cost.

Also, of the frame 13 and the chassis 14, which are the pair of holding portions, the frame 13, which is a holding portion disposed on the display surface DS side of the liquid crystal panel 11 is provided with a light guide plate supporting portion 23 that extends along the edge of the light guide plate 16 and that supports, from the liquid crystal panel 11 side, the portions of the edge of the light guide plate 16 where the first to-be-positioned portions 33 are not formed, and with an attaching portion 32 to which the positioning portion 31 is attached and that is continuous with the light guide plate supporting portion 23. In this manner, the portion of the edge of the light guide plate 16 where the first to-be-positioned portion 33 is not formed is supported from the liquid crystal panel 11 side by the light guide plate supporting portion 23 that extends along the edge, and thus, the position of the light guide plate 16 in relation to the LEDs 17 is stably maintained, and as a result, the display quality of images displayed in the liquid crystal panel 11 can be made stable and excellent. In addition, the positioning portion 31 is attached to the attaching portion 32 that is continuous with the light guide plate supporting portion 23, and thus, the same space used for the light guide plate supporting portion 23 of the frame 13, which is a holding portion, is used as the positioning portion 31 of the frame 13, which is a holding portion. As a result, the width of the frame of the liquid crystal display device 10 can be kept narrow.

Also, the light-shielding sheet 35 is attached to the attaching portion 32. In this manner, the light-shielding sheet 35, in addition to the positioning portion 31, can be attached to the attaching portion 32 that is continuous with the light guide plate supporting portion 23, and thus, the same space is used for the light-shielding sheet 35 in the frame 13, which is a holding portion, as the light guide plate supporting portion 23 in the frame 13, which is a holding portion. As a result, the width of the frame of the liquid crystal display device 10 can be kept narrower.

Embodiment 2

Embodiment 2 of the present invention will be described with reference to FIG. 19. In Embodiment 2, the shape of an inclined portion 137 is modified. Descriptions of structures, operations, and effects similar to those of Embodiment 1 will be omitted.

Figure 19:
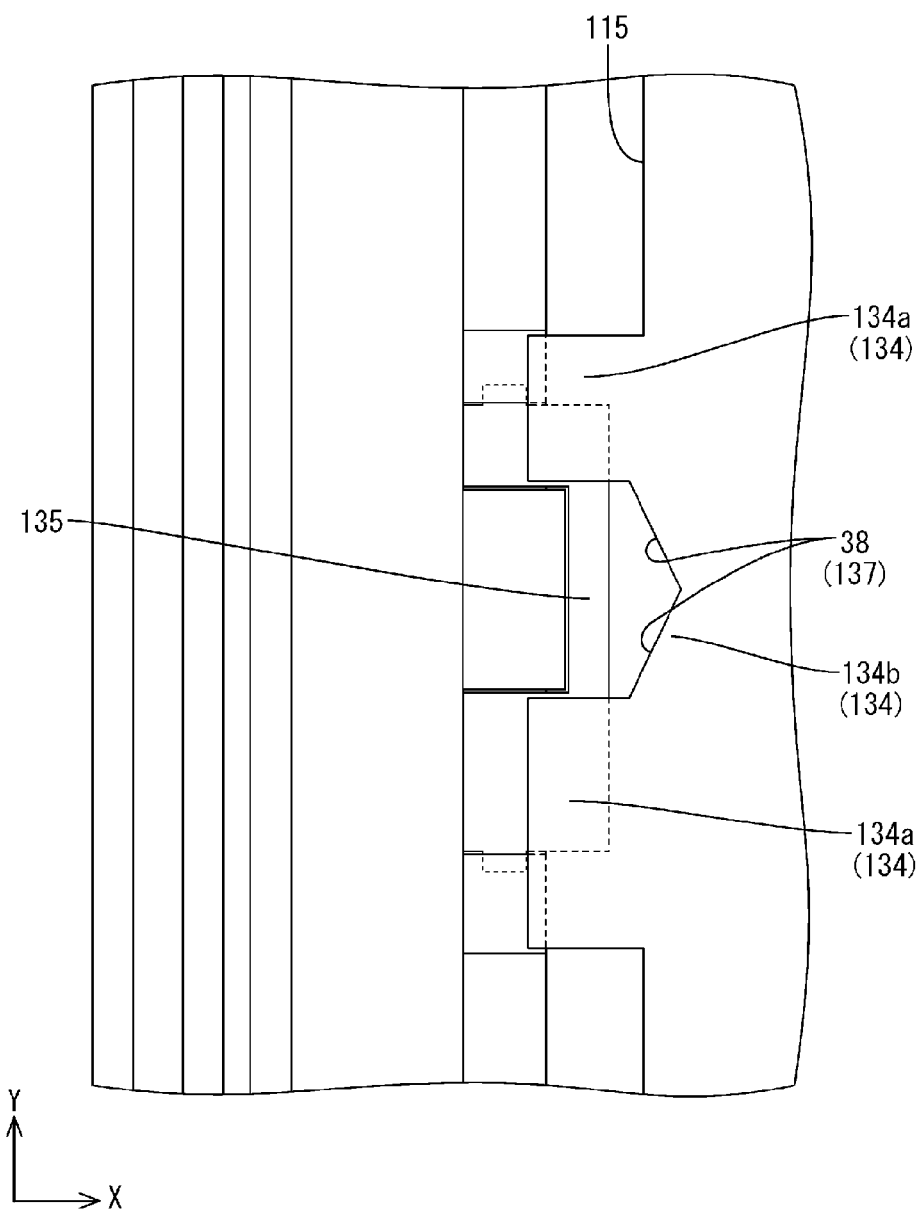
FIG. 19 is an enlarged rear view of the vicinity of a positioning structure in a state in which optical members are fixed onto a frame according to Embodiment 2 of the present invention.

As shown in FIG. 19, the inclined portion 137 of the present embodiment has a pair of inclined faces 38 inclined with respect to the edge face of the light-shielding sheet 135. In other words, the inclined portion 137 is formed by cutting a bridging portion 134b between a pair of protrusions 134a of a second to-be-positioned portion 134 into a triangular shape in a plan view. The pair of inclined faces 38 has substantially the same angle of incline with respect to the edge face of the light-shielding sheet 135, and is symmetrical in relation to the center of the second to-be-positioned portion 134. The angle between the pair of inclined faces 38 is obtuse. Even with such a configuration, if the second to-be-positioned portions 134 undergo relative displacement with respect to the light-shielding sheet 135 due to the thermal expansion of the optical members 115, the pair of inclined faces 38 respectively contact the edge face of the light-shielding sheet 135 at points and slide across this edge face, and thus, the optical members 115 are less susceptible to becoming stuck on the light-shielding sheet 135, and thus, the light-shielding sheet 135 is less susceptible to unwanted deformation.

Embodiment 3

Embodiment 3 of the present invention will be described with reference to FIG. 20. In Embodiment 3, the shape of an inclined portion 237 is modified. Descriptions of structures, operations, and effects similar to those of Embodiment 1 will be omitted.

Figure 20:
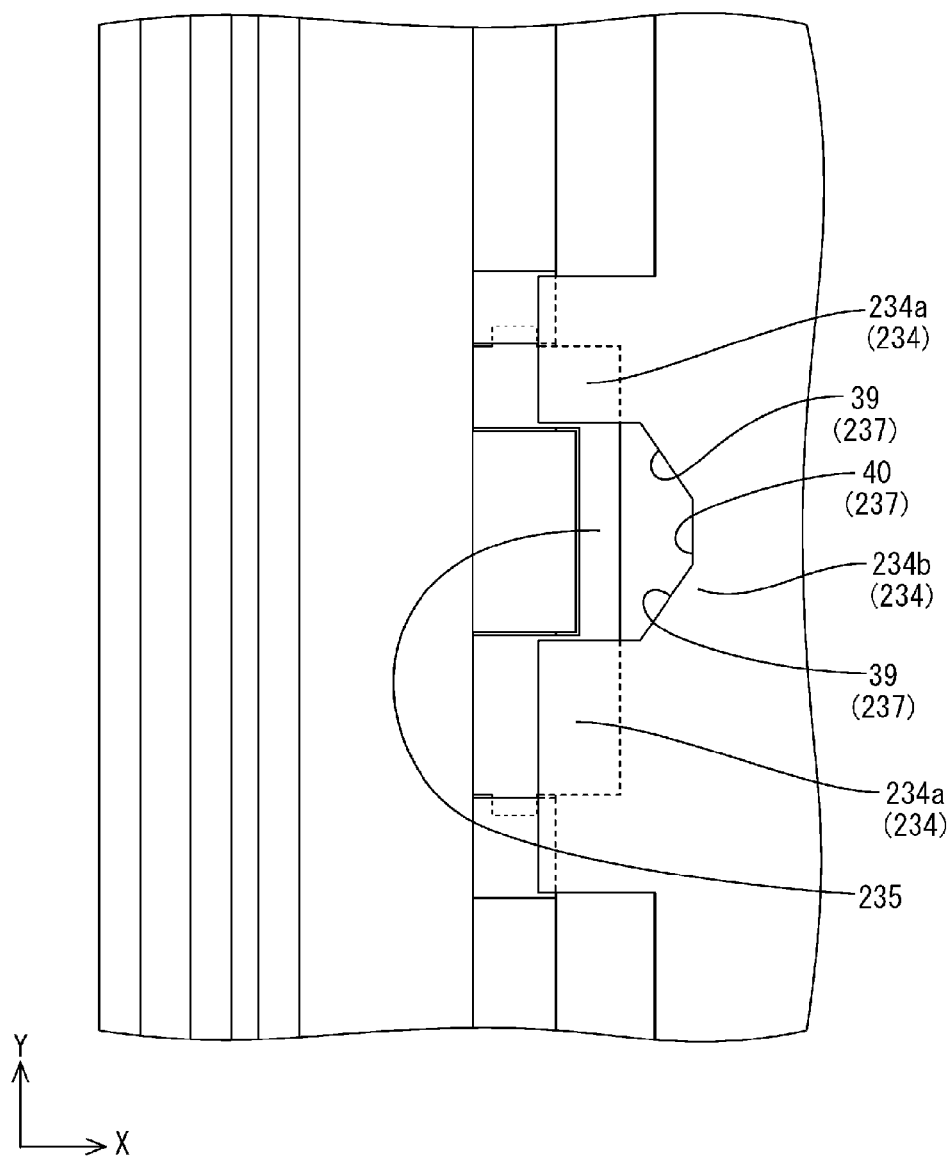
FIG. 20 is an enlarged rear view of the vicinity of a positioning structure in a state in which optical members are fixed onto a frame according to Embodiment 3 of the present invention.

As shown in FIG. 20, the inclined portion 237 of the present embodiment has a pair of inclined faces 39 inclined with respect to the edge face of the light-shielding sheet 235, and a straight face 40 that connects the pair of inclined faces 39 and is parallel to the edge face of the light-shielding sheet 235 (Y axis direction). In other words, the inclined portion 237 is formed by cutting a bridging portion 234b between a pair of protrusions 234a of a second to-be-positioned portion 234 into a trapezoidal shape in a plan view. The inclined portion 237 is symmetrical with respect to the center of the second to-be-positioned portion 234. Even with such a configuration, it is possible to suitably mitigate unwanted deformation in the light-shielding sheet 235 as in Embodiments 1 and 2.

Embodiment 4

Embodiment 4 of the present invention will be described with reference to FIG. 21. In Embodiment 4, the shape of an inclined portion 337 is modified. Descriptions of structures, operations, and effects similar to those of Embodiment 1 will be omitted.

Figure 21:
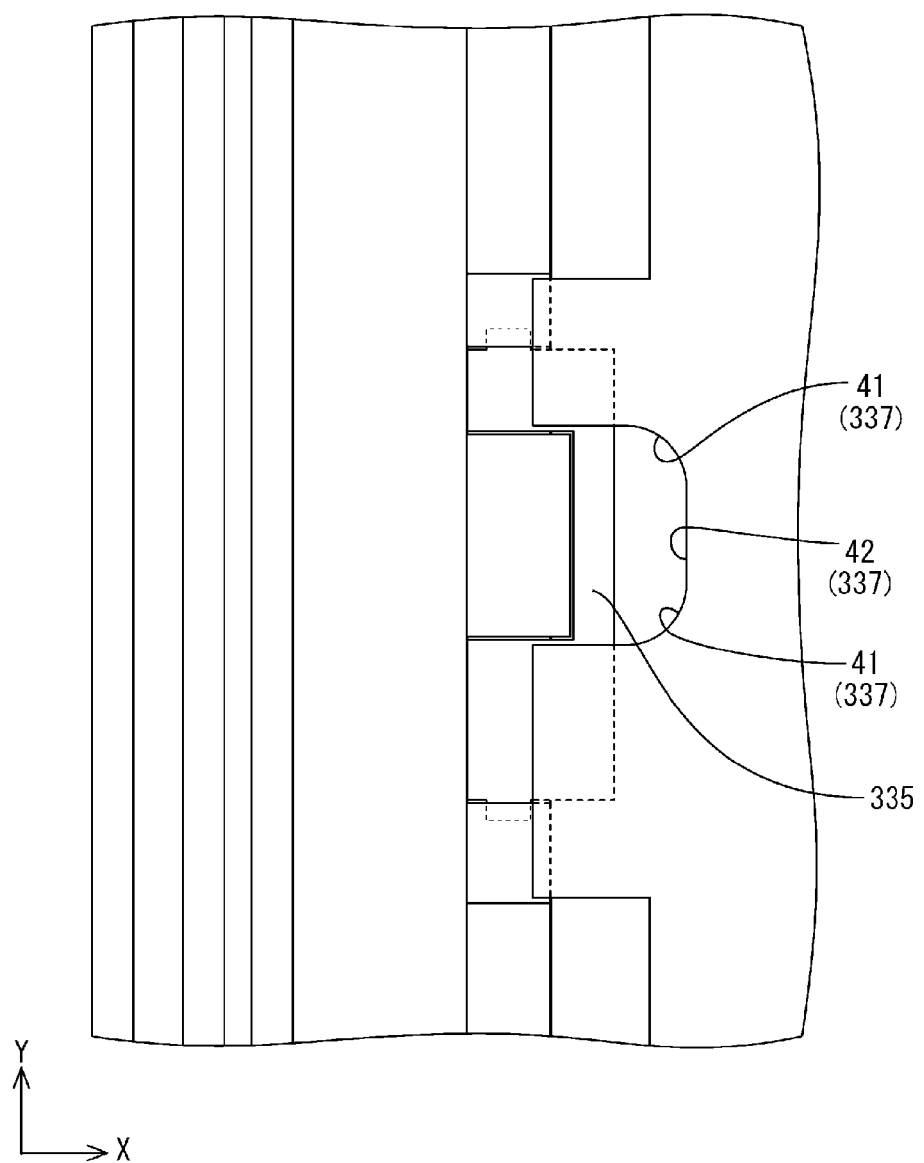
FIG. 21 is an enlarged rear view of the vicinity of a positioning structure in a state in which optical members are fixed onto a frame according to Embodiment 4 of the present invention.

As shown in FIG. 21, the inclined portion 337 of the present embodiment has a pair of arced faces 41 that are arced in a plan view, and a straight face 42 that connects the pair of arced faces 41. Almost all tangent lines at specific points on the arced faces 41 are inclined with respect to the edge face of the light-shielding sheet 335. The straight face 42 is parallel to the edge face of the light-shielding sheet 335. Even with such a configuration, it is possible to suitably mitigate unwanted deformation in the light-shielding sheet 335 as in Embodiments 1 to 3.

Embodiment 5

Embodiment 5 of the present invention will be described with reference to FIG. 22. In Embodiment 5, the shape of an inclined portion 437 is modified from that of Embodiment 2. Descriptions of structures, operations, and effects similar to those of Embodiment 2 will be omitted.

Figure 22:
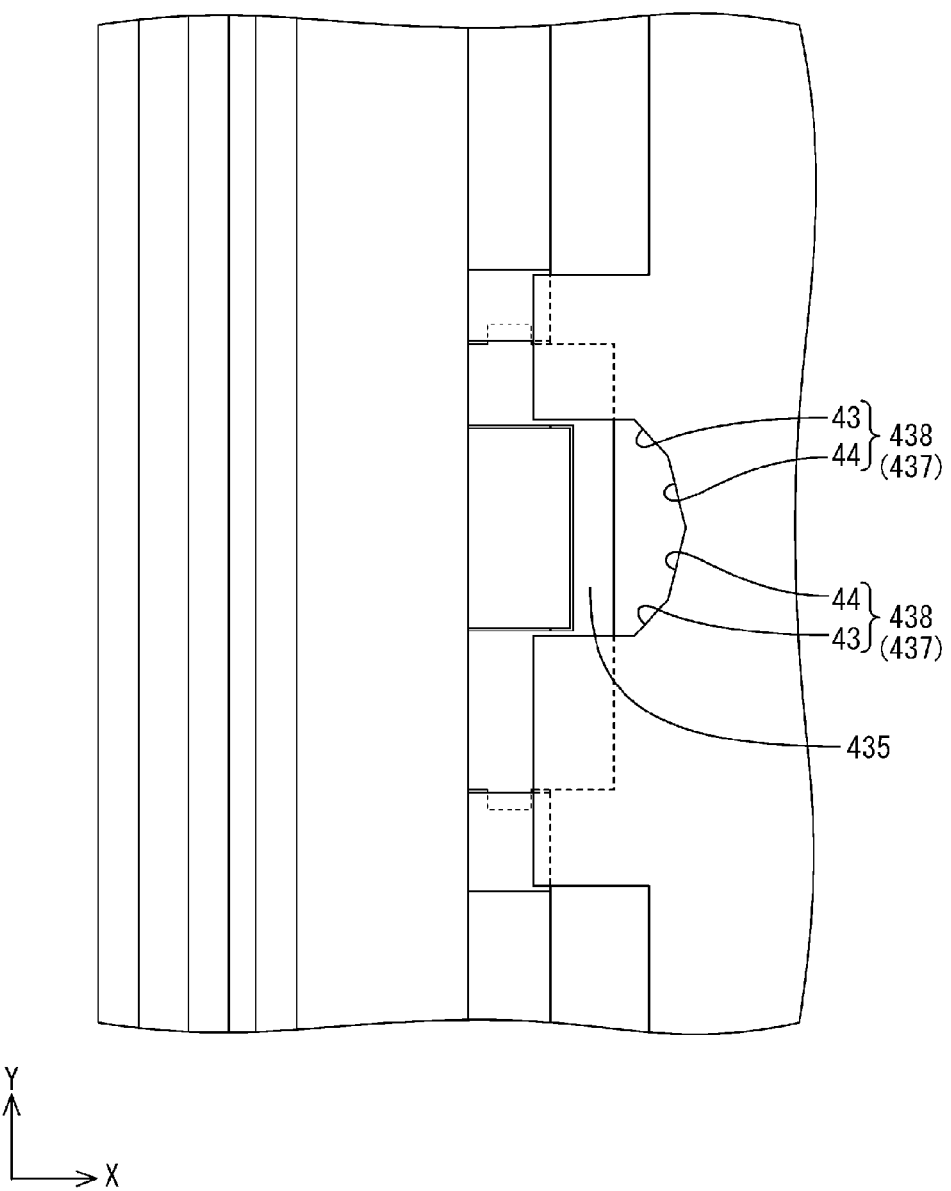
FIG. 22 is an enlarged rear view of the vicinity of a positioning structure in a state in which optical members are fixed onto a frame according to Embodiment 5 of the present invention.

As shown in FIG. 22, the inclined face 438 of the inclined portion 437 of the present embodiment has two stages of incline due to bending in the middle, and thus, the inclined face 438 includes first inclined faces 43 and second inclined faces 44. The first inclined face 43 disposed towards a protrusion 434a of the second to-be-positioned portion 434 has a larger angle of incline with respect to the edge face of the light-shielding sheet 435, whereas the second inclined face 44 disposed towards the center in the Y axis direction has a smaller angle of incline with respect to the edge face of the light-shielding sheet 435. Even with such a configuration, it is possible to suitably mitigate unwanted deformation in the light-shielding sheet 435 as in Embodiments 1 to 4.

Embodiment 6

Embodiment 6 of the present invention will be described with reference to FIG. 23. In Embodiment 6, the shape of an inclined portion 537 is modified. Descriptions of structures, operations, and effects similar to those of Embodiment 1 will be omitted.

Figure 23:
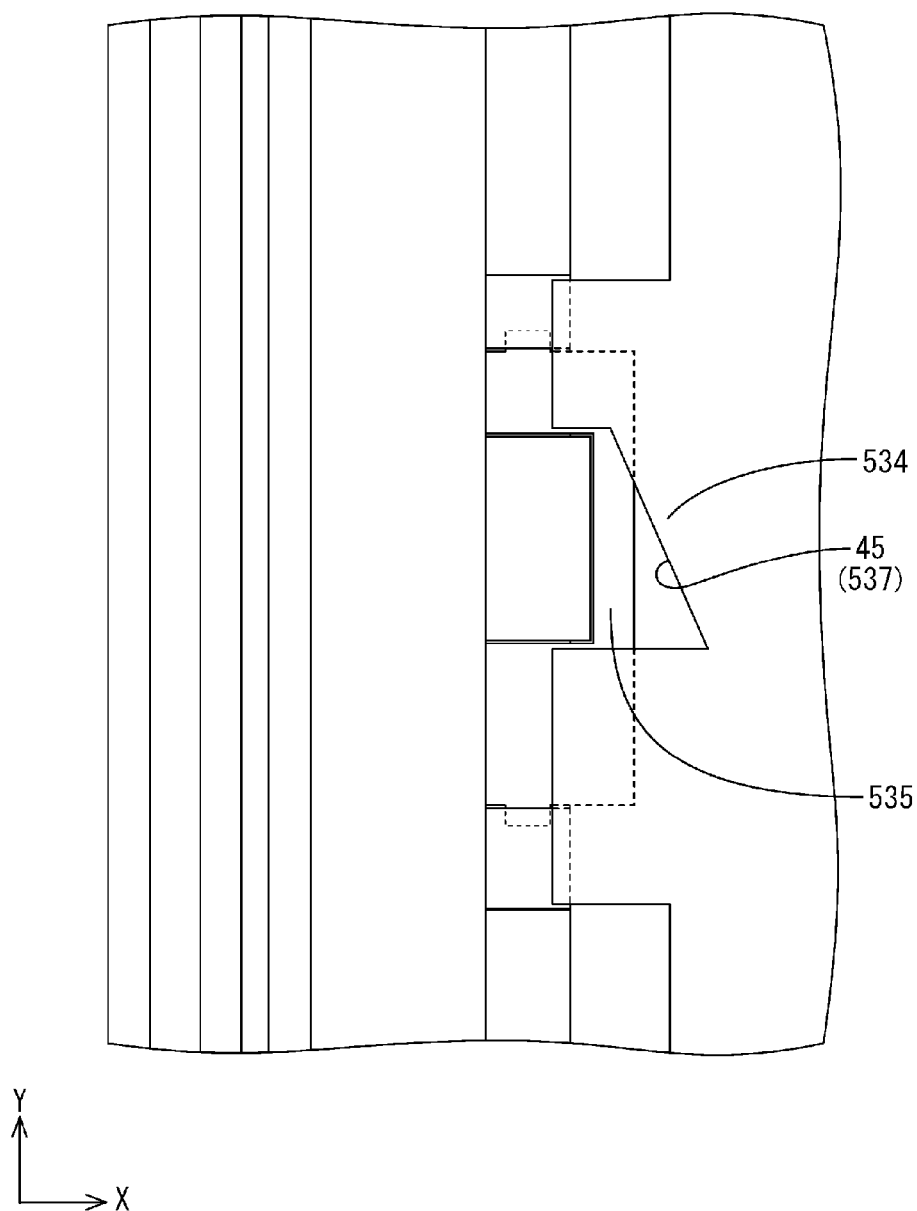
FIG. 23 is an enlarged rear view of the vicinity of a positioning structure in a state in which optical members are fixed onto a frame according to Embodiment 6 of the present invention.

As shown in FIG. 23, the inclined portion 537 of the present embodiment has one inclined face 45. Thus, the inclined portion 537 is asymmetrical with respect to the center of the second to-be-positioned portion 534. Even with such a configuration, it is possible to suitably mitigate unwanted deformation in the light-shielding sheet 535 as in Embodiments 1 to 5.

Embodiment 7

Embodiment 7 of the present invention will be described with reference to FIG. 24. In Embodiment 7, an inclined portion 637 is provided on the light-shielding sheet 635 side. Descriptions of structures, operations, and effects similar to those of Embodiment 1 will be omitted.

Figure 24:
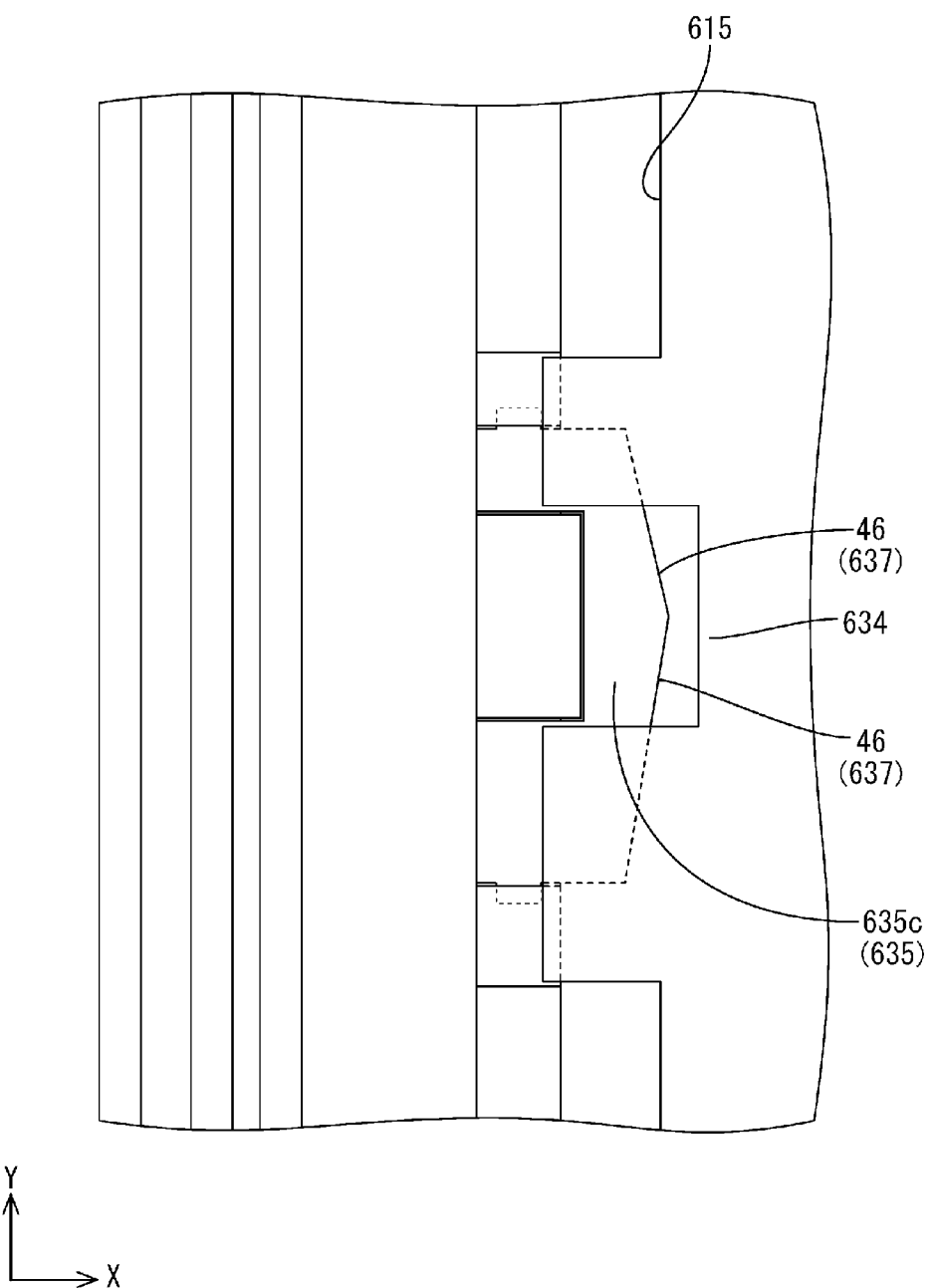
FIG. 24 is an enlarged rear view of the vicinity of a positioning structure in a state in which optical members are fixed onto a frame according to Embodiment 7 of the present invention.

As shown in FIG. 24, the inclined portion 637 of the present embodiment is provided on an edge face of the light-shielding sheet 635. The inclined portion 637 is formed on the edge face of a third portion 635c of the light-shielding sheet 635, and includes a pair of inclined faces 46 that are inclined with respect to a second to-be-positioned portion 634. The edge face of the second to-be-positioned portion 634 has a substantially straight line shape along the Y axis direction. The pair of inclined faces 46 have substantially the same angle of inclined with respect to the edge face of the second to-be-positioned portion 634. Even with this configuration, if the second to-be-positioned portion 634 undergoes relative displacement with respect to the light-shielding sheet 635 due to thermal expansion of the optical member 615, the edge face of the second to-be-positioned portion 634 contacts the pair of inclined faces 46 of the inclined portion 637 at points and slides across the inclined faces 46, and thus, the optical members 615 are less susceptible to becoming stuck on the light-shielding sheet 635, and thus, the light-shielding sheet 635 is less susceptible to unwanted deformation.

Embodiment 8

Embodiment 8 of the present invention will be described with reference to FIG. 25. In Embodiment 8, the second to-be-positioned portion 734 is formed by forming a recess in the edge of the optical members 715. Descriptions of structures, operations, and effects similar to those of Embodiment 1 will be omitted.

Figure 25:
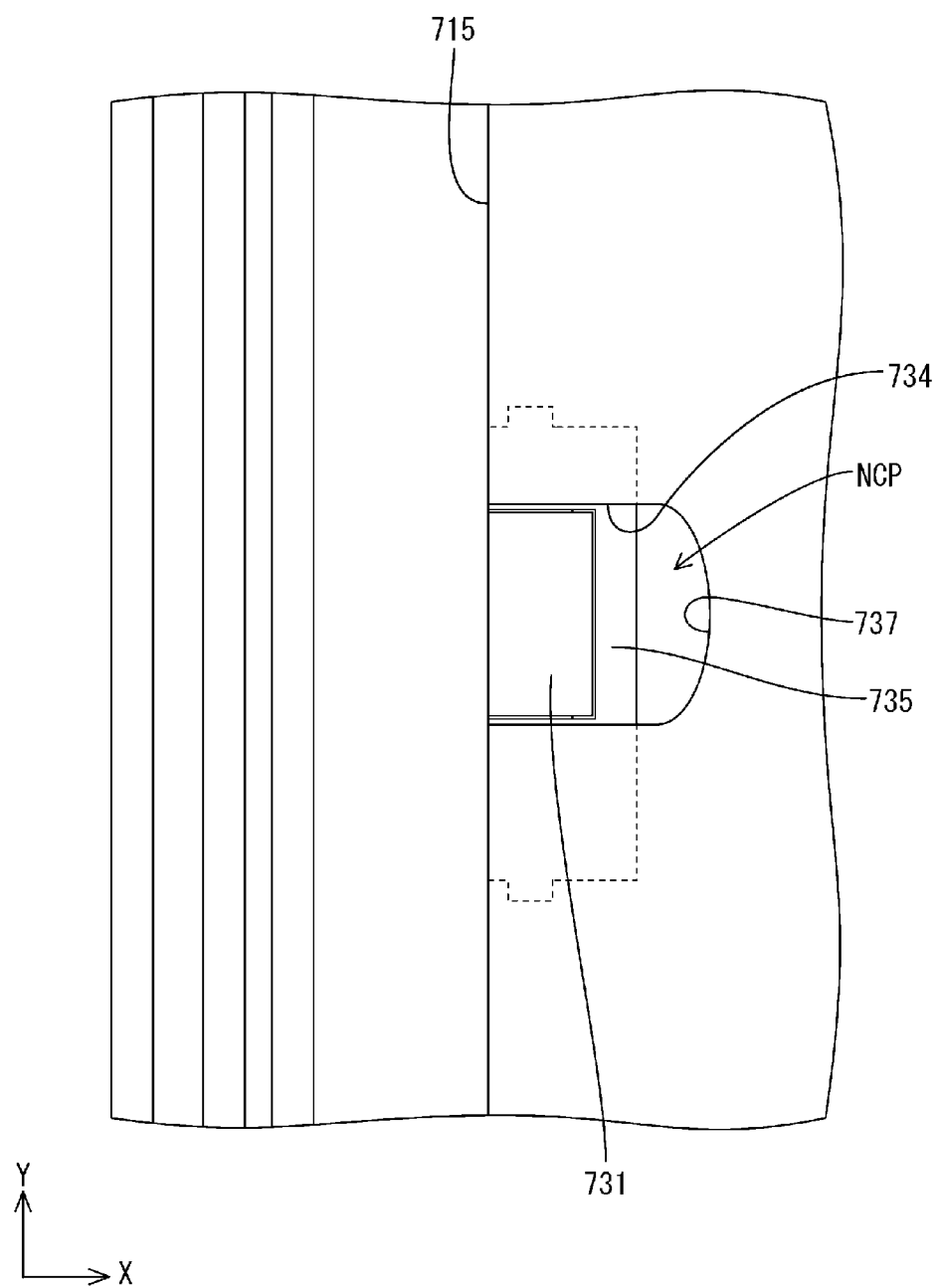
FIG. 25 is an enlarged rear view of the vicinity of a positioning structure in a state in which optical members are fixed onto a frame according to Embodiment 8 of the present invention.

As shown in FIG. 25, the second to-be-positioned portion 734 of the present embodiment is formed by forming a recess in a portion of the edge of the optical members 715. The second to-be-positioned portion 734 having a recess shape fits with a protruding positioning portion 731, and thus, the optical members 715 are fixed in place. On the edge face of the second to-be-positioned portion 734 facing the light-shielding sheet 735 across a non-covered portion NCP, the inclined portion 737 similar to Embodiment 1 is formed. Even with such a configuration, it is possible to suitably mitigate unwanted deformation in the light-shielding sheet 735 as in Embodiments 1 to 7.

Embodiment 9

Embodiment 9 of the present invention will be described with reference to FIG. 26. In Embodiment 9, a second to-be-positioned portion 834 is constituted of one protrusion 47 protruding from an edge face of optical members 815. Descriptions of structures, operations, and effects similar to those of Embodiment 1 will be omitted.

Figure 26:
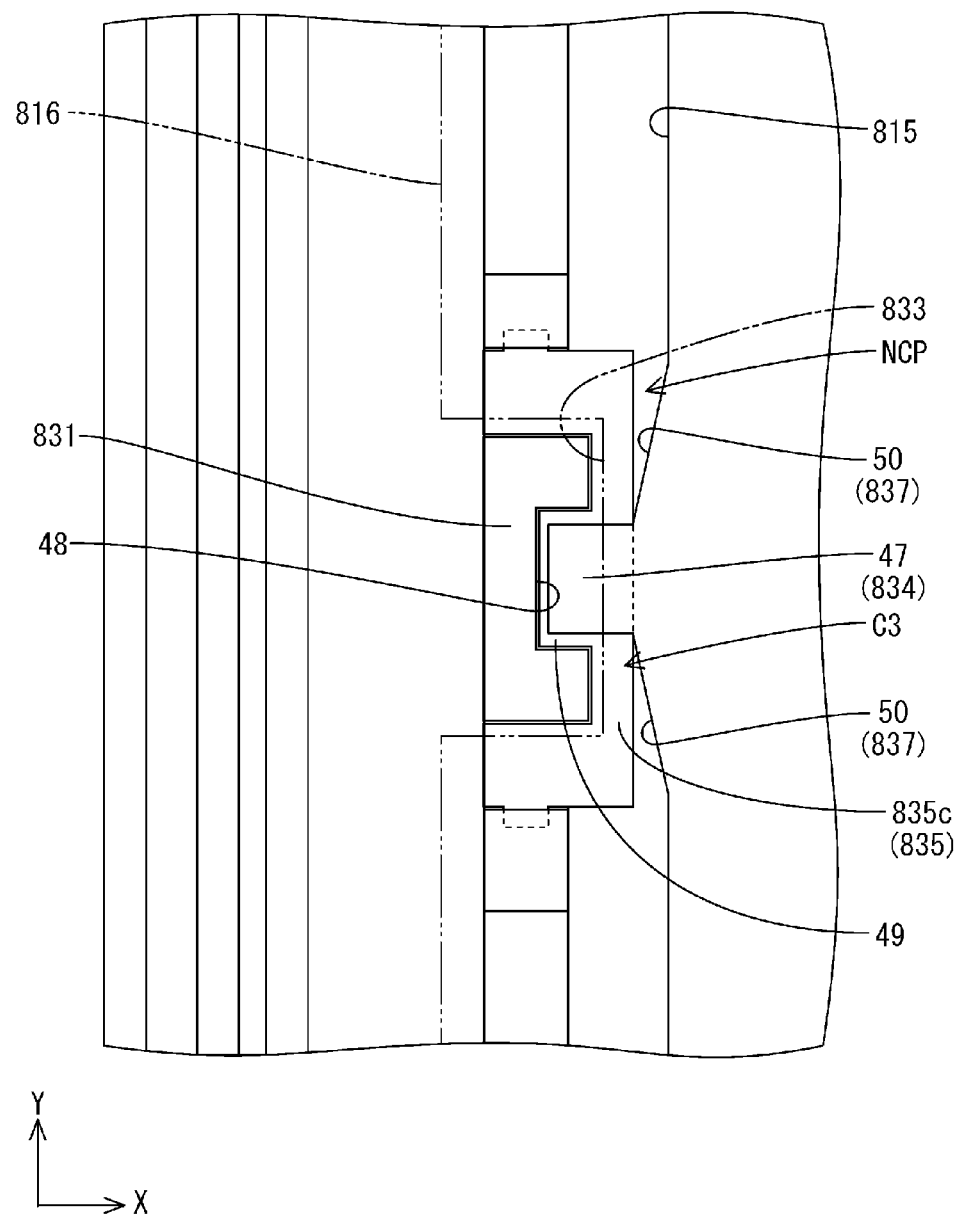
FIG. 26 is an enlarged rear view of the vicinity of a positioning structure in a state in which optical members are fixed onto a frame according to Embodiment 9 of the present invention.

As shown in FIG. 26, the second to-be-positioned portion 834 of the present embodiment is constituted of one protrusion 47 that protrudes from a shorter side edge face of the optical members 815. On the other hand, a positioning portion 831 has formed therein a recess 48 that receives the protrusion 47 of the second to-be-positioned portion 834. Thus, the optical members 815 are fixed in place in the X axis direction and the Y axis direction due to the protrusion 47 of the second to-be-positioned portion 834 fitting into the recess 48 of the positioning portion 831. A third portion 835c of the light-shielding sheet 835 has a protrusion 49 disposed in the recess 48 of the positioning portion 831. The entire positioning portion 831 fits into the first to-be-positioned portion 833 that is a recess formed in the light guide plate 816. In FIG. 26, the light guide plate 816 and the first to-be-positioned portion 833 are shown with a two-dot chain line. A gap C3 formed between the positioning portion 831 and a shorter side edge face of the optical members 815 is partially covered by the light-shielding sheet 835, and thus, a non-covered portion NCP not covered by the light-shielding sheet 835 remains. Both portions of the shorter side edge face of the optical members 815 that sandwich the protrusion 47, the optical members 815 having a non-covered portion NCP with the edge face of the third portion 835c of the light-shielding sheet 835, respectively have inclined portions 837 that are inclined with respect to the edge face of the third portion 835c of the light-shielding sheet 835. The inclined portions 837 are constituted of a pair of inclined faces 50 with a gradient that causes it to become further from the edge face of the light-shielding sheet 835, the further away it is from the protrusion 47. The light-shielding sheet 835 is similarly symmetrical in the up-and-down direction in FIG. 26. The positioning structures (positioning portion 831, first to-be-positioned portion 833, and second to-be-positioned portion 834) and the light-shielding sheets 835 respectively form pairs on both shorter sides of the optical members 815 and the light guide plate 816. Even with such a configuration, it is possible to suitably mitigate unwanted deformation in the light-shielding sheet 835 as in Embodiments 1 to 8.

Embodiment 10

Embodiment 10 of the present invention will be described with reference to FIG. 27 or 28. In Embodiment 10, an inclined portion 937 has an inclined shape from the side. Descriptions of structures, operations, and effects similar to those of Embodiment 1 will be omitted.

Figure 27:
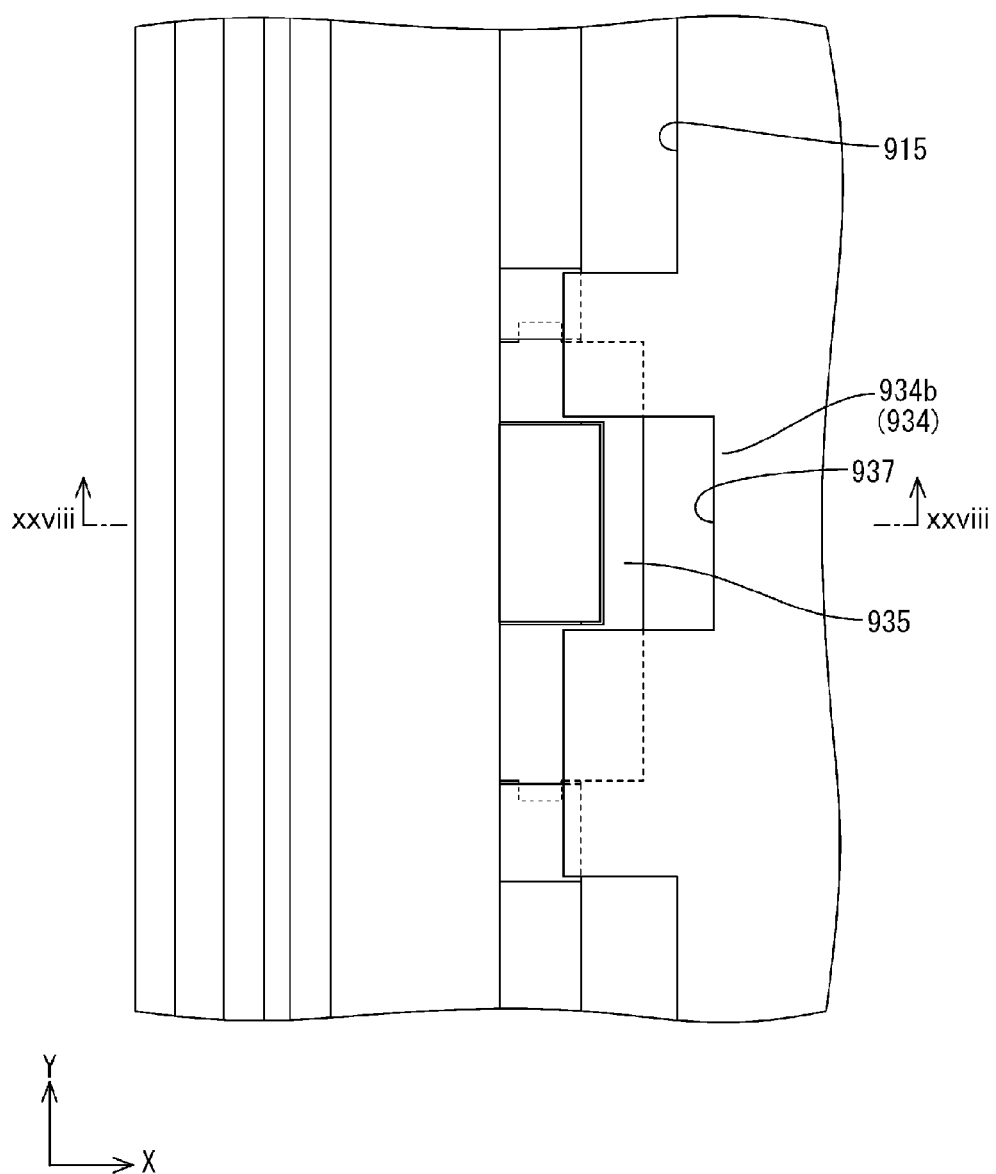
FIG. 27 is an enlarged rear view of the vicinity of a positioning structure in a state in which optical members are fixed onto a frame according to Embodiment 10 of the present invention.
Figure 28:
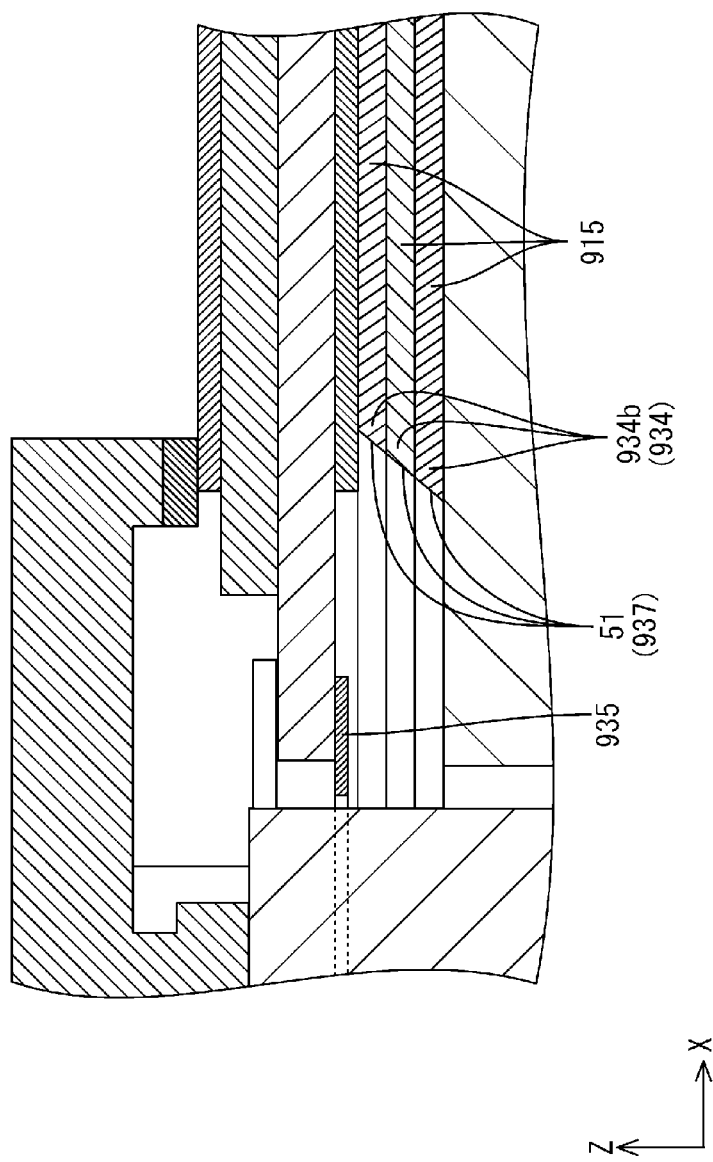
FIG. 28 is a cross-sectional view of FIG. 27 along the line xxviii-xxviii.

As shown in FIG. 27, the inclined portion 937 of the present embodiment has a substantially straight line shape along the Y axis direction in a plan view, and is parallel to the light-shielding sheet 935 facing it in a plan view. On the other hand, as shown in FIG. 28, the inclined portion 937 is formed at an incline with respect to the edge face of the light-shielding sheet 935 facing it when viewed from the side. In other words, in a cross-sectional view of a bridging portion 934*b* of the second to-be-positioned portion 934, the inclined portion 937 formed in the edge face of the bridging portion 934*b* has an inclined face 51 that faces the diagonal front and is inclined towards the light-shielding sheet 935. In other words, the inclined portion 937 has the inclined face 51 having a gradient such that the edge face of the bridging portion 934*b* towards the rear in the thickness direction (opposite to where the light-shielding sheet 935 is) is further to the outside than the edge face thereof towards the front (towards the light-shielding sheet 935), or in other words, towards the front in the direction of movement of the optical member 915 when it thermally expands. The inclined portion 937 is provided for all three optical members 915, and the angle of incline is substantially the same for them. Therefore, depending on the plan view arrangement of the respective optical members, the inclined portions 937 are sometimes aligned in a line. FIG. 28 shows a situation in which the inclined portions 937 are aligned in a line. Even with the inclined portions 937 having such inclined faces 51, it is possible to suitably mitigate unwanted deformation in the light-shielding sheet 935 as in Embodiments 1 to 9.

OTHER EMBODIMENTS

The present invention is not limited to the embodiments shown in the drawings and described above, and the following embodiments are also included in the technical scope of the present invention, for example.

(1) In the embodiments above, configurations were described in which all three optical members have inclined portions, but a configuration in which inclined portions are provided only on some optical members (one or two) such that the number of optical members having inclined portions does not match the total number of optical members is also included in the present invention. In such a case, it is preferable that the inclined portion be provided in the optical member closest to the light-shielding sheet (frontmost optical member).

(2) In the embodiments above (except for Embodiment 10), the inclined portions are formed by forming a recess in the edge face of the bridging portion between the second to-be-positioned portions or by having the edge face of the optical members protrude towards the light-shielding member, but a configuration is possible in which the edge face of the bridging portion of the second to-be-positioned portion protrudes towards the light-shielding member or a recess is formed in the edge face of the optical members in order to form the inclined portion.

(3) In Embodiment 7, the inclined portion is formed by having the edge face of the light-shielding sheet protrude towards the second to-be-positioned portion, but a configuration in which a recess is formed in the edge face of the light-shielding sheet to form the inclined portion is also included in the present invention.

(4) In the embodiments above (except Embodiments 6 and 10), the inclined portions are symmetrical in a plan view, but a configuration in which the inclined portions are asymmetrical in a plan view is also included in the present invention. Specifically, in Embodiments 1, 4, and 8, the curvature of the arced surface constituting the inclined portion varies in different portions, and in Embodiments 2, 3, 5 to 7, and 9, the angle of inclination of the inclined faces of the inclined portion varies in different portions.

(5) Besides what was described in the embodiments above, if the inclined portion has an arced face, then the curvature can be changed as appropriate, and if the inclined portion has inclined faces, then the angle of inclination can be changed as appropriate.

(6) In Embodiment 5, the inclined portion has two stages of angles of inclination, but the inclined portion may have three or more stages of angles of inclination.

(7) Besides the embodiments above, the formation area, the plan view shape, and the like of the light-shielding sheet can be appropriately changed. For example, the amount of overlap between the light-shielding sheet and the protrusion of the second to-be-positioned portion of the optical members can be appropriately changed, and in some cases, they can be arranged so as not to overlap each other.

(8) In the embodiments above, the surface of the light-shielding sheet is colored black, but a light-shielding sheet in which the color of the surface is grey or another color is also included in the present invention. Besides a light-shielding sheet that blocks light by absorbing it, a light-shielding sheet may block light by providing it with a high reflectance by coloring the surface of the light-shielding sheet silver or the like to have light undergo minor reflection.

(9) In the embodiments above, the first to-be-positioned portion is formed by forming a recess in the edge face of the light guide plate, but a configuration in which the first to-be-positioned portion protrudes outward from the edge face of the light guide plate is also included in the present invention. In this case, the positioning portion simply needs to be a recess in order to receive the protruding first to-be-positioned portion (see recess 48 of Embodiment 9). At this time, the second to-be-positioned portion can also protrude outward from the edge face of the optical members such that it fits into a recess provided in the positioning portion along with the first to-be-positioned portion.

(10) In the embodiments above, the first to-be-positioned portion is a recess in the edge face of the light guide plate, but a configuration in which the first to-be-positioned portion penetrates the light guide plate in the plate thickness direction but does not form an opening in the edge face so as to form a hole is also included in the present invention.

(11) In the embodiments above, the second to-be-positioned portion is a recess in the edge face of the optical members, but a configuration in which the second to-be-positioned portion penetrates the optical members in the thickness direction but does not form an opening in the edge face so as to form a hole is also included in the present invention.

(12) Besides what was shown in the embodiments above, the formation area, the plan view shape, the arrangement, and the like of the positioning portion, the first to-be-positioned portion, and the second to-be-positioned portion can be appropriately changed. In particular, the positioning portion, the first to-be-positioned portion, and the second to-be-positioned portion can be arranged away from the center in the shorter side direction of the optical members and the light guide plate. Besides this, it is possible to arrange the positioning portion, the first to-be-positioned portion, and the second to-be-positioned portion on longer side edges of the optical members and the light guide plate.

(13) In the embodiments above, the positioning structure involved pairs of parts on both shorter side edges of the optical members and the light guide plate, but the positioning structure can be arranged on only one shorter side edge or one longer side edge of the optical members and light guide plate. Also, the positioning structure can be arranged on three appropriate edges of the optical members and the light guide plate, or on all four edges.

(14) In the embodiments above, the positioning portion is directly attached to the frame, but a configuration in which the positioning portion is directly attached to the subframe and indirectly attached to the frame is also included in the present invention.

(15) In the embodiments above, the positioning portions were provided as separate components from the frame, but the positioning portions can be formed integrally with the frame. Alternatively, the positioning portion can be formed integrally with the subframe.

(16) In the embodiments above, the positioning portion is provided on the frame, but the positioning portion may be provided on the chassis. In such a case, the positioning portion may be formed integrally with the chassis or attached as a separate component onto the chassis.

(17) In the embodiments above, the positioning portion is provided on the frame, but the positioning portion may be provided individually on both the frame and on the chassis.

(18) In the embodiments above, the light guide plate is manufactured by extrusion molding, but a configuration in which the light guide plate is manufactured by injection molding is also included in the present invention.

(19) In the embodiments above, there were three optical members, but the number of optical members can be two or less, or four or more. If the number of optical members is two, then it is preferable that the diffusion sheet be omitted and that the lens sheet (prism sheet) and the reflective polarizing sheet be used.

(20) In the respective embodiments above, the LED units (LED substrates) being disposed as a pair so as to respectively face the ends of the longer sides of the light guide plate was shown as an example, but the present invention also includes the LED units being disposed as a pair so as to respectively face the ends of both shorter sides of the light guide plate, for example.

(21) In addition to (20) above, the present invention also includes a pair each or four in total of the LED units (LED substrates) being disposed so as to respectively face the respective ends of both longer sides and shorter sides of the light guide plate, or one LED unit being disposed so as to only face an end of one longer side or one shorter side of the light guide plate. The present invention also includes a configuration in which three LED units are disposed at three side edges of the light guide plate so as to face each other.

(22) In the respective embodiments above, two LED units (LED substrates) were disposed at one side of the light guide plate, but one LED unit or three or more LED units may be disposed at one side of the light guide plate.

(23) In the respective embodiments above, the power supply board was provided with the function of powering the LEDs, but the present invention also includes a configuration in which an LED driver board that powers the LEDs is separated from the power supply board.

(24) In the respective embodiments above, the main board was provided with a tuner part, but the present invention also includes a configuration in which a tuner board that has a tuner part is separated from the main board.

(25) In the respective embodiments above, the colored portions of the color filters provided in the liquid crystal panel included the three colors of R, G, and B, but it is possible to have the colored portions include four or more colors.

(26) In the respective embodiments above, LEDs were used as the light source, but other types of light source such as an organic EL may also be used.

(27) In the respective embodiments above, TFTs are used as the switching element in the liquid crystal display device, but the present invention can be applied to a liquid crystal display device that uses a switching element other than a TFT (a thin film diode (TFD), for example), and, besides a color liquid crystal display device, the present invention can also be applied to a black and white liquid crystal display device.

(28) In the respective embodiments above, a liquid crystal display device using a liquid crystal panel as a display panel was described as an example, but the present invention can be applied to a display device that uses another type of display panel.

(29) In the respective embodiments above, a television receiver that includes a tuner part was illustratively shown, but the present invention is also applicable to a display device without a tuner part. Specifically, the present invention can also be applied to a liquid crystal display device used as digital signage or as an electronic blackboard.

DESCRIPTION OF REFERENCE CHARACTERS 10 liquid crystal display device (display device)
11 liquid crystal panel (display panel)
11c, 11d polarizing plate
12 backlight device (illumination device)
13 frame (holding member)
14 chassis (holding member)
15, 115, 615, 715, 815, 915 optical member
16, 816 light guide plate
16b light-receiving face (edge face)
16d non-LED-facing edge face (edge face)
17 LED (light source)
23 light guide plate supporting portion
31, 731, 831 positioning portion
32 attaching portion
33, 833 first positioning portion (positioning portion)
34, 134, 234, 534, 634, 734, 834, 934 second positioning portion
34a, 134a, 234a protrusion
34b, 134b, 234b, 934b bridging portion (portion)
35, 135, 235, 335, 435, 535, 635, 735, 835, 935 light-shielding sheet (light-shielding member)

37, 137, 237, 337, 437, 537, 637, 737, 837, 937 inclined portion
C1 gap
C2 gap
DS display surface
HM holding member
NCP non-covered portion
TV television receiver

The invention claimed is:

1. A display device, comprising:
   a light source;
   a display panel that performs display using light from the light source;
   a light guide plate laid on a side of the display panel opposite to a display surface side, the light guide plate being disposed such that an edge face thereof faces the light source;
   an optical member disposed between the display panel and the light guide plate;
   a pair of holding parts that sandwiches the display panel, the optical member, and the light guide plate, and houses the light source, respectively from the display surface side and a side opposite thereto;
   a receptor portion provided in an edge of the light guide plate;
   a positioning portion provided in at least one of the pair of holding parts that engages with the receptor portion to fix in position the light guide plate in a horizontal direction; and
   a light-shielding member that is disposed between the light guide plate and the display panel and that blocks light from directly entering the display panel from the receptor portion by covering at least a portion of a gap between the positioning portion and the receptor portion.

2. The display device according to claim 1,
   wherein an edge of the optical member is provided with a receptor portion that engages the positioning portion so as to fix in position the optical member, and
   wherein the light-shielding member is disposed between the optical member and the display panel and blocks light from directly entering the display panel from the receptor portion of the light guide plate by covering at least a portion of a gap between the positioning portion and the receptor portion of the optical member.

3. The display device according to claim 2,
   wherein the light-shielding member covers a portion of the gap formed between the positioning portion and the receptor portion of the optical member such that a portion of the gap not covered by the light-shielding member remains between an edge face of the light-shielding member and an edge face of the receptor portion of the optical member, and
   wherein one of the edge face of the light-shielding member and the edge face of the receptor portion of the optical member is provided with a non-parallel portion that is not parallel to the other of the edge face of the light-shielding member and the edge face of the receptor portion of the optical member.

4. The display device according to claim 3, wherein the non-parallel portion is provided in the edge face of the receptor portion of the optical member and not parallel to the edge face of the light-shielding member in a plan view.

5. The display device according to claim 4, wherein the non-parallel portion is symmetrical in a plan view.

6. The display device according to claim 3,
   wherein the receptor portion of the optical member includes a pair of protrusions that protrude from the edge face of the optical member and that sandwich the positioning portion from both sides thereof, and a portion of the edge of the optical member between the pair of protrusions, and
   wherein the non-parallel portion is provided in the portion of the edge of the optical member between the pair of protrusions.

7. The display device according to claim 3,
   wherein said receptor portion is provided in each of opposing sides of the light guide plate so as to form a pair, said receptor portion is provided in each of opposing sides of the optical member so as to form a pair, said positioning portion is provided in each of opposing sides of said one of the pair of holding parts so as to form a pair, and said light-shielding member is formed between the display panel and each of the opposing sides of the optical member so as to form a pair, and
   wherein said non-parallel portion is provided on either both edge face of the light-shielding members or both edge faces of the receptor portion of the optical member.

8. The display device according to claim 3, wherein the light-shielding member is a flexible sheet.

9. The display device according to claim 8,
   wherein polarizing plates are respectively attached to a surface of the display panel facing the optical member and a surface of the display panel opposite thereto, the polarizing plates covering central portions of the display panel, and
   wherein the light-shielding member is disposed between an edge of the display panel where the polarizing plates are not present, a thickness of the light-shielding members being less than a thickness of each polarizing plate.

10. The display device according to claim 2, wherein at least a portion of the light-shielding member overlaps the receptor portion of the optical member in a plan view.

11. The display device according to claim 1, wherein the receptor portion of the light guide plate is formed as a recess in the edge face of the light guide plate.

12. The display device according to claim 1, wherein, among the pair of holding parts, a holding part disposed on the display surface side of the display panel is provided with a light guide plate supporting portion that extends along the edge of the light guide plate and that supports, from the display panel side, portions of the edge of the light guide plate where the receptor portion of the light guide plate is not formed, and an attaching portion that is attached to the positioning portion and that is continuous with the light guide plate supporting portion.

13. The display device according to claim 12, wherein the light-shielding member is attached to the attaching portion.

14. The display device according to claim 1, wherein the display panel is a liquid crystal panel including a pair of substrates with liquid crystal sealed therebetween.

15. A television receiver, comprising the display device according to claim 1.

* * * * *